(12) United States Patent
Gharpuray

(10) Patent No.: US 11,714,518 B2
(45) Date of Patent: Aug. 1, 2023

(54) METHOD AND SYSTEM FOR VIRTUAL REAL ESTATE TOURS AND VIRTUAL SHOPPING

(71) Applicant: Rishi M Gharpuray, Menlo Park, CA (US)

(72) Inventor: Rishi M Gharpuray, Menlo Park, CA (US)

( * ) Notice: Subject to any disclaimer, the term of this patent is extended or adjusted under 35 U.S.C. 154(b) by 0 days.

(21) Appl. No.: 17/074,391

(22) Filed: Oct. 19, 2020

(65) Prior Publication Data

US 2021/0117071 A1   Apr. 22, 2021

Related U.S. Application Data

(60) Provisional application No. 62/916,589, filed on Oct. 17, 2019.

(51) Int. Cl.
*G06T 19/00* (2011.01)
*G06F 3/04815* (2022.01)
(Continued)

(52) U.S. Cl.
CPC .......... *G06F 3/04815* (2013.01); *G06F 9/547* (2013.01); *G06F 30/13* (2020.01); *G06N 20/20* (2019.01); *G06Q 10/087* (2013.01); *G06Q 30/0631* (2013.01); *G06Q 30/0643* (2013.01); *G06Q 50/16* (2013.01); *G06T 13/40* (2013.01); *G06T 17/20* (2013.01); *G06T 19/006* (2013.01); *G06T 19/20* (2013.01); *G06F 3/0482* (2013.01); *G06F 2111/18* (2020.01); *G06T 2200/24* (2013.01); *G06T 2210/56* (2013.01); *G06T 2219/2004* (2013.01); *G06T 2219/2016* (2013.01); *G06T 2219/2024* (2013.01)

(58) Field of Classification Search
None
See application file for complete search history.

(56) References Cited

U.S. PATENT DOCUMENTS

2016/0217225 A1 *  7/2016  Bell ........................ G06F 30/13

OTHER PUBLICATIONS

Whyte et al., "From CAD to virtual reality: modelling approaches, data exchange and interactive 3D building design tools", 2000. (Year: 2000).*

* cited by examiner

*Primary Examiner* — Nicholas R Wilson
(74) *Attorney, Agent, or Firm* — Cittone Demers & Arneri LLP; Henry J. Cittone

(57) ABSTRACT

A process and method for generation of 3D interactive rendition of space by first digitizing the space as a TXLD file from point clouds, 2-D floor plans, photographs and/or videos, and/or elevation views then processing the file to create 3D interactive renditions of the space using virtual reality, augmented reality, or mixed reality technologies, constantly growing and evolving 3D library of digital representations of both fixtures and non-fixtures based on real products, automating and personalizing product selection and placement for a given user and target environment, using an ensemble recommendation system, which relies on weighted averages of probabilistic, content-based, clustering, and collaborative filtering models, among other suitable models that may be added to the ensemble in the future. If a medium does not necessitate 3D model creation of the environment the products are automatically placed in the medium view based on the encoded position in the TXLD file.

14 Claims, 43 Drawing Sheets

(51) Int. Cl.
*G06T 19/20* (2011.01)
*G06T 13/40* (2011.01)
*G06Q 50/16* (2012.01)
*G06Q 30/0601* (2023.01)
*G06Q 10/087* (2023.01)
*G06F 30/13* (2020.01)
*G06N 20/20* (2019.01)
*G06F 9/54* (2006.01)
*G06T 17/20* (2006.01)
*G06F 111/18* (2020.01)
*G06F 3/0482* (2013.01)

```xml
<space>
  <floor number or space container (e.g. first floor)>
    <name of room or enclosure>
      <edges>
        <edge type="wall | other" length="float" id="" key="String">
          <sourcePoint x="float" y="float" height="float" />
          <targetPoint x="float" y="float" height="float" />
          <fixtures>
            <cabinet assetId="String" assetTitle="String" assetVariant="String" texture="String" x_pos="float" z_pos="float" length="float" y_dist="float" rotation="float" spacing_from_edge="float">
            </cabinet>
          </fixtures>
          <assets>
            <poster assetId="String" assetTitle="String" assetVariant="String" texture="String" x_pos="float" z_pos="float" length="float" y_dist="float" rotation="float" spacing_from_edge="float">
            <tv assetId="String" assetTitle="String" assetVariant="String" texture="String" x_pos="float" z_pos="float" rotation="float" length="float" y_dist="float" spacing_from_edge="float">
          </assets>
        </edge>
        <edge type="wall | other" length="float" id="String" key="String">
          <sourcePoint x="80" y="440" />
          <targetPoint x="230" y="440" />
          <assets>
            <sofa assetId="String" assetTitle="String" assetVariant="String" texture="String" x_pos="float" z_pos="float" spacing_from_edge="float" length="float" height="float" rotation="float">
            <art assetType="String" assetTitle="String" assetVariant="String" texture="String" x_pos="float" z_pos="float" spacing_from_edge="float" length="float" y_dist="float">
          </assets>
        </edge>
        <edge type="wall | other" length="float" id="String" key="String">
          <sourcePoint x="float" y="float" />
          <targetPoint x="float" y="float" />
        </edge>
        ... more edges
      </edges>
```

FIG. 5

```xml
<space>
  <firstfloor>
    <livingroom>
      <edges>
        <edge type="wall" length="10m" id="0OpM102f" key="LR1">
          <sourcePoint x="0" y="0" />
          <targetPoint x="0" y="100" />
          <assets>
            <poster assetId="oaijfnd" assetTitle="Cobra Kai Poster" assetVariant="Dark Background" x_pos="1m" z_pos="1.5m" length="0.6m" y_dist="0.7m" rotation="180" spacing_from_edge="0m">
            <tv assetId="skjwer" assetTitle="Sony Bravia HDTV 60 inch" assetVariant="Black" x_pos="2m" z_pos="2.3m" rotation="180" length="1.6m" y_dist="0.9m" spacing_from_edge="0m">
          </assets>
        </edge>
        <edge type="wall" length="5m" id="paw02m" key="LR2">
          <sourcePoint x="0" y="100" />
          <targetPoint x="50" y="100" />
          <assets>
            <sofa assetId="poriwerm" assetTitle="CB2 Modern L-Sectional Sofa" assetVariant="Beige" x_pos="2m" z_pos="0m" spacing_from_edge="0.1m" length="2m" height="0.7m" rotation="270">
            <art assetType="vase" assetTitle="Crate and Barrel Modern Vase" assetVariant="2020 Modern" x_pos="2m" z_pos="0m" spacing_from_edge="0.1m" length="0.2m" y_dist="0.6m">
          </assets>
        </edge>
        <edge type="wall" length="10m" id="0olp02f" key="LR3">
          <sourcePoint x="50" y="100" />
          <targetPoint x="50" y="0" />
          <fixtures>
            <window start="1m" length="1.5m" assetID="fojiwejr">
          </fixtures>
        </edge>
        <edge type="wall" length="5m" id="0w0a102f" key="LR4">
          <sourcePoint x="50" y="0" />
          <targetPoint x="0" y="0" />
        </edge>
      </edges>
      <corners> .... [corner data] .... </corners>
    </livingroom>
    <kitchen>
      .....[edges, corner, and other data encoded here].....
    </kitchen>
  </firstfloor>
</space>
```

FIG. 6

```
//Pseudocode to generate 3d model using the TXLD file as input (Continued in next figure)

def processTXLDFileAndGenerate3DModel:
    //Read from TXLD file
    txldFileObj = File.read("example.txld")

//Iterate over hierarchy of the space
    //Vertices in vertex dictionary may be split by name. e.g. Living Room Walls, Kitchen Ceiling
    vertexDictionary = empty dictionary
    triangleDictionary = empty dictionary // this will contain mappings where triangles are split by name
    for each section of the space // e.g. first floor, second floor, condo, etc.
        for each subsection for current section // e.g. kitchen, bedroom, foyer, etc.

//handle the floor
            create mesh called "[subsection name] Floor" if it doesn't already exist // e.g. Kitchen Floor for each corner of the floor
                add each vertex to the vertexDictionary for key "[subsection name] Floor"
            triangulate using these vertices and update triangle dictionary for key "[subsection name] Floor"

//handle the walls
            for each edge in this subsection (excluding outerwalls)
                processTheEdge(edgeData)

//handle the outerwalls
            create a mesh called "[subsection name] Outerwall"
            for each outerwall edge for this subsection
                add each vertex to the vertexDicionary for key "[subsection name] Outerwall"
            triangulate using these vertices and update triangle dictionary for key "[subsection name] Outerwall"
```

FIG. 13

```
def processTheEdge(edgeData)
      // create walls
      // Note: heights for a wall may be a fixed number or a collection of numbers at
      // different positions along the edge
      // create walls based on height information encoded in the attributes of the edge
      create mesh called "[subsection name] Wall N" where N is the numbered wall # for this room // the attributes and child nodes of an edge will encode data including but not limited
      // to doors, half walls, and windows, as well as their positions, length, and heights.
      Based on encoded door & window positions, make "holes" in the wall at the correct positions Gather the vertices (x,y,x) based on the above process
      Add each vertex to the vertexDictionary for this key (e.g. "[subsection name] Wall N")
      Triangulate this wall using these vertices, with a clockwise directionality (so the wall will be
          visible from inside).

// apply and add fixtures including but not limited to fridge, cabinets, sink, toilet, tub,
      // crown molding, and fireplace to the model
      for each fixture along the edge
            Based on each fixture's encoded position (and size), fetch the correct fixture
              from the 3D library and add it as a child node under the edge.
            // The above fixture will be labeled as "[subsection name] [encoded fixture name
            // and/or ID]" (e.g. Kitchen Cabinet #2B). This is done to make modifying
            // and manipulating the fixture easier in future processes and functions.
            // Textures will be added at a later stage
```

FIG. 14

```
Note: This is a continuation of the previous two figures def processTheEdge(edgeData)

... (Figure 14, previous figure) ...

// handle ceiling
    create mesh called "[subsection name] Ceiling" if it doesn't already exist
    // e.g. Kitchen Ceiling for each ceiling vertex generated during the wall processing code above
        add each vertex to the vertexDictionary for key  "[subsection name] Ceiling"
    triangulate using these vertices and update triangle dictionary for key "[subsection] Ceiling"

def processTXLDFileAndGenerate3DModel:

... (Figure 13) ....

// add any ceiling fixtures
    for each ceiling fixture
        Based on each fixture's encoded position, place the fixture on the ceiling
        such that the top of the fixture is at the same height as the ceiling // add any floor fixtures
    for each floor fixture
        Based on each fixture's encoded position, place the fixture on the floor such
        that the bottom of the fixture is at the same height as the floor
        // note that the height of the above will adapt based on the thickness of the
        // floor (whether it's carpet, hardwood, or anything else)

// add and/or process other components along the edge or within the space
    // As the TXLD file type matures, it is anticipated that this function will evolve
    // to accommodate more and more nuanced elements of a space
```

FIG. 15

Step 1601: Although the system may initially rely on pre-existing 3D modeling softwares for the UV unwrapping process (the 3D modeling process of projecting a 2D image to a 3D model's surface for texture mapping), the system will also feature a function that procedurally (with code) unwraps UVs for the 3D models generated by the system based on a TXLD file.

Step 1602: The system's UV unwrapping function will apply heuristics specific to the challenge. The edges along which cuts are made are core to the UV unwrapping process. For the case of rooms, we know that we want "continuous" textures where walls meet within a given room. We may also want "continuous" textures throughout a floor. This may especially be true when an entire floor has hardwood flooring. If we made cuts along every edge where one room ends and another begins, textures would not appear continuous and the hardwood would appear not in sync with the hardwood in an adjacent room.

Step 1603: Once we have unwrapped UVs for the space, we will associate these uv's with the generated 3D model. We will take the updated 3D model file(s) and upload them to cloud (or alternate) storage. References to this file may then be saved in the database (the corresponding TXLD file will also be associated with a reference to this 3D model)

FIG. 16

Step 1301:
1. Iterate over all nodes in the 3D model, and for each mesh, the system will look up and download the texture from the 3D Library using the texture's marked unique ID (each texture will have a unique ID in the 3D library database).

Step 1302:
Apply the textures for each node in the generated model using the gathered textures in step 1301. This includes textures for walls, fixtures (cabinets, tub, fireplace, sink, etc.), and all other nodes that make up the 3D model.
Note: In many cases, textures may be applied during the scene generation process and not at this stage. Textures will still be gathered here for future use.

Step 1303:
For each window, use the user supplied input image data, which include but are not limited to a collection of still images, video(s) of the view looking outside the window, footage captured by a drone or 360 camera, and footage captured by an augmented reality device or camera with depth data, generate a skybox, plane, or cube to render a photorealistic view of the exterior. Based on the type of linked files provided, a different approach may be employed. One approach below will create a plane to make exterior views looking outside the windows accurate, while another will create a "skybox" or a full 360 view of the surrounding environment.

Step 1304:
Although the approach to generating a plane for each window will evolve with time, one rudimentary approach may be using nine images (up+left, up, up+right, middle+left, middle, middle+right, down+left, down, down+right) to generate a plane that will be positioned slightly outside each window cutout. Although not perfect graphically, this will help users see accurate representations of exterior views. Alternate approaches to generating this exterior view may also be used.

Step 1305:
If a full 360 view of the environment is provided, this can be converted into a "skybox" (the 360 image will be projected onto a cube or sphere). The direction (e.g. north, south, northeast) will be gathered and labeled for all image data collected. Accordingly, the rotation of the "skybox" will be tuned based on the direction the space is facing in real life (e.g. north east, south west).
Note: planes or "skyboxes" may not be assigned till a later stage, but the system will generate them as soon as it has the necessary data to do so

FIG. 17

| Inputs | Guiding Principles for probabilistic model (used more in early stages) |
|---|---|
| Target space (edges, heights, fixtures, existing assets) | Style is nuanced and goes well beyond the style label (e.g. Modern Victorian). As the product selection and placement algorithm evolves with more and more data gathered (with user feedback and AB testing), an unlimited number of new "styles" may be discovered even if they do not have a specific name. |
| Desired style(s) (Modern, Contemporary, Tuscan, French Country, Modern Victorian) | |
| User style profile (demographics, age, etc.) | Initially, to avoid the cold-start problem (not enough training data), in the early stages, a probabilistic model will be used to identify the types of products needed for a given room. |
| Region and regional data | |
| Budget | The probabilistic model will be guided by heuristics and general interior design principles, that will vary based on style and other inputs in the table on the left. The system will allow these principles to be adapted as needed. Over time, these principles may even be inferred using a deep learning algorithm. |
| Family Info (kids?, newly married?) | |
| TXLD file encoding space (with fixtures but without products) | |
| | Some guiding principles (for early stages when we don't have enough training data) include but are not limited to:<br>1) Balance<br>2) Rhythm<br>3) Harmony<br>4) Proportion and Scale |
| Output | |
| Updated TXLD file | The probabilistic model will go through a sequence of iterations, at the conclusion of which we will have a collection of the product types and their positions (including their size and rotation) in the target space. Product type may refer to high level descriptors like L-Sectional Sofa, Bed, Wall Art, Plant, or more specific descriptors like "Master Bedroom King Bed with headboard". |
| Array of selected "product types" and their corresponding products, as shown below. | |
| | Identifying product types, including their positions and sizes will be the first step of the probabilistic model, explained visually in the following figure. |

| Bed | ... | Product Type N |
|---|---|---|
| CB2 Modern Bed | ... | Product N |

FIG. 19

Example with the following inputs:
Name of Space: Bedroom
"Style" identifier: The modern contemporary style

| Product Type (e.g. bed, table, or any other category or type for a product) | Priority Index (1-1000). This number will vary depending on the name of the space (e.g. patio, bedroom, or at times, un-identified). Target "style", which includes but is not limited to named style, user, group of users, or inferred style, will also be considered. |
|---|---|
| Bed | 1 |
| Dresser | 0.8 |
| Desk | 0.3 |

Example Two with the following inputs:
Name of Space: Study
"Style" identifier: Profile of User with ID 12345 (who may have a style preference that deviates from more common styles -- in this example, not preferring a desk in a study)

| Product Type | Priority Index (1-1000). |
|---|---|
| Bean Bag | 1 |
| LED TV | 0.7 |
| Wall Art | 0.6 |
| Desk | 0 |

FIG. 21

| Desired Styles | Formal Traditional | Modern Contemporary | Specific to User with ID: (user_id) | Group of similar users who like (interest, style, etc.) | ... | N different styles |
|---|---|---|---|---|---|---|

Note: Style does not refer to only high level descriptors like "Modern" or "Contemporary". It also includes styles that may be specific to one user, a grouping or collection of users, or other more nuanced styles that are technology inferred. Style is a high level term that will inform the product type and actual product selection for a given space.

| Desired Times of Day | 6am | 1pm | 5pm | 10pm | ... | M different times of day, or weather conditions |
|---|---|---|---|---|---|---|

```
General approach (pseudocode):

for each desired "style" 1... N
    for each desired time of day or weather condition 1... M
        complete the product selection and placement process shown in Figure 18 for this
          "style" and for this time of day. This process will produce a TXLD file.
        save this TXLD file, associating it with this "style" and space (as shown in Figure 27)
```

FIG. 24

| Property or Space Identifier (e.g. Address or other) | 1234 ____ Road, Apt. 91 | 123 ____ Way | ... | Unlimited unique spaces (will grow with time) |
|---|---|---|---|---|
| User 1 | { "6am" : {"url": Link to TXLD File, "Link to Generated Scene URL": ".."}, "1pm" : Link to TXLD File, ... } | { "10am" : {"url": Link to TXLD File, "Link to Scene Data": ".."}, ... } | ... | ... |
| User 2 | { "6am" : Link to TXLD File, "1pm" : Link to TXLD File, ... } | { "6am" : Link to TXLD File, ... } | ... | ... |
| Property or Space Identifier (e.g. Address or other) | 1234 ____ Road, Apt. 91 | 123 ____ Way | ... | Unlimited unique spaces (will grow with time) |
| Modern Contemporary | { "6am" : {"url": Link to TXLD File, "Link to Generated Scene": ".."}, "1pm" : Link to TXLD File, ... } | { "6am" : {"url": Link to TXLD File, "timestamp": ".."}, ... } | ... | ... |
| Rustic | { "1pm" : Link to TXLD File, "1pm" : Link to TXLD File, ... } | { "1pm" : Link to TXLD File, ... } | ... | ... |
| Technology inferred styles (ML and/or deep learning) | { "6am" : Link to TXLD File, "1pm" : Link to TXLD File, ... } | { "5pm" : Link to TXLD File, ... } | ... | ... |

FIG. 27

Step 3001: Export the scene to multiple environments. This includes VR headsets, WebGL, or any other mediums of rendering scenes. The files generated for each medium will be uploaded to cloud storage and referenced by the database. In most embodiments, each TXLD file will have its own scene, barring cases where multiple TXLD files are exported to a single scene. This case may allow users to toggle between different TXLD files without downloading a completely new scene for each.

Step 3002: To account for larger spaces, scenes may be exported in a method that allows them to be "lazy-loaded". This essentially implies that only a subset of the scene is downloaded initially. As the user moves around the space and after they break a threshold, other parts of the scene are loaded. This reduces the time required to download and enter the scene, while creating an experience that minimizes delay and improves the user experience.

Step 3003: After we have exported each scene (or scenes if we create multiple versions of a scene for different quality and resolution levels), we store them in the database and assign a unique identifier. At this stage, we may also make the scenes publicly accessible, or limit their access to specific users, groups, organizations, or other grouping.

FIG. 30

Step 3101: For each TXLD file, a "controller" (containing a camera) may traverse a scene capturing all elements of the space. The controller may interact with the space during this process. In some embodiments a human may record this walkthrough manually, but the process will preferably be automated. This process will result in a generated video for each TXLD file.

Step 3102: After we have generated each video (or videos if we create multiple videos of a scene with different quality and resolution levels), the system may upload them to a public video hosting website or store them directly in the database. At this stage, we may also make the videos publicly accessible, or limit their access to specific users, groups, organizations, or other grouping. Regardless of storage method, the system will store a reference to each video in the database for the associated TXLD file (or TXLD files).

FIG. 31

| Type of Interaction | Score |
|---|---|
| Like on a specific scene | +1 for the unique space as a whole (e.g. an address), +0.01 for all products in the specific scene being rendered |
| Love on a specific scene | +2 for the unique space as a whole (e.g. an address), +0.02 for all products in the specific scene being rendered |
| Dislike on a specific scene | -1 for the unique space as a whole (e.g. an address), -0.01 for all products in the specific scene being rendered |
| Strongly dislike on a specific scene | -2 for the unique space as a whole (e.g. an address), -0.02 for all products in the specific scene being rendered |
| Comment on a scene | 0 |
| "Share" of the scene via SMS or to another platform | +3 for the unique space as a whole (e.g. an address), +0.03 for all products in the specific scene being rendered |
| Simple page view | +0.1 for the unique space as a whole (e.g. an address), +0 for all products in the specific scene being rendered |
| Duration of page view for each specific scene | 0.05 per 15 seconds for the unique space as a whole (e.g. an address), +0.01 for all products in the specific scene being rendered |
| "Request more information (or the equivalent clicked) | +3 for the unique space as a whole (e.g. an address), +0.01 for all products in the specific scene being rendered |

FIG. 32

| Type of Interaction (with a product) | Score |
|---|---|
| Duration of a "hover" (over a digital representation or texture) | +0.1 per 5 seconds (capped at 25 seconds) |
| A "like" or the equivalent on a product's annotation (or "bubble"). A product annotation is essentially a product description that shows up when a user faces a product and is close to it. | +2 |
| Lack of a "like" during a hover lasting above a fixed amount of time (implies disinterest) | -0.5 |
| Removal of digital representation (implies strong disinterest) | -2 |
| Modification of a digital representation (changing style, color, rotation, size, etc. – implies interest but with an asterisk) and time spent doing so | +0.25 + 0.05 per 5 seconds (capped at 25 seconds) |
| Addition of a digital representation (implies interest in a very specific product which can be a valuable data point) | +3 |
| Amount of time spent in this scene specifically as a whole | +0.05 per 30 seconds for all contained products (capped at 60 seconds) |
| Amount of time spent in each room or specific part of a scene | 0.05 per 15 seconds for all contained products (in this room or subspace, capped at 30 seconds) |

FIG. 33

Step 3501: Real Estate Agent, AirBnB, Property management or other user type uses a rear-facing 3D depth camera to capture a point cloud (Lidar), which is uploaded to the system. User also uploads video and image data (along with Lidar data). User also provides metadata and additional information about the space (including but not limited to address, direction, region, exterior views)

Step 3502: System digitizes inputs to produce base TXLD file. File is saved to system. At this stage, TXLD files for different "styles" may be created (for example, for "modern contemporary" or specific to a user). Scenes may also be created for each of these TXLD files.

Step 3503: Prospective home buyer in the region tries to view this home using Virtual Reality. At this stage, we will first attempt to find a TXLD file for this space in the database, specific to this user.

If we do find one, we check if a scene has been created for this TXLD file. If it has, we render it on the medium the user is using (e.g. WebGL, VR headset, or other hardware).

If we found a TXLD file for this space (and for this user), but no scene has been created, we initiate the scene creation process.

If no TXLD file is found for this space, we create a personalized TXLD file for this specific user's "style". We then initiate the scene creation process.

Important to note: if a scene hasn't been created, we will attempt to render a scene based on a TXLD file that is as close to the user's individual "style" as possible so the user doesn't experience any delay in viewing the property (or unique space).

FIG. 35

Step 3701: Store ABC (a nationwide brand with locations distributed throughout the country) wants to market and distribute products using the system. Store ABC has decided to use a template TXLD format made available by the system. Store ABC integrates with the API (Figure 42), which will allow the store to both upload product catalogs, 3D models, and inventory at all locations to the system. In this example, the user doesn't need to upload video or image data (or Lidar data) since the user is using a template TXLD file. However, if the user had decided to re-create a real store, these inputs would be required, along with metadata and additional information about the physical location (including but not limited to address, direction, region, and exterior views).

Step 3702: The store will integrate with the API (Figure 42) such that the system receives updates as inventory numbers change across all locations. The store will also be able to add, remove, and update products (and their 3D models) at any time (enabled either by a dedicated interface created by the system, or by using the system's API).

Step 3703: A virtual shopper enters their virtual "Store ABC" store (e.g. the scene for the closest located Store ABC store to this shopper). The store's product placement and layout will be customizable by the store. The store may choose to deploy each store in a variety of methods. A few methods include:
Option 1: Simply show all of that local store's inventory in the space.
Option 2: The store may want to only show products the system infers (based on said user's profile and "style" on the system) the user may like. In this embodiment, the virtual store will be fully personalized and laid-out tailored to this specific shopper.
Option 3: A third option may allow the store to prompt the shopper asking what the shopper is looking for (e.g. product types or categories). Based on the user's selection, the virtual store will be populated with products from the selected categories. In all of these options (and any others that may be added over time), a new TXLD file will be created (or updated) in real-time for this specific store for this specific user (if Option 2 above is chosen). In the case of this "virtual store", Store ABC may update its inventory while this shopper is still browsing the scene. In this case, the underlying TXLD file and scene will also reflect the changes in real time, relying on real-time network requests.

FIG. 37

|        | Unique Product ID | Interaction Type | Interaction Metric |
|--------|-------------------|------------------|--------------------|
| User 1 | abcd              | Hover            | 25 seconds         |
| User 1 | wxyz              | Add              | --                 |
| User 1 | wxyz              | Modification     | 10 seconds         |
| User 2 | efgh              | Remove           | --                 |

|        | Unique Product ID | Score |
|--------|-------------------|-------|
| User 1 | abcd              | 0.5   |
| User 1 | wxyz              | 3.35  |
| User 2 | efgh              | -2    |

FIG. 39

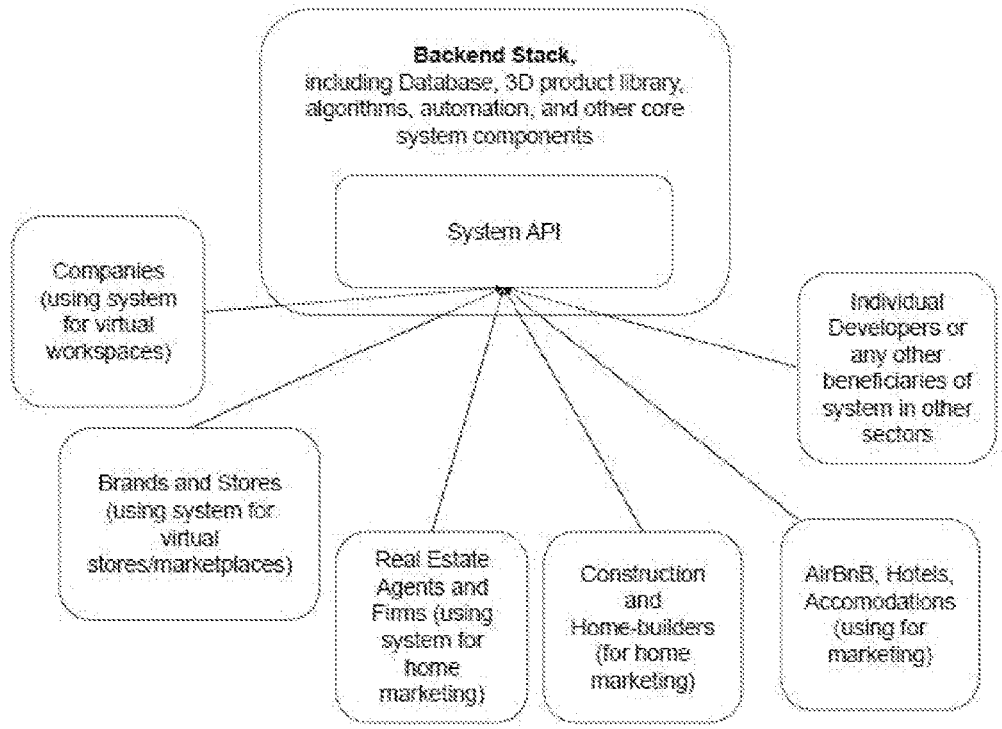

| API Call | Input(s) | Output(s) |
|---|---|---|
| Upload product catalog | JSON file containing products to be added to the system (including necessary files or data, metadata, and any other essential information) | Success or failure |
| Generate scene using TXLD file | Link to TXLD file (external) or TXLD file ID if stored in the system. | Link to generated scene, or scene data |

Note: The above API calls are simple examples. As the system grows, the number of APIs will expand to service more and more functionality. APIs may also be customized for different types of users as shown above (stores, workplaces, real estate, construction, etc.)

FIG. 42

METHOD AND SYSTEM FOR VIRTUAL REAL ESTATE TOURS AND VIRTUAL SHOPPING

CROSS-REFERENCE TO RELATED APPLICATIONS

This application claims benefit of U.S. provisional patent application No. 62/916,589 filed Oct. 17, 2019 the disclosure of which is incorporated herein by reference in its entirety.

BACKGROUND OF THE INVENTION

Residential real estate marketing generally involves a potential purchaser traveling to each piece of property to inspect and view the building's interior and grounds. Real estate agents typically provide the potential buyer with a portfolio of documentation that includes photographs, floor plans, information about the property and the neighborhood, and the asking price. The buyer, after visiting a number of properties, will refer to the documentation, and rely on his or her personal memory of the visit, in making a purchase decision. The travel and visits are inconvenient and time-consuming, especially when the purchaser is moving from a different city or state, or from overseas. The personal recollection of each visit may fade, and memories of multiple visits may become conflated and confusing, if a substantial number of properties are inspected.

Virtual tours, provided over the Internet, have become a popular method of addressing such problems. The seller or agent produces a video depicting a walk-through of the house and property, providing 360-degree views of each room in the house, and either posts the video to a website available to the public, or makes it available to an interested party after an agent's contract has been entered into. These virtual tours make it easy for a purchaser to see numerous homes without having to drive to every open house. Hotels, resorts, and rental properties are also marketed on the Internet with the assistance of video walk-throughs, viewable by the prospective customer.

In the case of new construction, computer models of specific rooms, most often the kitchen and living room, may be prepared, which allow the buyer to experience a virtual "walk through" and, in sophisticated cases, view a selection of paints, flooring, window treatments, cabinetry and appliances, in order to select from available options offered by the builder. The degree of realism in such "virtual reality" presentations may be very high, given advanced software and a sufficiently powerful computer system, but the buyer usually needs to visit the agent or builder to interact with the software and system. Examples of such systems and methods are described in U.S. patent application publication Nos. 2008/0252640 and 2013/0179841, which are both incorporated herein by reference in their entireties.

High speed internet connections, and modern graphics rendering technology derived from advances in multiplayer online gaming, may make such virtual tours available remotely. However, the preparation of the underlying computer models, at a level of detail and realism adequate for a purchaser to make a fully informed decision, may be prohibitively expensive and time-consuming, as the number of rooms and the number of options grow. It is possible to convert scanned images of an existing interior into a 3D computer rendering, and to then generate video walk-throughs and interactive virtual reality presentations, but this requires sophisticated 3D cameras and powerful computing capabilities. These may be provided, for a price, by services such as Matterport Inc. of Sunnyvale Calif., but a typical real estate agency will not have the skills and equipment required to use such methods.

The existing video walk-through technology has several shortcomings, mainly due to the one-time acquisition of images and video, and the fixed nature of the production. The viewer is limited to whatever the videographer and photographer choose to include in the walk-through, in terms of subject matter, lighting, and perspective. The property may only be seen as is, and the viewer has to imagine what it might look like with different wall, floor, and window treatments, and with various arrangements of furnishings in various styles.

There is a need for methods and systems, which provide a customizable, 3-D virtual walk-through, where the viewer has control over what is viewed, how closely it is examined, and from what perspective it is viewed, may make alterations to colors and materials, and may view the property with a variety of decors and furnishings. There is also a need for methods and systems that permit the viewer to control both the artificial and natural lighting in a given scene, so that a room may be seen at different times of day at different times of the year. There is also a need for methods and systems of creating such customizable 3-D representations of properties in a rapid and economical manner.

Additionally, augmented and mixed reality technology are constantly evolving. The availability of rear-facing 3D depth cameras in smartphones and other devices will allow an unparalleled level of accuracy in adding, moving, removing, and manipulating virtual 3D objects on "camera views". A "Camera view" may be a single page within an app on a mobile phone that shows the space the camera is facing (that objects will be superimposed on top of), or a separate wearable technology that will allow new nodes (3D objects) to be added to the view. This technology is already revolutionizing furniture sales by allowing homeowners and renters a level of autonomy in decorating (or re-decorating) their spaces. To complement in person visits to local brick-and-mortar locations, the consumer (end-user of said app/technology) will be able to visualize different permutations of interior design components from the comfort of their homes.

Customizable, 3-D virtual environments may also be used by stores to bring the experience of shopping in-person into Virtual Reality environments and mediums. Swiftly generating these virtual environments, while updating their inventories and products in real-time, will help stores capitalize on a new medium of marketing and selling products that takes a step beyond traditional website product pages. This may help stores pursue omnichannel product marketing and sales, supplementing their in-person stores and traditional website (without a Virtual Reality element) with a new medium that allows users to "walk around" re-creations of real stores or completely fresh and customizable virtual stores.

SUMMARY OF THE INVENTION

The present invention simplifies the process of digitizing a 3D space (encoded as a custom file type, TXLD), automatically and intelligently adding objects into the encoded 3D space based on desired "style", and rendering the updated encoded space to a variety of mediums including but not limited to Virtual Reality, Augmented Reality, and Mixed Reality. The invention also facilitates the process of generating 3-D models of building interiors and exteriors using a combination of inputs, which include but are not limited to point clouds, 2D floor plans, and/or photos/videos. The invention provides a process and method of presenting 3D interactive virtual reality rendered condos, homes, townhouses, and other residential/commercial properties for the purposes of selling, renting, and renovating for both existing homes and newly built homes. Users may also view these renderings in alternative "styles"; renderings may also be fully personalized for each user. Products rendered in each scene will preferably be based on real products, including but not limited to furniture, decor, electronics, and lighting (both interior and exterior). Unlike prior art virtual tour and walkthrough technologies, the methods of the invention provide a platform and medium agnostic solution offering a high level of personalization and user interaction. Renderings will be compatible with augmented reality and mixed reality technologies. In these embodiments, objects encoded in each TXLD file will be overlaid on the camera view. In the case of mixed reality, users may interact with these objects as they would real objects.

A computer-implemented method of encoding, generating, and rendering a space (for the purposes of virtual home tours, virtual shopping, or other virtual experiences) using virtual reality, augmented reality, and mixed reality technology, comprising:

a) digitizing a floor plan of the building, if available;
b) digitizing a plurality of photographs or video still images of the interior of the building, the photographs showing elevation views of the interior;
c) digitizing point cloud data of the building (e.g. Lidar), paired with image data of the space;
d) converting the digitized space (encoded as a TXLD file) into a polygon mesh 3-D digital representation of the building;
e) creating and updating a new TXLD file unique to each specified "style" for the target space;
f) selecting digital representations for each specified "style" based on an ensemble recommendation system, where the digital representations are selected from the system's constantly growing and evolving 3D library of real products consisting of furniture, artwork, electrical switches, lighting, doors, windows, plumbing fixtures, and audio and audio-visual entertainment devices, and any other product types for both interiors and exteriors; and
g) placing selected digital representations into each style's TXLD file at the appropriate positions, with the appropriate rotations and sizes;
h) allowing users to optionally modify and customize the digitized space using a dedicated TXLD editor interface, as shown in FIGS. 7 and 8;
i) rendering the generated TXLD file on the target medium, whether it is virtual reality, augmented reality, or mixed reality;
j) providing to a user an interactive three-dimensional viewing mode for viewing the 3-D digital representation(s);
k) optionally, providing the user with an active mini-map of the property, with a real-time indication of the virtual location of the user on the property;
l) depending on the type of user using the system, providing the user with a collective view, in the form of a map, a list, or other suitable format, of nearby and/or similar properties;
m) optionally, providing the user with means to contact and/or make an offer to the listing agent or seller of the selected property;
n) providing the user with the ability to view the property from an overhead view;
o) presenting to the user all real products (of all categories) being rendered in the scene;
p) providing stores and/or brands with the ability to use the above process for the purposes of creating "virtual stores" which may be re-creations of real stores, or completely fresh virtual stores not based on real stores;
q) allowing stores and/or brands to customize their virtual store and update product inventories in real-time using an API, which will be reflected immediately to virtual shoppers using the system;
r) providing virtual shoppers with a personalized shopping experience while traversing "virtual stores", with virtual store layouts (and content) personalized for each user.

The computer system further enables the user, by employing controls provided by the viewing mode, to create the impression of moving through the 3-D representation and of optionally manipulating digital representations of the objects within the building interior. "Manipulating" includes but is not limited to adding new digital representations, removing digital representations, rotating digital representations, resizing digital representations, selecting alternate sizes or textures of said digital representations, and getting more detailed information about the digital representation (including external redirects to website(s) or other mediums). A variety of user types will also be able to register for the system, using it for the solutions they see best fit. These users and their interactions with the system will provide a variety of data points to the system, helping personalize product suggestions.

The invention further provides a computer configured to carry out the above method, and computer-readable media carrying computer code that, when executed, causes the computer to execute the above method.

BRIEF DESCRIPTION OF THE DRAWINGS

FIG. 5 is an exemplary text representation of the general TXLD File Structure (with variable types), with fields marked with their appropriate types.

FIG. 6 is an example of a TXLD file, with the fields filled in with example values.

FIG. 13 depicts an exemplary approach to generating 3D Model using TXLD FIleis pseudocode that explains how a TXLD file may be used to construct a 3D Model.

FIG. 14 depicts a continuation of the approach to generating 3D Model, this is a continuation of the pseudocode (from FIG. 13) that explains how a TXLD file may be used to construct a 3D model, with an emphasis on how edges and fixtures may be processed.

FIG. 15 depicts a continuation of the approach to generating 3D Model, this is a continuation of the pseudocode (from FIG. 14) that explains how a TXLD file may be used to construct a 3D model.

FIG. 16 depicts the UV Unwrapping process and storing references to the generated 3D model in the database.

FIG. 17 is a flowchart showing gathering (and optionally applying) textures and processing exterior view data and explaining how the system will gather textures and exterior views, using encoded information in the TXLD file. In some cases, textures may also be applied at this step, although textures may be set later in the process.

FIG. 19 is diagram of a high-level explanation of the probabilistic model to identify product types for target space, that will be used in early stages for the product selection and placement algorithm. Inputs include but are not limited to user, group, and style, as well as the target space encoded in the TXLD file.

FIG. 21 shows examples of priority lists of product types that will be used in the probabilistic model.

FIG. 24 depicts a stage with N different styles and M different times of day/weather conditions, how the system may iterate over N desired "styles" and M desired "times of day/weather conditions" to create multiple (N×M) TXLD files.

FIG. 27 illustrates how TXLD files may be stored.

FIG. 30 is a flow chart of the conversion of point cloud data into TXLD file, it illustrates how scenes may be exported and uploaded to cloud storage (with references to said files added to the database) and the methods that may be used to handle larger scenes for larger spaces.

FIG. 31 is a flow chart of video creation for each style and time of day/weather condition, scene, and illustrates the steps of uploading the created video to public video streaming sites or to cloud storage. In both cases, references to these videos are stored in the database. Preferably, there will be a video for each scene (or a larger video that features multiple scenes).

FIG. 32 is an "Outside-the-environment" data points (e.g. in the web browser—outside VR, AR, and MR mediums) table explaining interactions that may be tracked by the system to improve the user experience. The table also illustrates how these analytics may be quantified by the system for the purpose of improving the scene creation and product suggestion processes.

FIG. 33 is a VR, AR, and MR analytics table explaining "inside-the-environment" interactions that may be tracked by the system. These analytics are focused on interactions tracked within the VR, AR, and MR mediums and views.

FIG. 35 depicts an overview of the process of exploring a home as a prospective buyer or renter using virtual reality (one potential end-user).

FIG. 37 is a diagram summarizing the process of creating and deploying a "live" virtual store depicted in FIG. 36.

FIG. 39 illustrates how analytics and interaction scores may be stored by the system.

FIG. 42 depicts System API and Stack and illustrates how API (Application Programming Interface) will open up the system and a subset of its feature sets to developers (e.g. stores, agents, or any other type of user that may benefit from the system or its database)

DEFINITIONS

Figure 1:
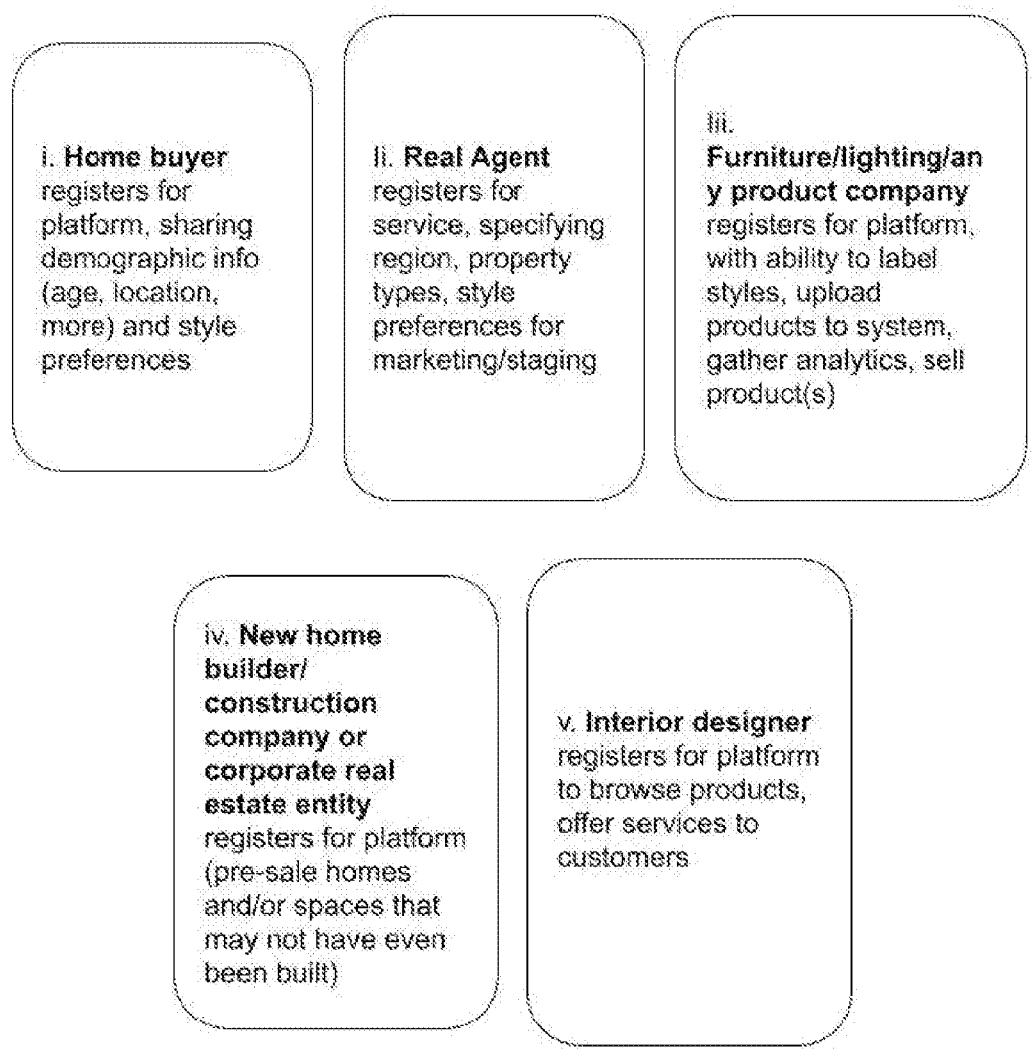
FIG. 1 is a diagram depicting different types of users that may register for the platform and the high-level fields that will be asked of each.

Virtual reality (VR): A fully artificial world in which you interact with virtual objects. When you interact with virtual reality, you are completely immersed in a digital environment.

Augmented Reality (AR): Virtual objects are added to the real world. In augmented reality, virtual information is overlaid on the real world, so the experience is not isn't completely immersive.

Mixed Reality (MR): Mixed reality technology allows real and virtual elements to interact with one another. The user is able to interact with virtual objects like they would in the real world. Mixed reality is connected to the real world and so it is not fully immersive.

Input photos and videos: Input photos and videos may be taken with any camera, including that of a smartphone. Input photos and videos are preferably labeled with room labels (e.g. kitchen, bathroom, dining room). Input photos and videos may also be gathered with other devices. When available, Lidar data will also be collected using available hardware.

Asset/object/products/digital representations: These terms will be used interchangeably. In all cases, these terms refer to 3-D models or digital representations, including all associated files (e.g. textures and texture maps), stored in the growing 3-D product library. They do not refer to a specific file type and may refer to objects that may be added to any medium (e.g. Augmented, Mixed, Virtual Reality). Each "object" may be a digital representation of a real product (with unique product identifiers and variants).

Growing 3D Product Library (or just Product Library): A library of 3-D models and digital representations (and all associated files, like textures) hosted in the cloud. The system's database will store links to all of the objects hosted in this library, making them easier to access and query.

Camera view: A "camera view" refers to the view seen on mobile apps or other hardware when the camera app (or equivalent alternative app) is opened. This is essentially what a user sees before they press the "take picture" button. This view may be customized to simplify gathering input data. For example, the user may be prompted to specify what room he/she is in at the time of taking a photo or video.

"Manipulate objects": In a Virtual, Mixed, or Augmented reality environment, "manipulate" refers to adding, removing, updating (altering product variant), re-sizing (selecting an alternate product size), rotating, moving (to a new position), and any other possible changes in a 3-D space.

Platform: Platform is used synonymously with "system". The platform is the full system, including but not limited to the system's database and cloud storage, the automation algorithms and infrastructure used to host them, medium specific applications, website, other interfaces used to render system generated scenes, and any other component of the system mentioned in this document.

Medium: A medium, for the purposes of this document, refers to the technology used to render TXLD files. For example, TXLD files may be deployed on hardware supporting the following mediums: Augmented Reality (AR), Mixed Reality (MR), and Virtual Reality (VR). Additional mediums may be added as the technology evolves.

User: A user who registers for the system. There will be a variety of user types, including but not limited to home buyers, real estate agents, construction companies, stores and brands, corporate real estate, and any other potential beneficiaries of the system.

External data: External data may refer to data collected from platforms and systems outside the scope of this document. Social media data, including each user's likes and dislikes, is just one example of external data that may enhance said user's experience in this system.

Style: Style is a high level term that will inform the product type and actual product selection for a given space. Style does not solely refer to high level descriptors like "Modern" or "Contemporary". It also includes styles that may be specific to one user, a grouping or collection of users, or other more nuanced styles that may be inferred by technology.

Platform Analytics and Usage: Analytics collected on any component or medium of the system (e.g. web, mobile, augmented or mixed reality, virtual reality). FIGS. 32, 33, and 39 explain these analytics in more detail. These analytics will help improve the user experience by suggesting products that fit each user, or group of users.

Digitization Process: "Digitize" for the purposes of this document will be defined as processing gathered data or input for the space and converting it into a TXLD file, explained in paragraph 127 below. Input types include floor plans (if available), images and/or videos, Lidar data, and/or other suitable image data.

Sphere or Cube for external views: Views of exteriors may be projected onto a sphere or cube to create an immersive and realistic exterior view.

Plane for exterior view: Planes may be used to create realistic and accurate exterior views looking outside of each window, door, skylight, or any other opening.

Digitized Floor plan: A TXLD file that was created using an image of a floor plan as an input.

Digitized Lidar Data: A TXLD file that was created using Lidar data captured using a 3-D depth camera. This Lidar data is supplemented with video and image data to capture fixtures and textures throughout the space.

Texture Map: Texture mapping refers to a graphic design procedure that involves a "texture map" (a 2-D surface) that is "wrapped around" a 3-D object. In this way, a three-dimensional object attains a surface texture that is similar to the surface texture of a two-dimensional surface. It is the digital equivalent of applying wallpaper, painting or covering any surface.

Mesh: A mesh defines the shape of an object. A 3-D model of a property or unique space will consist of multiple meshes, often separated by room.

Material, Shader, Texture: These terms may be unique to the software used to render scenes. In some embodiments, materials define how a surface should be rendered. This includes textures, tiling, and color information. Shaders may help compute colors of each pixel based on lighting and materials. Textures are bitmap images. Materials may contain references to textures.

UV Unwrapping: This is the 3D modeling process of projecting a 2D image to a 3D model's surface for texture mapping. This is a necessary process after we have generated the 3D model of the space.

TXLD file: A custom file system specific to this system. A TXLD file encodes a 3-D space, from its geometry to all of the digital representations, textures, lights, and other elements of the space. For a given unique space (e.g. address, or unit number), there may be several TXLD files.

The product selection and placement algorithm explained below creates new TXLD files specific to desired "styles" for a given space.

Interaction Methods (with platform): Interactions methods may vary by medium (e.g. AR, VR, MR). Users may add and "manipulate" objects. Users may also like specific products in the scene, request or view additional information about the product, click external links for the product. These interactions are expected to evolve as the system matures. Interactions also include all interaction types explained in FIGS. 32 and 33.

Augmented Reality view: Similar to camera view, but the view seen on hardware that supports augmented reality technology. This may be on a smartphone, specialized glasses, or any other hardware supporting this technology.

Mixed Reality view: Similar to augmented reality view above, but for hardware that supports mixed reality technology.

Lidar/depth data (and camera): Lidar is a method of measuring distances by illuminating the target with laser light and measuring the reflection with a sensor. Lidar produces point cloud datasets that may be stored, processed, and analyzed.

Computational geometry: A branch of computer science devoted to the study of algorithms that may be stated in terms of geometry.

Vertex/Vertices: Points in the (x, y, z) space. Vertices may have a context (e.g. a global coordinate space, or a relative coordinate space that refers to a local origin that is not the global origin of 0,0,0).

Triangles: Triangles are ordered lists of 3 points, where each point is a vertex. The order is significant because it determines which side of the triangle is outside versus which side is inside. This is often called the "normal".

Fixture vs Non-fixture: A "fixture" refers to all elements of a space that are built-ins and appliances. If someone sells a home and moves all of their things out, there are still elements of the property that remain in place. Examples include but are not limited to windows, doors, crown molding, lowered ceilings, half walls, breakfast bar, refrigerators, kitchen cabinets, bathtubs, sinks, fireplace, kitchen island, and pillars. Anything that is not a "fixture" is a separate product added to the scene (e.g. furniture, rugs, paintings, art, and products of any other type).

3D Model/Digital Representation: A 3-D model will be used interchangeably with digital representation. For the purposes of this system, a 3-D model is a digital representation of a product. File types may vary but a 3-D model's possible structure is explained in paragraph 124.

Direct Links: Some stores or brands may supply links to their products hosted on their own websites or on another marketplace. These are referred to as direct links.

Sparse 3D Library: Sparse 3D library refers to the possibility of the system having a large database of products, without the underlying 3D models for each of these products. For example, the system may crawl product catalogs online but will not immediately have 3D models for each product. Although some brands will supply 3D models to the system, it is likely that for some brands we have a database of products without their 3D models. This is the situation that a "sparse 3D library" refers to.

Realtime vs behind-the-scenes computation: Realtime computation refers to processing done immediately (after collecting inputs). This is often the case for users using the augmented and mixed reality mediums. Behind-the-scene computation refers to processing done before or some time after a user uploads input data to the system. The system may pre-generate scenes if it anticipates user(s) accessing these scenes in the future.

Seeding the system: "Seeding" at a high level refers to the fact that the system will not have a large amount of data to begin with. To train the product classification, product suggestion, and product placement algorithms, the system may be seeded with basic training data.

Convolutional Neural Network: A class of deep neural networks, most commonly applied to analyzing visual imagery. The system will use this to classify new products added to the system, generating product vectors (i.e., "a set of features that describe the product for classification").

Classification System: An algorithm to classify products in the system, or newly added products in the system. This will also be applied to identifying fixtures using image and/or video data.

Intelligent marketplace: An intelligent marketplace refers to the ability of the system to create personalized scenes on a variety of mediums based on analytics data.

User profile: A "user profile" represents the system's vector representation of a user. In the early stages, a profile might be made up of simple demographic, regional, and basic style preference information. However, as more and more usage data is collected by multiple users on the platform, more nuanced representations of a user's profile may be generated. This is especially helpful when suggesting products. Generation of the user vector is illustrated further in FIG. 26, which addresses collaborative filtering.

Platform agnostic/medium agnostic: The system is described as platform and medium agnostic. These terms will be used interchangeably to imply that TXLD files may be rendered to any medium (e.g. VR, AR, MR, WebGL, etc.) and that all products and digital representations that make up the growing 3D product library are compatible with all mediums (e.g. VR, AR, MR, Web, etc.).

Auto-stage: Auto-stage refers to the ability of the system to take a TXLD file as input, and to populate this TXLD file with products based on a specified "style".

Favorite: Users will have the ability to favorite products in the system.

Product suggestion and placement algorithm: This broadly refers to the ensemble product suggestion and placement algorithm illustrated in FIG. 18.

3D Model format standardization (platform agnostic): This refers to the system's standard of all digital representations of products being compatible with different mediums (e.g. AR, VR, MR, WebGL, etc.).

WebGL: A Javascript API for rendering interactive 3D graphics. This is a medium through which a scene may be rendered. For the purposes of this system, WebGL will be equated with VR.

Personalization: Personalization simply refers to the fact that the system is designed to provide personalized product suggestions, taking into account external data and/or data inferred based on platform usage.

"Outside the environment" analytics: Analytics within the web browser or at a layer above the 3D content (i.e. a layer above the AR, VR, and MR views).

VR+MR+Augmented reality analytics: Analytics collected inside the AR, VR, and MR views. FIG. 33 explains some of these analytics and how they may be quantified by the system. Every user will have a cumulative score of all interactions with each product based on the scores above. Individual interactions will be stored as data points as well as the database. A possible approach to storage is illustrated in FIG. 39.

Environment: Either a custom graphics engine or an engine similar to those used in video game development.

Unique space: A "unique space", as its name implies, simply refers to a unique identifier for a space. For homes, this may be an address. For stores, it may also be an address. For workplaces, although there may not be an address (in the case of a virtual workplace), the company may provide a unique method of identifying this "office". This could be based on region, division of company, or any other unique descriptor. Each "unique space" will be backed by a base TXLD file which will be customized for different users or "styles".

Scene: A scene may broadly be defined as a container of all objects for each "unique space"

'The Space'/Target space: These terms refer to the unique space encoded by the TXLD file being processed by the system.

Interior design principles: High level principles of interior design including but not limited to balance, rhythm, harmony, emphasis, and proportion and scale. These may be used to inform the placement algorithm, as well as the product type selection for a target space.

Product dependency trees: See FIG. 23. Product dependency trees help the probabilistic model select product types for a space. Certain products are often accompanied by other products. These product dependency trees quantify this but do so with an element of randomness (as opposed to being deterministic).

Relative placement trees: See FIG. 41. Relative placement trees help place products relative to other products. For example, nightstands are frequently placed on the backside of the bed on each side. On a deeper level, both nightstands often have lamps on top of them. One nightstand often has an alarm clock on top of it. These relative placements are quantified in relative placement trees.

DETAILED DESCRIPTION OF THE INVENTION

The present invention simplifies the process of digitizing a 3D space (encoded as a custom file type, TXLD), automatically and intelligently adding objects into the encoded 3D space based on desired "style", and rendering the updated encoded space to a variety of mediums including but not limited to Virtual Reality, Augmented Reality, and Mixed Reality. The invention also facilitates the process of generating 3-D models of building interiors and exteriors using a combination of inputs, which include but are not limited to point clouds, 2D floor plans, and/or photos/videos. The invention provides a process and method of presenting 3D interactive virtual reality rendered condos, homes, townhouses, and other residential/commercial properties for the purposes of selling, renting, and renovating for both existing homes and newly built homes. Users may also view these renderings in alternative "styles"; renderings may also be fully personalized for each user. Products rendered in each scene will preferably be based on real products, including but not limited to furniture, decor, electronics, and lighting (both interior and exterior). Unlike prior art virtual tour and walkthrough technologies, the methods of the invention provide a platform and medium agnostic solution offering a high level of personalization and user interaction. Renderings will be compatible with augmented reality and mixed reality technologies. In these embodiments, objects encoded in each TXLD file will be overlaid on the AR and MR camera views. In the case of mixed reality, users may interact with these objects as they would real world objects.

In certain embodiments, the viewing mode enables the user to view representations of the building at different times of day, in varying seasons, and in varying weather conditions; to choose between a first-person view and a third-party view of an avatar, whose motions are under the buyer's control; and to toggle among views of a variety of interior treatments. The interior treatments include but are not limited to lighting, wall colors, flooring materials, floor coverings, countertop materials, colors and styles of cabinets, appliance models and styles, window treatments, door treatments, millwork, and furniture.

The invention also provides a computer system for providing a virtual tour of a building, comprising a central processing unit, a graphics processing unit, computer-readable memory, and computer-readable storage within which is stored a polygon mesh 3-D digital representation of a building prepared as described above. The computer system is adapted to provide a user with the interactive three-dimensional viewing modes described above. The computer-readable storage further stores computer-readable files and software that adapt the system to enable the user to view representations of the building at different times of day, in varying seasons, and in varying weather conditions; to choose between a first-person view and a third-party view of an avatar whose motions are under the buyer's control; and to toggle among views of the interior treatment alternatives described above.

The invention further provides non-transitory computer readable media storing computer code that, when executed on a computer, adapts the computer to carry out the steps of the steps of digitizing a floor plan of the building, digitizing a plurality of photographs or video still images of the interior of the building where the photographs show elevation views of the interior, and/or digitizing 3-D depth data; converting the digitized floor plan, digitized photographs, and/or digitized 3-D depth data into a polygon mesh 3-D digital representation of the building; inserting into the 3-D digital representation digital representations of objects within the building interior; and providing a user with an interactive three-dimensional viewing mode for viewing the 3-D digital representation, wherein the user, by employing controls provided by the viewing mode, is enabled to create the impression of moving through the 3-D representation and of manipulating the digital representations of the objects within the building interior.

In preferred embodiments, the non-transitory computer readable media also stores computer code that adapts the computer to enable the user to view representations of the building at different times of day, in varying seasons, and in varying weather conditions; to choose between a first-person view and a third-party view of an avatar whose motions are under the buyer's control; and to toggle among views of a variety of interior treatments, as described above.

The method of the invention provides for an automatic, computer-implemented method of generating full 3-D renderings of the interior and exterior spaces of a commercial or residential building from a TXLD file (custom file format encoding a 3D space), which is generated using images and/or videos, 3-D image data, 2D floor plans, and/or other suitable data describing the space as input. If a sufficiently detailed floor plan is not available, e.g. from the architect or builder, it is routine in the art to render one from measurements made on site. The system of the invention uses a combination of the floor plans, images, and data captured from a 3D depth camera to create a full 3D virtual rendering of the property. In addition to photographic images, architectural elevation views may be used to provide accurate values for such elements as countertop, window, and ceiling heights. Numerical values and dimensions may be input manually in the TXLD editor UI (FIGS. 7 and 8) based upon review of the floor plans, elevations, photographs, and 3D depth camera data, but it is preferred that an automated, software-based process is used to derive and infer as much of this data as possible, followed by subsequent human review and correction. The software is programmed with a knowledge of the industry-standard language architectural drawings. Known methods of producing 3-D representations from floor plans and elevation images may be employed, for example that of C. Liu et al., "Rent3D: Floor-plan priors for monocular layout estimation," 2015 IEEE Conference on Computer Vision and Pattern Recognition (CVPR), Boston, Mass., 2015, pp. 3413-3421.

Figure 10:
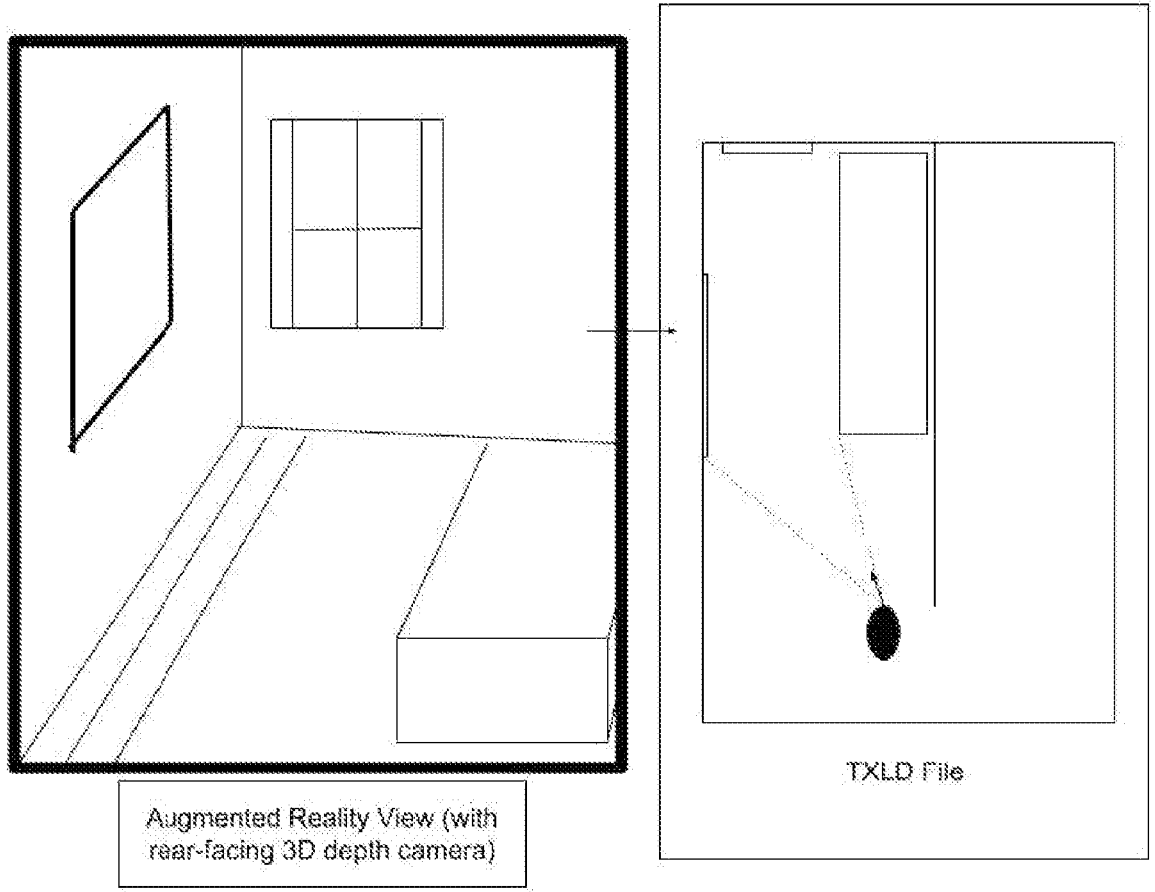
FIG. 10 is a diagram of the process of converting of point cloud data into TXLD file, explains how point clouds (e.g. Lidar) data may be used to generate TXLD files

Optionally, rooms may be imaged with a laser scanner or 3-D camera. These instruments, when placed inside a room, create a "raw point cloud", a data file consisting of the coordinates of specific points where the laser beam encountered a surface. The point cloud may be converted to a 3-D rendering of the room and its contents. See I. Armeni et al., "3D Semantic Parsing of Large-Scale Indoor Spaces," 2016 IEEE Conference on Computer Vision and Pattern Recognition (CVPR), Las Vegas, N V, 2016, pp. 1534-1543. For the purposes of this invention, the data collected by the 3-D depth camera will be converted into a TXLD file that encodes the space, as shown in FIG. 10.

The system will be powered by a platform that allows users to register for the service. The database of users may be stored in the cloud or other storage medium. A "user" may be defined as an agent, builder, prospective home buyer, furniture company or other user type that may become part of the platform, as shown in FIG. 1. When a user registers for the platform, basic demographic information may optionally be collected, including but not limited to age, zip code, region, marital status, and affordability. External data from social media sites may also be employed to learn more about the user, including likes, dislikes, hobbies, interests, and more. Additionally, users' style preferences may be collected on the platform; initially, a "photo-based style quiz" or a similar simple approach may be taken to get basic style preference information. However, over time, platform analytics and usage will be used to deliver as personalized of an experience as possible. Different user types will be asked different questions to maximize each user type's value on the platform. For example, a home buyer may be asked questions about region, budget, style preferences, and other information that would help in the personalization process. A furniture (or other product) store may be asked questions about product catalogs, product links, region, pricing, trends among prior customers, and local availability among others. Additional user types may be added to broaden the value of the invention.

Figure 12:
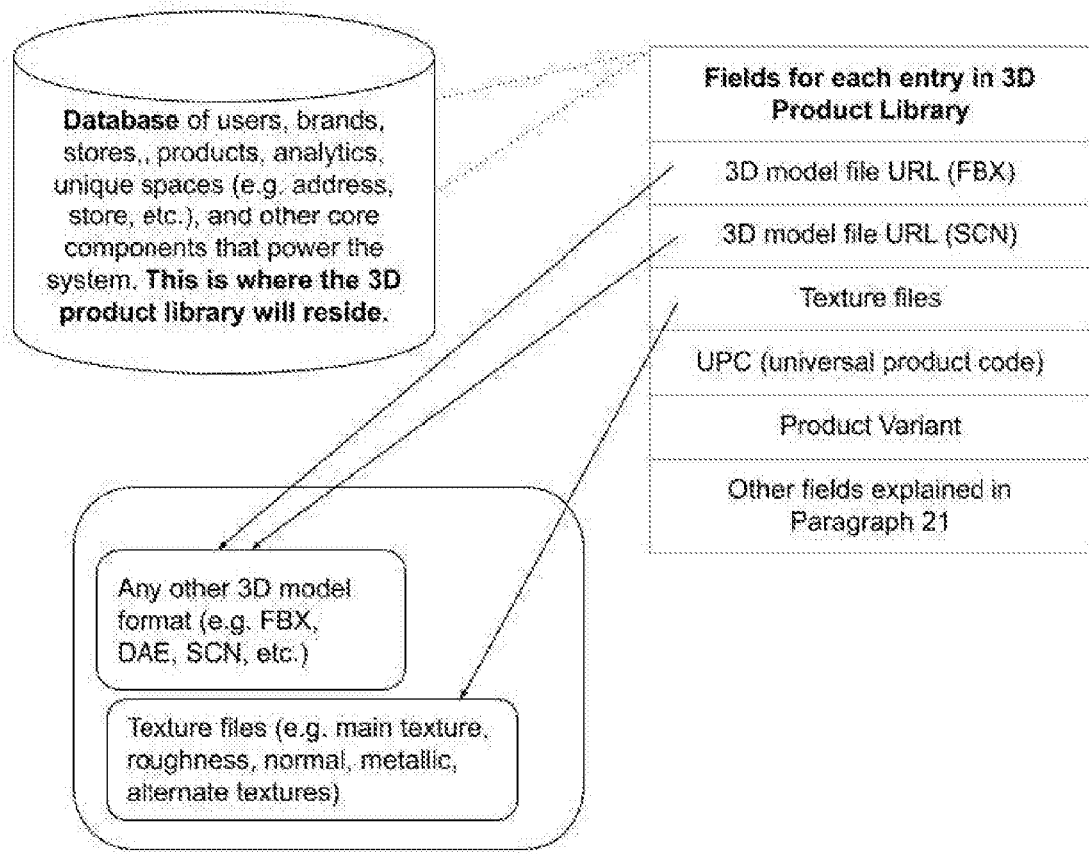
FIG. 12 shows the growing 3D Product Library and Database, which is part of the database. It also shows how each entry in this product library may reference files stored in separate cloud storage (or alternate containers). It also explains that generated 3D models for TXLD files may be linked to (for each unique space) using a similar approach.

Although the 3D product library lives in the database, all actual 3D model files (and all associated requisite files, regardless of the deployment medium) may be stored separately using cloud storage or alternative storage technology. In this case, the database will store references to these separately stored files for quick and easy access. The database itself may also reside in the cloud. Additionally, each unique space (with its base TXLD file) may similarly reference the generated 3D model in the method illustrated in FIG. 12. For example, for "123 Way" (a unique address), the 3D model generated by its TXLD file may be stored using cloud storage and referenced by this address' database entry.

An ever-growing 3D library of products will supply a growing number of "platform agnostic" objects to the system that will be flexible and easy to distribute. For the remainder of this document "products", used interchangeably with "objects", include both fixtures and non-fixtures. Each digital representation of both assets (non-fixtures) and fixtures are tagged with identifiers (names, styles, manufacturer, UPC codes, tag(s), categorie(s), and additional product information) to enable quick and easy retrieval and library management. The 3D model itself may be stored using a Cloud storage service or alternate storage mechanism. A link or reference to its location will be associated with each product in this 3D Library. It is expected that manufacturers and vendors of home furnishings will provide high resolution images, or even 3-D models of their products, in order to get exposure to home buyers at the earliest opportunity. The software, optionally with human intervention, will facilitate the creation of 3-D models for each of these products. The system may optionally provide the user with direct links to the vendors of the displayed finishes and furnishings, present discount offers, and otherwise promote and facilitate commercial transactions that are separate from the property transaction under consideration. The rapid addition and creation of 3D models either crawled online or acquired/created in collaboration with furniture/art/other product companies via partnership will power this growing library.

Each entry in the 3D library of products, may optionally be structured as follows (likely to adapt based on evolving trends in the 3D modeling space):

1. FBX File (geometry and basic single material texture)
2. Texture files
   a. Main texture
   b. Alternate colors
   c. Roughness
   d. Metallic
   e. Normal
   f. Occlusion
3. DAE/OBJ file
4. SCN File (converted from DAE with textures added)
5. Future file types that may handle textures more optimally or make the 3D model quality and management better
6. UPC code identifying the product
7. Product variant (color, texture, and alternate options of the product)
8. Size information (products may come in different sizes)
9. Brand name
10. Room (living room, kitchen, etc.)
11. Product type (chair, bed, painting, electronics, cabinets, etc.)
12. Style tags (#modern, #contemporary, #gamer, etc.)
13. Description
14. Inventory information for each region/store/area
15. Additional fields that may be added as 3D model formats evolve Independent of the products stored in the library, textures may be stored individually even if they are not all associated with a specific product. The 3D models, texture files, and any supplementary files referenced above may be created with a variety of software and may be further automated and validated.

Figure 3:
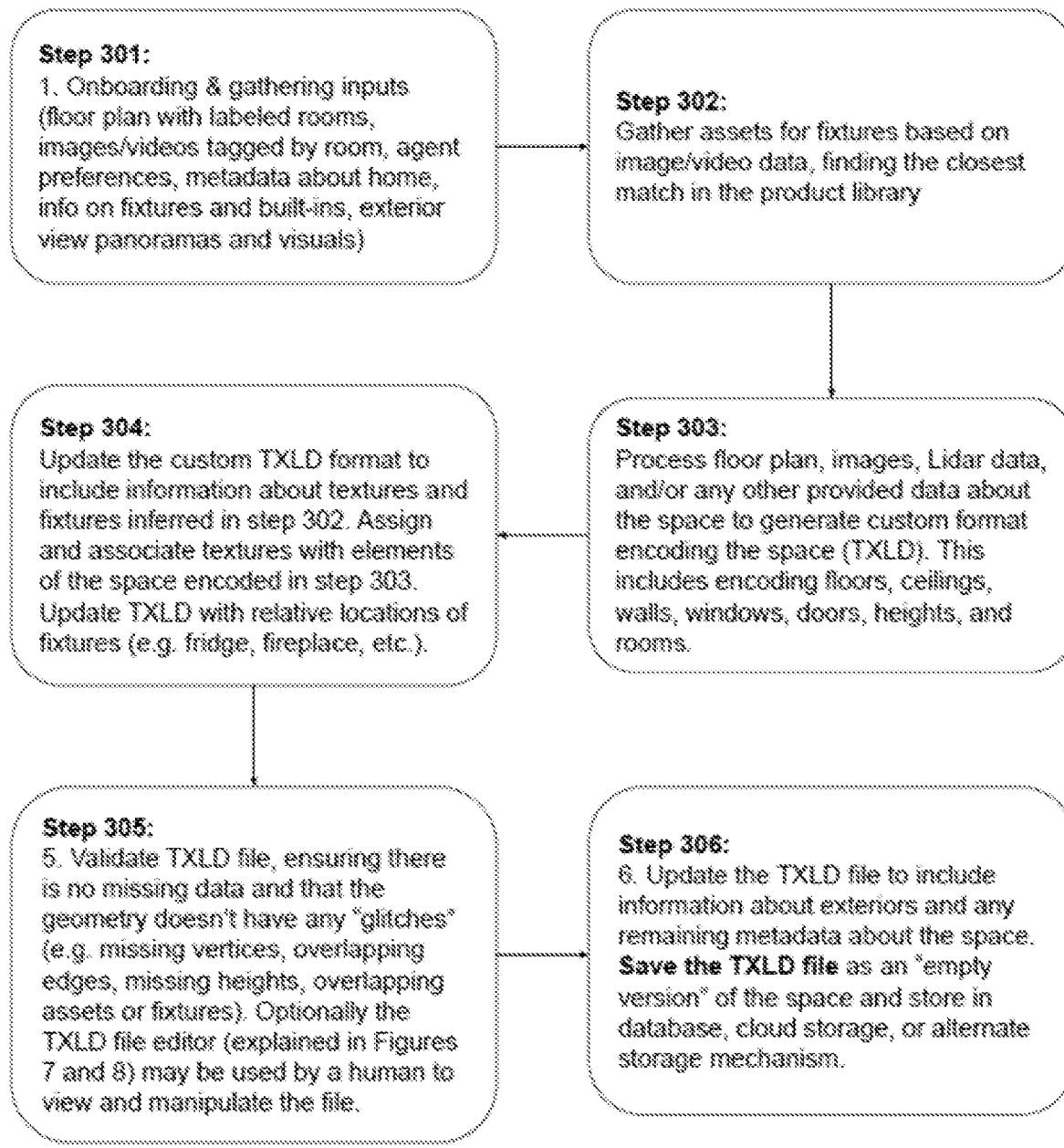
FIG. 3 is a flowchart showing overview of the process by which user provided input is used to generate and save preliminary/intermediary TXLD Files (the system's custom file format used to encode a space).

Turning to FIG. 3, at 301, we gather all inputs needed to "digitize" the space into a TXLD file. "Digitize" for the purposes of this document will be defined as processing gathered data or input for the space and converting it into a TXLD file. Input types include floor plans (if available), images and/or videos, 3-D image data, and/or other suitable image data.

Figure 9:
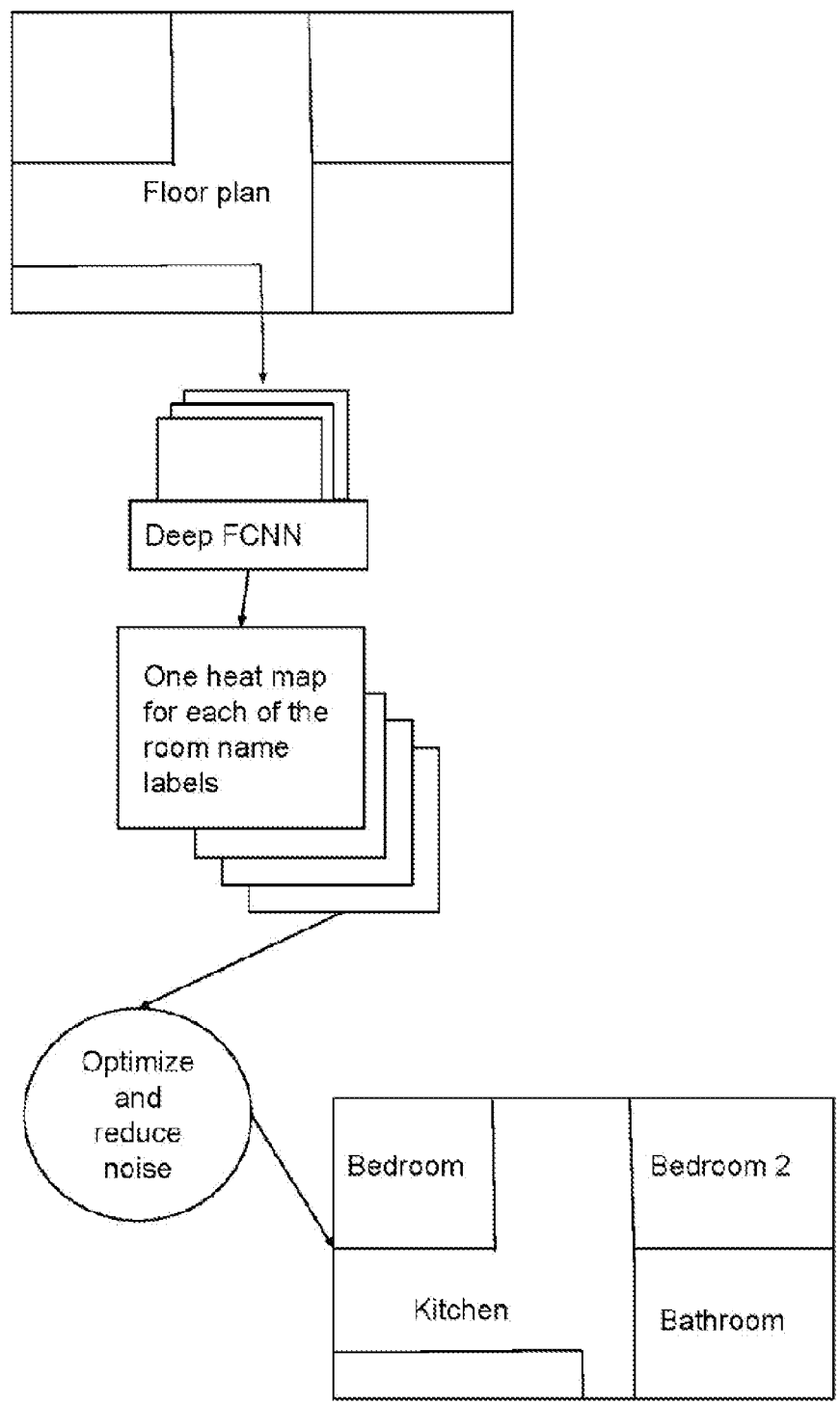
FIG. 9 is a diagram of generation of TXLD file using floor plan, the diagram explains how 2D floor plans may be digitized into TXLD Files

If the user is able to provide a floor plan, in order to enable the automated input of the 2-D information, the floor plan is first inspected to ensure that it meets the requirements for input to the computerized system, and any needed corrections are applied. All edges should be captured, and the floor plan should be fully drawn to scale. Ideally, each room should be labeled (kitchen, bedroom, etc.) and window and door sections should be marked with different textures on the edges. The ceiling height for each room should be marked, or a standard ceiling height for the entire structure may be specified, with individual deviations from the standard height being noted. Preferably, window and door dimensions, including sill height, are indicated. If this level of detail is not available, the system will attempt to infer rooms, as shown in FIG. 9.

Photographic images of the property are obtained, both from still photographs and from video still images. A video walkthrough of the entire property, preferably starting at the entrance, is obtained. Each room is preferably captured in its entirety with a 360° sweep, and all fixtures that will be part of the property as sold or rented are examined in detail in the video. For example, closeups are obtained in the kitchen of all fixtures, cabinets, countertops and appliances. Architectural details such as fireplaces, stairs, railings, doors, windows, moldings, and floor materials and transitions are also captured in close-up video.

Still photographs are obtained in each room, annotated to identify the room and the orientation of the camera. Preferably, a tilt-shift lens, or post-imaging perspective correction, are used in order to keep lines straight and parallel in the images. This will help avoid measurement errors in the computerized image analysis of the photographs. All windows and fixtures are captured so that the photographs will show relative sizes and locations. Ordinarily, a minimum of 2-3 still images are obtained per room, along with one or two still images of closet interiors.

Still and video images are preferably obtained around the exterior of the property as well. All sides of the building, and the yards, are photographed, again with notations of location and orientation. The geographical orientation of the property is recorded, as this may inform the modeling of illumination by sunlight.

The previous steps in paragraphs 129 and 130 may be conducted using a 3-D depth camera. In this case, the digitization process may be conducted without the user providing a floor plan as input. Floor plans are not always readily available, and with 3-D depth cameras becoming more and more ubiquitous, this makes the data acquisition process much easier for the user. In this case, image and video data of the space will be paired with point cloud data as part of the digitization process.

Depending on the medium used by the user to both gather data and render the space, a specialized process will be utilized to digitize collected inputs. This includes both real-time digitization (in the case of Augmented Reality) and non real-time digitization (in the case of Virtual Reality). In Augmented Reality, a user may have a camera view open and we may need to digitize the space immediately so we may add objects to it and interact with the space. Alternatively, a user may simply use the camera view to collect data that may be processed afterwards (not necessarily real-time); this data may be a collection of photos or videos of the space and point cloud(s) of the space captured on a 3D depth camera. The data used in the digitization are preferably tagged with identifiers, including but not limited to the room in which the photograph or still image or point cloud was obtained, the location in the room from which the photograph or still image or point cloud was obtained, the geographic coordinates of the location at which the photograph or still image or point cloud was obtained, the time of day at which at which the photograph or still image or point cloud was obtained, and the date on which the photograph or still image or point cloud was obtained. The direction the unit faces may also be specified here. These identifiers assist the software in carrying out the digitization process. Smartphones will soon feature rear-facing 3D depth cameras, allowing user input to be more and more informative. Point cloud data (e.g. Lidar), paired with image and video data captured, will allow the digitization process to occur without the user of a floor plan, explained in FIGS. 10 and 11.

There are two major specialized processes for digitization (Step 303 in FIG. 3). If we input both a floor plan and images/videos of the space, we may follow the process explained in paragraphs 133 and 134. If, however, we have data from a 3-D depth camera, the system may digitize the space without a floor plan. This process is explained at a high level in paragraph 136. Both processes will produce a TXLD file as output.

If the user provides the system with a floor plan and images/videos of the space, we will use computer vision to process the floor plan and images/videos provided. As seen in FIG. 9, semantic segmentation will first run, which will label every pixel with a room name (or floor number). Then an optimizer may be run to ensure all blocks are contiguous, ensuring all lines are reasonably straight with minimal noise. The system may also rely on heuristics to help identify and classify each pixel. Examples include the fact that edges are straight, although sometimes curved. We may additionally assume that contiguous pixels must always be in the same room (until the edges). Some rooms are also more likely to be adjacent to certain rooms. We may further ensure that the number of each type of room makes sense. This may take into account demographic information of the user. We may infer the coordinates of each edge (to scale) and the room it is a part of, based on the combination of semantic segmentation and the heuristics above. Knowledge of the length of one specific edge in the image will help generate coordinates to scale for the whole floor plan. These coordinates and processed edges will be converted into TXLD files encoding the space. Next, images and videos will be used to identify fixtures in the space (e.g. appliances, built-in cabinets, fireplace, kitchen island, etc). We may then apply object detection and add these fixtures (and their size, position, rotation) to the TXLD file. This process will not be perfect, and so 3-D image data will be preferable for this digitization process. The detected fixtures will then be mapped to products or assets in the 3D product library (Step 302 in FIG. 3). This includes textures for all surfaces, which will be searched for in the 3D library. At Step 304 in FIG. 3, these fixtures and textures are associated with their respective elements. At 305, a validation is carried out to ensure that the floor plan has been accurately processed, and any needed corrections are applied. The output of this process will be a TXLD file, storing the hierarchy of the space, including all edges, fixtures, and room information.

To augment the processed floor plan, videos and still images are analyzed to detect the sizes, proportions, and relative positions of elements that were not established during the floor plan digitization. Information about sill heights and dimensions of windows and doors, countertop heights, non-standard or varying ceiling heights, and raised floors is extracted from the image and (if available) Lidar data. This data is stored in the TXLD file. The software will highlight any problem areas that might derive from surfaces meeting at unconventional)(non-90° angles or stepped floors and ceilings. The result is a digitized space stored in a TXLD file.

Figure 11:
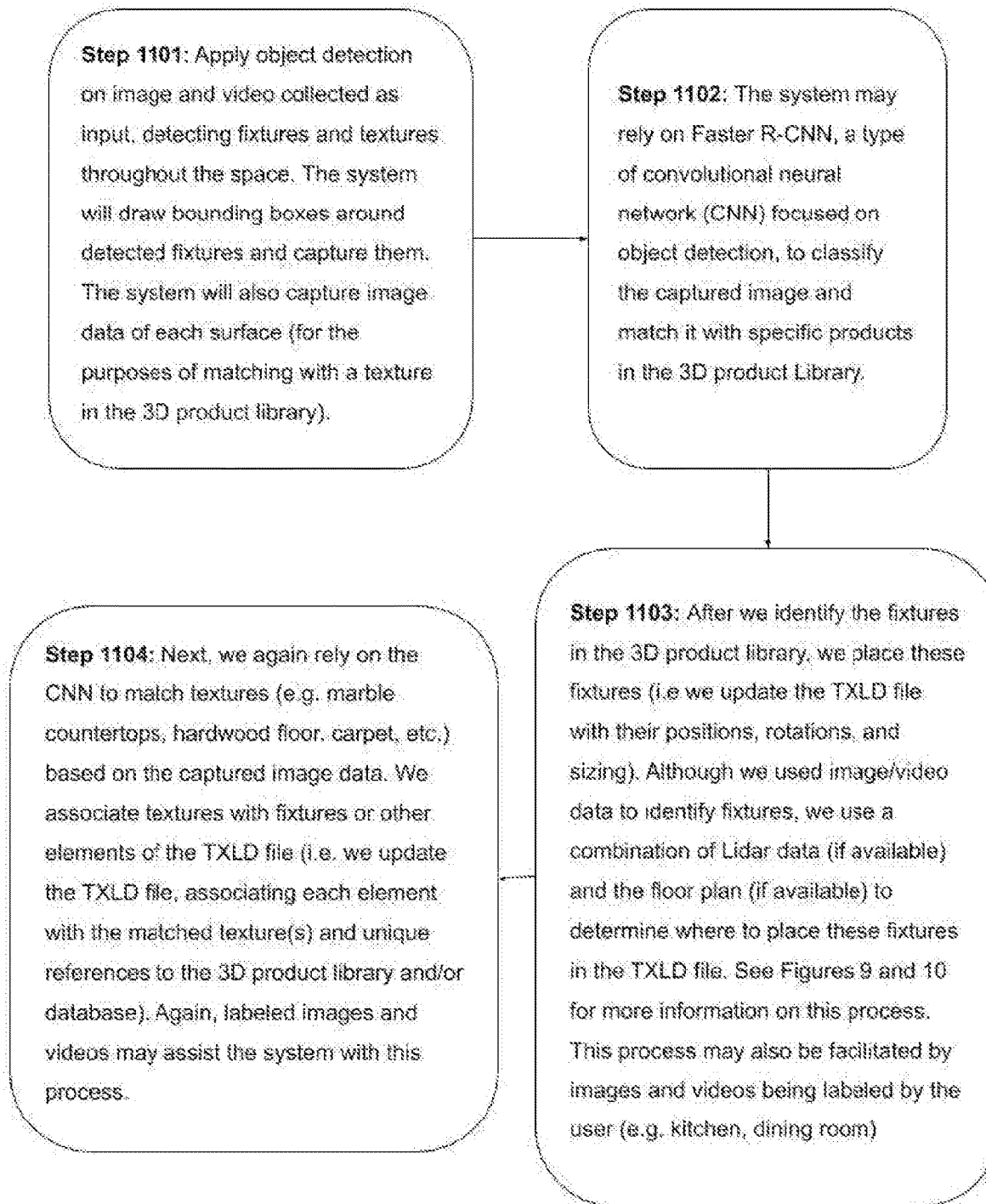
FIG. 11 is a diagram showing the mapping of fixtures and textures in TXLF file using inputs, it explains how object detection may be used to detect fixtures using photo/video data, how these fixtures may be searched for in the 3D product library, and how they may be added to TXLD files. It also explains how textures may be searched for and added to TXLD files for the appropriate surfaces.

If, however, the system is provided with Lidar data (point cloud) and labeled photos/images of the space, we may use this data (without a floor plan) to digitize the space into a TXLD file. This approach may also be used in real-time, and when possible will run on the hardware rendering the space. First, using the Lidar data, we may use RANSAC to capture planes like walls, ceilings, floors; this will provide the system with edges and vertices for each room. Next, based on the user's input specifying what room the user is in while this data is captured, the system will label edges and vertices accordingly. If no labels are provided by the user, the system will attempt to infer the room by identifying fixtures (e.g. if a stove is detected, it is likely a kitchen). Different classification schemes may be used to match fixtures, textures, and other elements of the home with products and textures in the 3D library. One possible approach is Faster R-CNN which will speed up this matching process. The position of each detected fixture will be encoded into the TXLD file, along with data captured in previous steps. Assets that are not part of the property (non-fixtures) are identified and preferably omitted from the model. The A.I. components of the software will rely on the library of virtual assets to recognize, e.g., chairs, tables, beds and the like, and at the validation step it will learn from any errors made. This process is illustrated in FIG. 11.

Exterior views from windows and doors, as well as from the rest of the lot/space may optionally be gathered using a variety of cameras. These cameras include but are not limited to: smartphone cameras, omnidirectional (360-degree) cameras, 3-D depth cameras, and fisheye cameras. A fisheye distortion may be applied to get a wider angle and range of view. Although the methodology for acquiring the necessary exterior photos will vary based on the camera and technology available, one method of acquiring photos may involve taking six photos from different angles: left, front, back, right, up, and down. These photos may be used to construct a sphere or cube to create a photorealistic exterior view. One manifestation of this may be a skybox, although the terminology may vary. Images may also be used to construct a plane that will render the exterior views. A plane may not be as immersive but offers a solution that does not depend on 360 cameras or expensive technology. As easy access to 3-D depth cameras grows, the methods of gathering exterior data may be adapted. Drones may also be used to facilitate data acquisition. These inputs for the exterior will be processed and encoded in the TXLD file. Exterior view inputs (panorama, 360 camera, 3-D depth camera data, etc.) will be uploaded to cloud storage and associated with the property or unique space appropriately. In some cases, these inputs files will be associated with specific fixtures (e.g. windows, doors, skylights), while in other cases, the input files will be associated with the property or unique space as a whole (e.g. skybox in the case of inputs being immersive 360 views).

The output of this digitization process, using all user provided inputs, will be a TXLD file. For a given space, whether the TXLD file is generated using floor plans, photographs/videos/scans, 3-D depth cameras, or architectural or engineering elevation views, the generated TXLD file will be the "source of truth" for the "space." Space broadly refers to a unique space (e.g. a building, home, condo, collection of rooms, lounge, patio, "virtual store", "virtual workplace") and may include a hybrid of both interiors and exteriors.

The generated TXLD file for a given space will be used to generate a polygon mesh 3-D digital representation of the "space." But before that, the TXLD representation of the "canvas", or fully-emptied space with only fixtures and built-ins, will be saved in the database for this space (Step 306 in FIG. 3). It will be associated in the database with an address, set of coordinates, or other unique identifier for a space.

Figure 4:
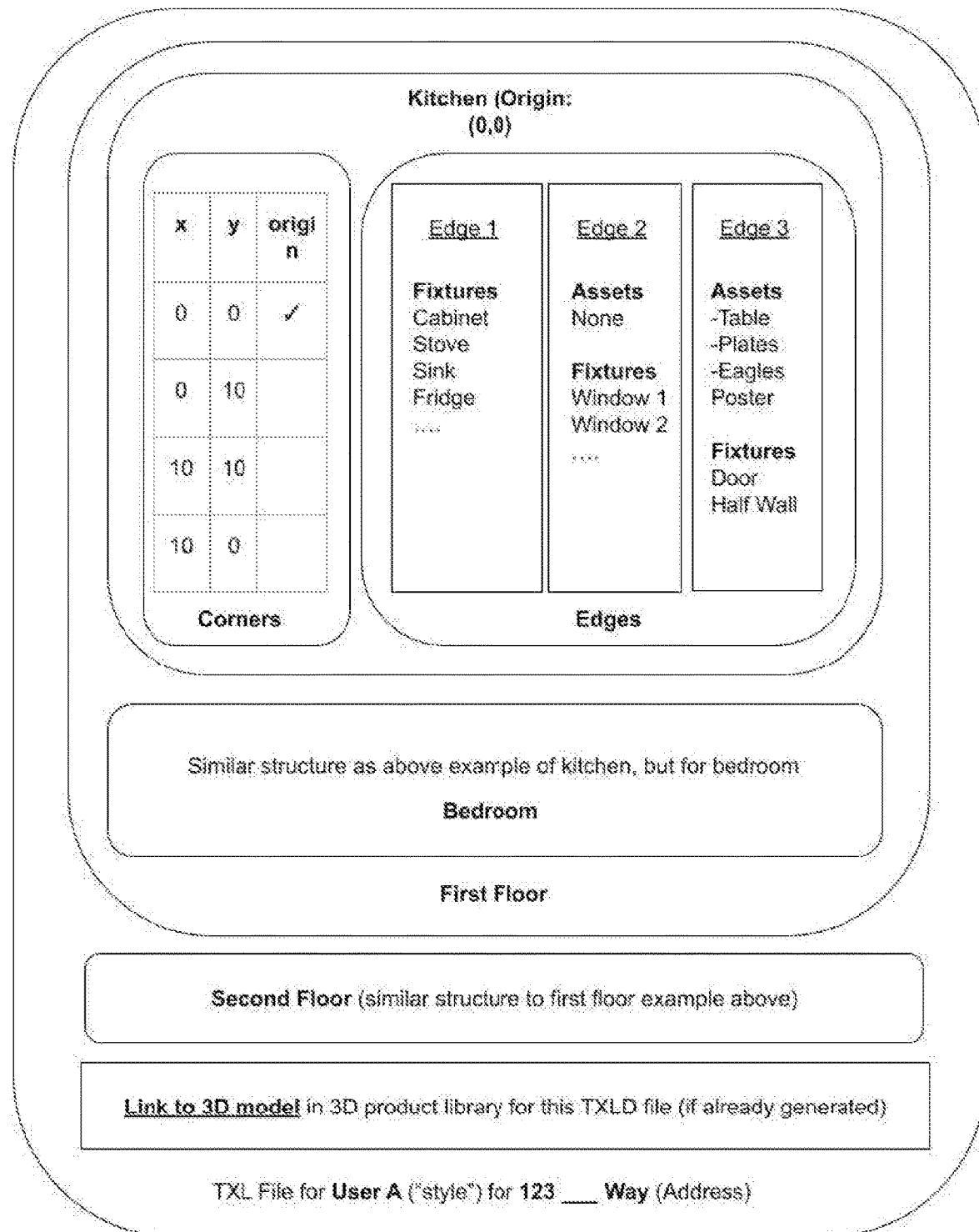
FIG. 4 is a graphical explanation of the TXLD graphic file and its general structure.

TXLD is a custom file format of the system that will be used throughout this document. Simply put, a TXLD file encodes a 3D space and everything in it. FIGS. 3-6 explain the TXLD file in more detail. In FIG. 3, steps 301 to 306 explain the high level process by which user inputs (labeled floor plans, images/videos, 3D photography, or other image data) may be used to generate this TXLD file. FIG. 4 is a graphical explanation of the TXLD file. In the example shown, every space is a hierarchy with deeper and deeper layers of data. At the outermost level, the figure shows the whole space. Within that space, there are floors—or in the case of this example, just the "first floor". Within each floor, there are "subspaces" like the Kitchen or the Bedroom. Within each subspace, we have all of the edges for that subspace (functionally, walls), floor info (including its corners), and ceiling info (including its corners). The floor corners shown for the kitchen label one of the corners as the "origin". When referencing objects or assets within the kitchen, this "origin" will be the point of reference used. Within each edge, data related to fixtures, lights, and assets, including their relative positions to that edge and to the "origin", will be encoded. Within each edge, fixture data includes but is not limited to windows doors, and crown molding. The TXLD file may also contain a link to the 3D model generated based on the data encoded in itself. This link may link to cloud storage, which may have an authentication system equipped to ensure only users with sufficient permissions are able to access this file. If the 3D model has not yet been generated, this field will be blank in the TXLD file.

FIGS. 5 and 6 are text representations of an TXLD file. The file format loosely resembles an XML file with its hierarchy and node-specific attributes. In FIG. 5, we see an example file with values replaced with their types. For example, the length of an edge is encoded as a "float" type, while the unique identifier for the edge is a String key. Additionally, assets and fixtures deeper in the hierarchy reference "assetIDs", represented as Strings, which reference objects in the 3D product library (database). Coordinates and other numeric inputs are also stored using the "float" type.

FIG. 6 is a TXLD file with the values filled in with example values. In this example, We have a first floor that contains a living room. Within that living room, we have four edges. The first edge represents a wall that is 10 m long, and has id "0OpM102f". It has source coordinates of (0, 0) and destination coordinates of (0, 100). The origin in this case is (0, 0) so all inner objects will be positioned according to either this origin or based on spacing from the associated edge. This first edge contains a "Cobra Kai Poster" with a "Dark Background" that is 1 meter away from the source (0, 0) along the edge, and 1.5 meter(s) high off the ground. Also, it has a 0 degree rotation with respect to the edge and is flat against the wall ("spacing_from_edge" is 0 m). Effectively, the poster's bottom left corner is positioned at (0 m, 1 m, 1.5 m). Important to note that the 1 meter away from the source may be a diagonal and not straight up, like in this example. In this case, the x and y coordinate would both be computed along the edge. This edge also has a "Sony Bravia HDTV 60 inch" that is "Black". It is positioned 2 meters from the source of the edge and is 2.3 meters off the ground. It has a 0 degree rotation with respect to the edge and is placed flat against the wall ("spacing_from_edge" field). In this case, the bottom left corner of the TV is positioned at (0 m, 2 m, 2.3 m). If spacing_from_edge was 0.1 in this case, the bottom left corner of the TV would be at (0.1 m, 2 m, 2.3 m), but of course that would not make sense in this example since the TV would then be floating (0.1 m away from the wall). The second edge with source point (0,100) and destination point (50, 100) has assets for the CB2 Modern L-Sectional Sofa and the Crate and Barrel Modern Vase. In this case, the Modern L-Sectional Sofa is placed 0.1 m away from the edge (wall) and is 2 m along the edge and flat on the ground (z_pos=0). It has a rotation of 0 degrees with respect to the wall—in effect, it is pointing away from the wall. The back left coordinate for this sofa (this is the point closest to the source and wall), is (2 m, 99.9 m, 0 m).

Figure 7:
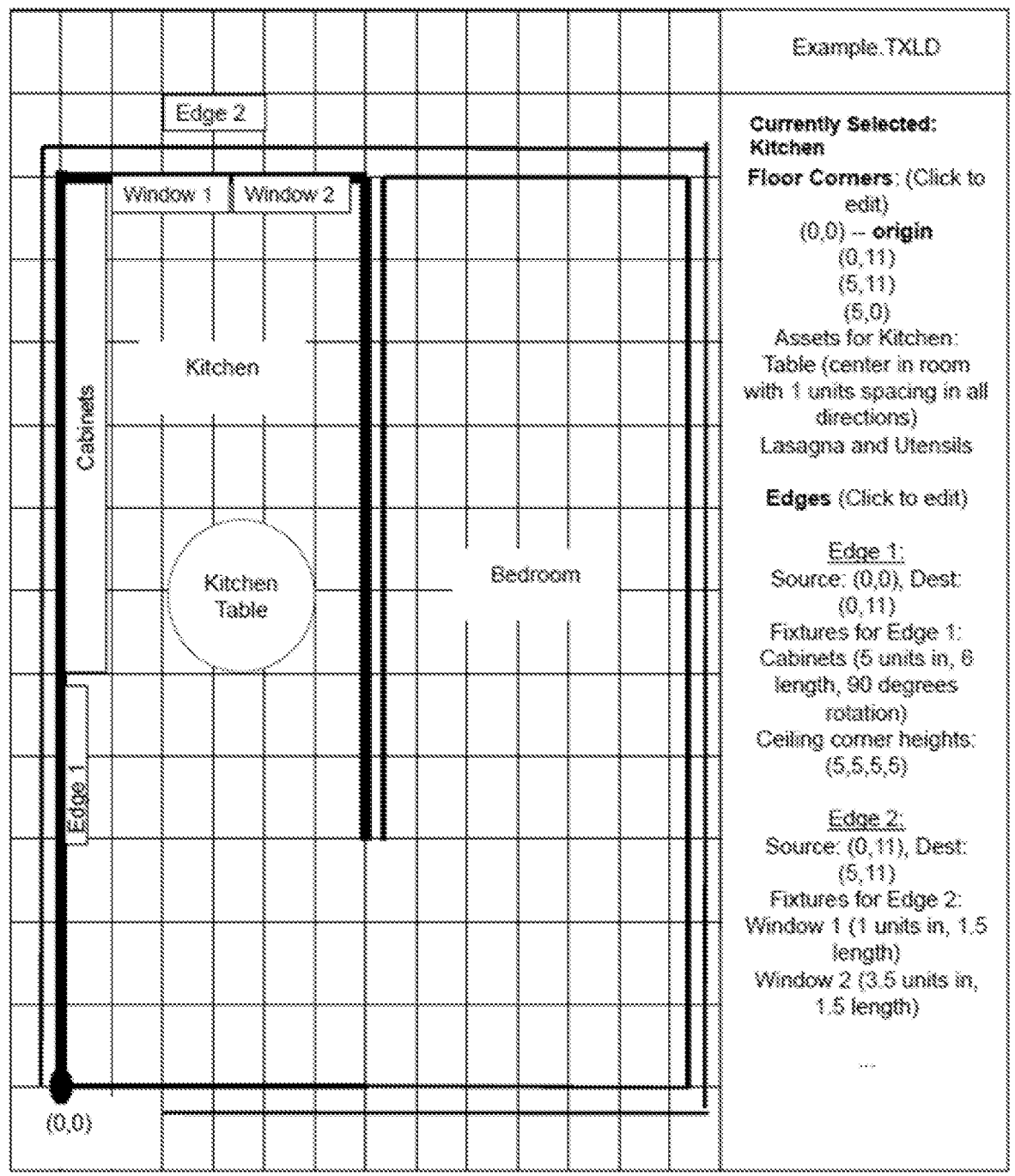
FIG. 7 is an illustration of a possible interface to edit each TXLD file (TXLD editor interface).
Figure 8:
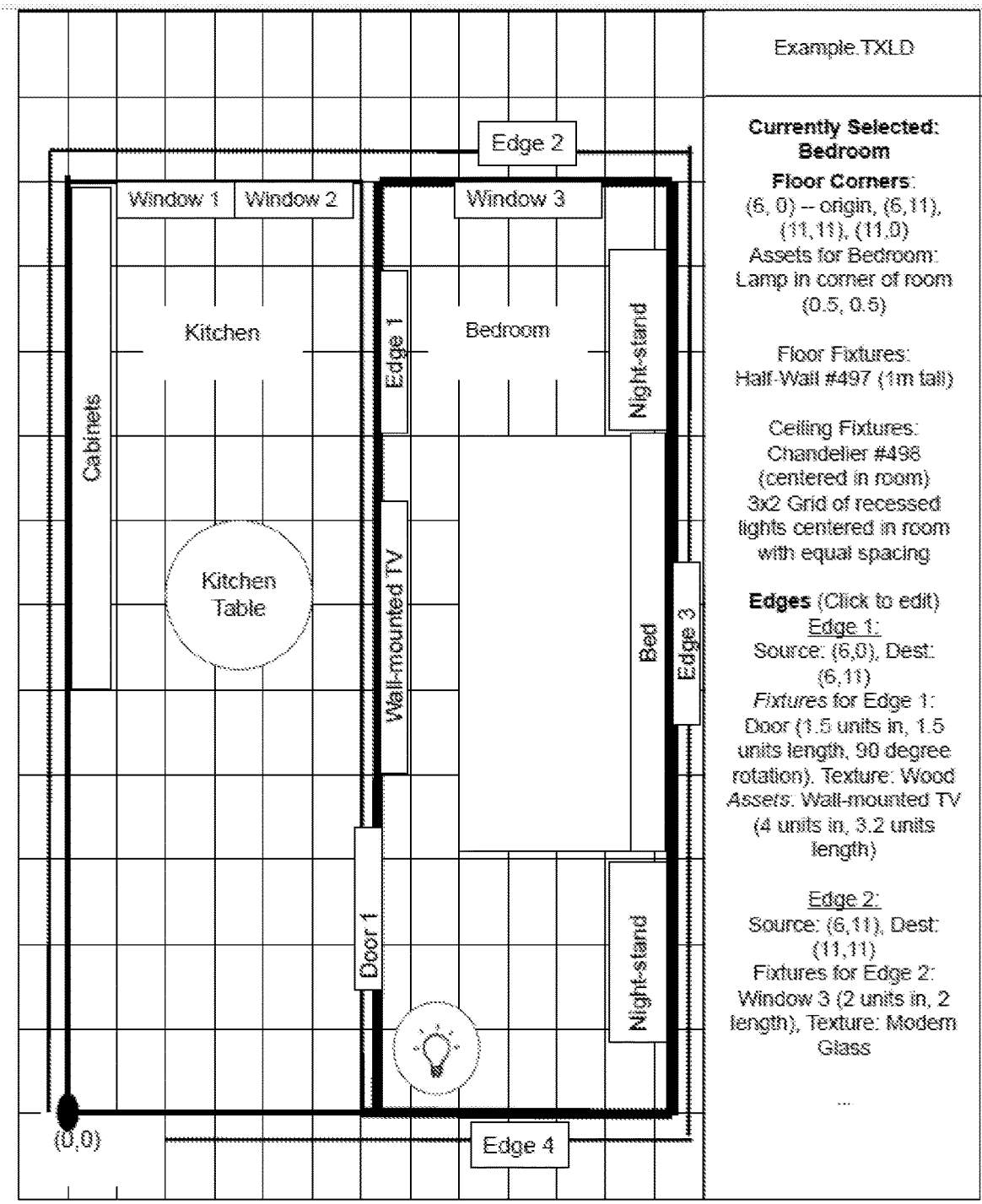
FIG. 8 is another illustration of a possible interface to edit each TXLD file (TXLD editor interface), with a different room under focus.

To make visualizing TXLD files easier, the invention includes a "TXLD File Editor", a graphical representation allowing users to fine-tune and update the TXLD file as they see fit. FIGS. 7 and 8 are both examples of what this interface may look like. Users will be able to select and edit specific floors, rooms, edges, corners, assets, fixtures, and any other components of a TXLD file. The TXLD file's editor will appear like a flat 2D representation of the space, but will encode all 3D information. A human may optionally use this user-friendly editor to validate TXLD formats generated with automation.

Using the TXLD file as input, the system will process the file's encoded data and generate a polygon mesh 3-D digital representation of the space. One possible approach to this is shown in FIGS. 13, 14, and 15. In FIG. 13, the system processes the TXLD file by traversing its hierarchy. Comments shown in the diagrams explain the general logic line-by-line. We essentially iterate over every high level section (e.g. floor one). Then, within each section, we iterate over each subsection (e.g. Kitchen, Living Room Patio, Backyard, Foyer, etc.). Within each subsection, we process the floor, generating and storing all triangles and vertices as a mesh for the floor. We also process all the edges, generating walls or other elements of the space and their associated meshes. When we process each edge, we will make sure that windows, doors, and any other fixtures are processed while generating the vertices and triangles for their respective mesh. We will also add models of any encoded fixtures at the right position, with the right sizing, and with the correct rotation. The software has an Artificial Intelligence (A.I.) component that enables it to improve its performance over time, by learning from mistakes made in the course of generating the 3-D virtual representations of properties.

The output of the pseudocode in FIGS. 13-15 will store a hierarchy of mesh objects (with all vertices and triangles). One embodiment of the file to store the model of the space may be an "XMSTL" file. XMSTL is a custom and newly created file type that is an expansion of STL, the "Standard Triangle" or "Standard Tesselation" Language. STL files describe only the surface geometry of a three-dimensional object, without any representation of color, texture or other common CAD model attributes. Unlike a standard STL file, which does not store mesh hierarchy, the generated file will contain a hierarchy of mesh objects. This hierarchy may feature, inter alia, (a) floors within the home, (b) rooms within the floor, and (c) ceilings, walls, and floors within each room. This hierarchy may be modified as needed; for example, outer walls may be featured at the same level as the floors, if desired.

The geometry in the XMSTL or equivalent file is validated, and necessary repairs are made to any mesh defects. Typical defects will include but are not limited to disconnected vertices and edges, areas with no thickness, and overlapping edges, which are common causes of non-manifold geometry.

FIG. 16 illustrates the general process for UV unwrapping the newly generated 3D model. This is essential for accurate rendering of textures and materials, explained below.

Taking the validated geometry and processed texture maps from the previous paragraph, the model may be exported to an FBX or other suitable 3-D file format.

As referenced in the previous paragraph, the system of the invention may use materials, shaders, textures, and texture maps to create the most accurate and immersive experience possible. This directly impacts the look and feel of all surfaces within the property or location being rendered, and gives the user as accurate an idea of the property as is possible, short of putting in a physical appearance at the site. Textures, materials, and shaders are integrated throughout the virtual property, including flooring, carpeting, walls, ceilings, countertops, and the like. Textures are bitmaps that represent various aspects of a material's surface, such as color, reflectivity and roughness. The software preferably uses photographs as input to intelligently infer the closest-fitting texture from a predetermined library of textures, although human review of images and selection of textures is contemplated as well. Information on which of these needs to be associated with each model is encoded directly in the TXLD file, as explained in FIG. 11. Virtual Reality technology—both hardware and software—is a rapidly advancing field, and the computational power available at retail is also rapidly increasing. It is expected that the realism of the virtual tours provided by the system of the invention will increase as these technologies advance. All software components are preferably optimized for GPU performance.

The system provides a number of interactive features, which give potential home buyers as much as possible of the information required for making a decision to purchase a property being displayed. Potential renters will enjoy the same benefits, and property owners contemplating renovations may use the system to evaluate the options available to them. Among the benefits for these users are:
  a. The user may "tour" a large number of properties without the need for time-consuming, inconvenient, and sometimes costly travel.
  b. The user may view representations of the home at different times of day and year, in varying seasons and weather conditions.
  c. The user may actively walk around within the 3-D rendering of the property, much like a video game character, with a full range of motion. The buyer may choose between a first-person view and a third-party view of an avatar whose motions are under the buyer's control.
  d. The user may interact with the interior of the property (FIG. 43) by virtually turning lights off and on; by opening and closing doors; by turning music, television sets, and other entertainment systems on and off; by operating faucets, showers, and other plumbing fixtures; by turning on the air conditioning, and much more. Appropriate sounds, preferably recorded on site, will convey a realistic impression of the experience.

e. The user may toggle between a variety of interior treatments, including but not limited to choices of lighting, wall colors, flooring materials, countertops, cabinets, appliances and window and door treatments. The user may additionally add, remove, rotate, and modify products in the scene that are not marked as fixtures.

f. The user may see the virtual property via a choice of viewing modes: staged online (for example via WebGL technology), through the use of a VR (virtual reality) headset, or other appropriate medium.

Figure 38:
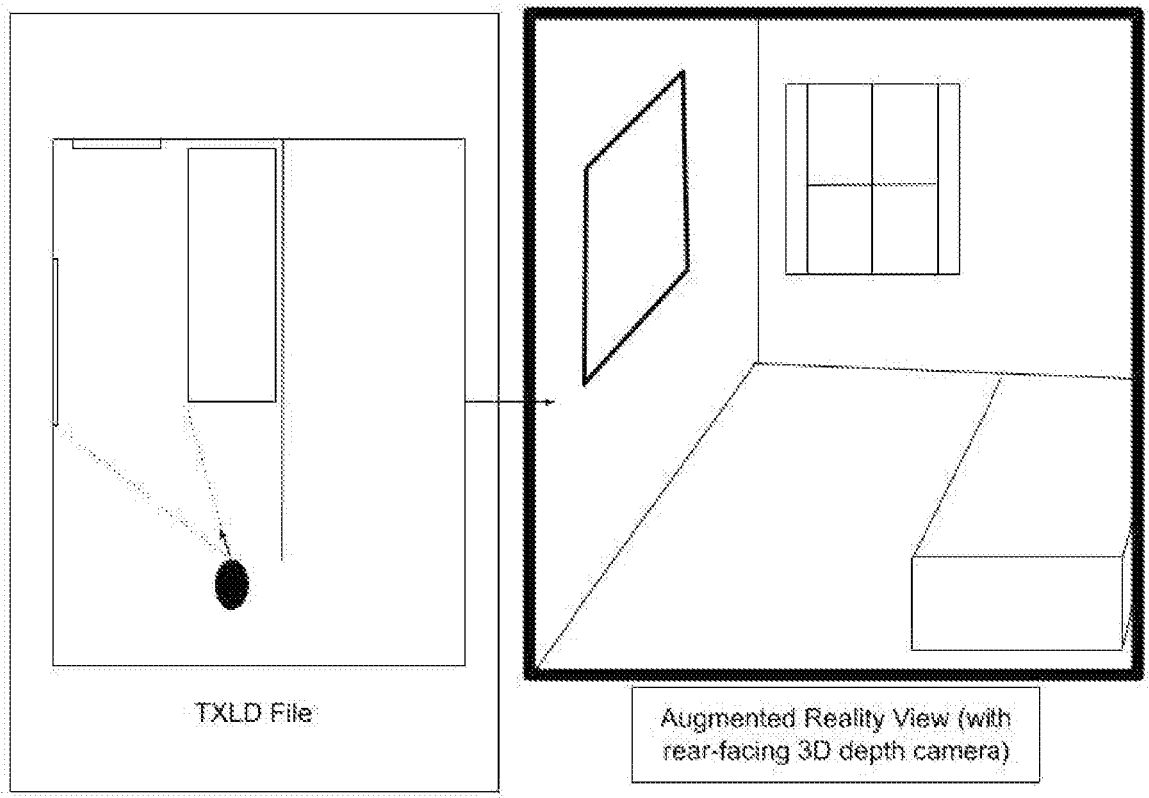
FIG. 38 illustrates the rendition of a TXLD file on Augmented or Mixed Reality Hardware views (on hardware that supports these technologies)
Figure 43:
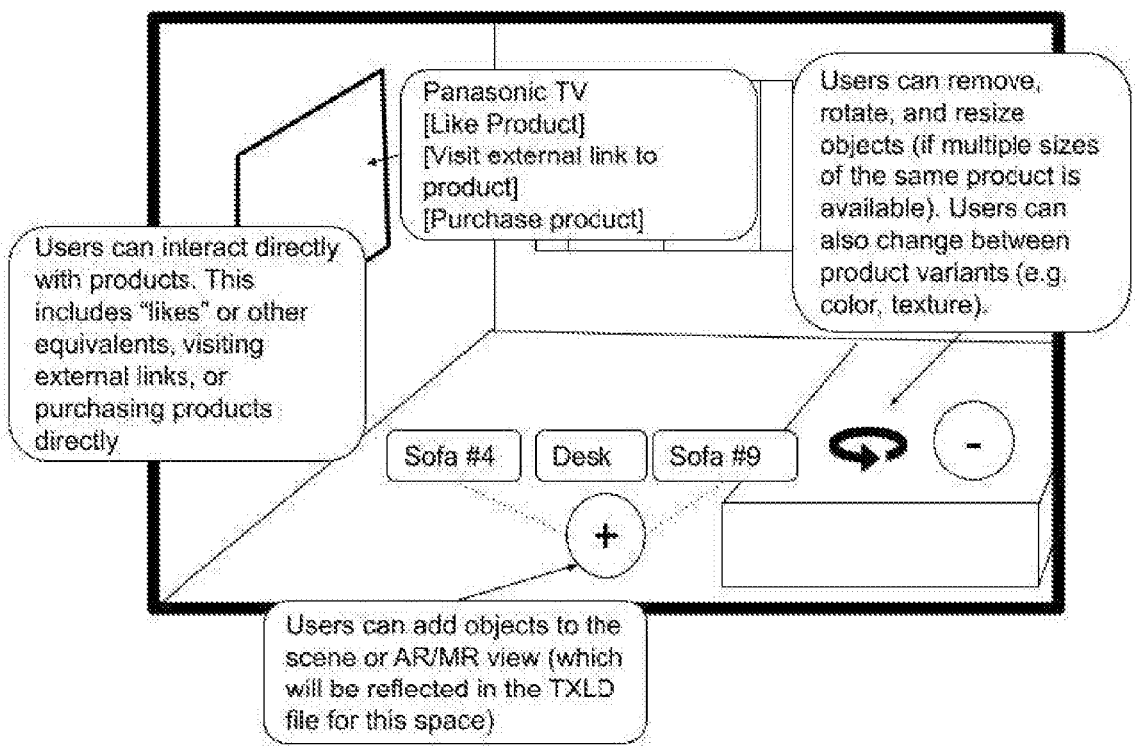
FIG. 43 depicts interactions in the AR, VR and MR medium illustrates the users interactions with scenes.

In the case of Augmented and Mixed Reality technology, the system provides a different suite of interactive features. In Augmented Reality, a TXLD file will be generated and tracked in real time. This is explained in FIG. 10. FIG. 38 illustrates how changes to a TXLD file may be reflected immediately within an Augmented Reality camera view. In these embodiments, the user will be able to add, remove, modify, re-size, rotate, and move objects as if they were real world objects. FIG. 43 illustrates some of these possible interactions.

The provision of a variety of unique styles and themes, and the provision of virtually all of the information the user requires, make it more likely that the property or space will strike a personal connection with the user, and make it more likely that the user will make an offer, or agree to purchase or rent the property, or select a set of renovation plans, immediately after viewing the property via the system of the invention. In the case of a "virtual store", personalization is likely to assist stores and brands in more effectively marketing and distributing their products.

The system of the invention preferably employs rendering engines similar to those used in video game development to create and present a virtual rendering of a property for the purpose of 1) selling, renting, or renovating the property or 2) marketing, selling, and distributing products but any other effective rendering engine or software package may be employed.

In one embodiment of the invention, the generated renderings will be exported to a unique URL, where it will be rendered using WebGL™ technology. The user, given a computer with an adequate graphics processor, will be given access to this URL and may embark on a virtual tour of the property in a browser window. In another embodiment, the user will employ a VR headset (e.g., the VIVE™ headset from HTC Corp., Taoyuan City, Taiwan), Oculus, or other lighter weight headset like Google Cardboard. In the case of "augmented or mixed reality" open houses, where the user is actually at the physical location in person, renderings may be generated in real-time and rendered using hardware that supports augmented and mixed reality.

Decorative style preferences are then applied. These style preferences may be generalized categories, such as "early American", "Modern", and a limitless number of additional styles or styles that are personalized and customized for a given user or collection of similar users. A custom "style" may optionally consist of the objects currently owned by the viewer, so that his or her existing furniture may be viewed in the context of the new property. Alternatively, a limitless number of intelligently inferred collections of products (based on product selection algorithm introduced in FIG. 18) may be selected for placement into the environment. Each category includes a set of virtual representations of furniture, fixtures, decorative objects (including such items as fireplaces, objets d'art, paintings, posters, and indoor plants), and floor and wall treatments (paints and wallpapers, and tiled, carpeted and wooden floors) consistent with the style.

These virtual objects, or assets, are part of the previously described 3D library, which will grow over time. In addition to being tagged with one or more "product types", each of the virtual assets in this growing library will be tagged with any number of "tags" or identifiers that describe or assist in the intelligent grouping of products. In general, non-fixtures are distinct from fixtures; the latter are elements of the property, such as built-in cabinets, sinks, toilets and tubs, which are physically built into the property and are sold when the property is sold. All existing fixtures are represented in the 3-D model, but certain fixtures such as kitchen cabinets and millwork (door and window sills, casings, blocks and pediments, and base and crown moldings, etc.) may be subject to replacement in the customization process described below. To accommodate this feature, the growing 3D library of such fixtures is preferably provided, from which fixtures most closely matching the look and dimensions of the existing appliances, cabinetry, doors, windows and millwork may be selected for incorporation into the 3-D model. If the texture is not available it will be created and added to the growing library. Using alternative fixtures from the library, replacement of these objects may then be made to meet stylistic preferences during the customization process.

Before explaining the product selection and placement algorithm (introduced in FIG. 18), it is important to explain more detail on how the growing 3D product library will function, which is explained in detail in paragraph 170.

Several brands may not have 3D models online and may instead simply have their full product catalogs hosted online. It is common for brands to list their products on websites and/or other online mediums, including metadata including but not limited to color/texture, size, alternate configurations and variants, year, collection name, styles, category ("dining room chair", "kitchen table", "television", etc.), and any other "tags" (e.g. modern, contemporary, gamer, rustic, 4k TV, and more). A crawler or other data acquisition tool may be used to fetch products (and the metadata listed above) on said online mediums. To augment the metadata and product information that is fetched, product images will be collected from as many angles as possible. Although the system will not have 3D models for some (and sometimes all) of these products, it may input the product metadata and image(s) into the growing 3D library without the 3D model. In these cases, the reference or link to the 3D models will be empty. As expected, we may have a sparse 3D library if we do not have 3D models for several products, even though we will have an extensive product catalog. It is important to note that we may automatically label each newly crawled or fetched product and its image(s) with the metadata (tags, categories, styles, or other descriptors) assigned by the brand on said online mediums. However, we will not always have enough descriptors for every new product that gets added to the system, even if we do have product image(s). Also, different brands and sources may use different metadata and descriptors.

Existing product images and associated metadata in the system, including both newly fetched products and past products, will power a deep learning algorithm that will help classify new products that may be added to the system over time; type ('kitchen table', 'dining room chair, etc.), style(s), tags, and other descriptors may comprise said classifications. Training sets are the key to an effective deep learning algorithm, and with time, we will have more and more labeled products in the system.

To seed the system (early on, when limited products and data are available) with said training sets, we will use "labeled" products that use our system's descriptors. Different algorithms may facilitate assigning our system's descriptors. A rudimentary solution may simply map different brands' metadata to our system's pre-defined metadata (style names, formatting, and more). As an example, if Brand A's product has the style "Modern Life" and Brand B's product (of very similar style) has style "Modern Contemporary", the system will assign the product the style of "Modern", a predefined style by the system. It is important to note that a product may have multiple styles and that this was simply an example of how styles, tags, descriptors, and any other metadata may be labeled for the purposes of training sets. We may rely on interior design terminology and modern trends to best name and adapt our system's metadata (buckets, descriptors, styles, and/or tags).

For a newly crawled or fetched product, after we have assigned our system's metadata (as opposed to just that of the brand), we will use it as part of our training set. It is important to note that this is primarily for the purposes of "seeding" the system initially. Human intervention may optionally supplement this training set creation. As more and more products are added to the system, the algorithm will improve, both improving its accuracy in classifying new products as descriptively as possible and reducing the need for any potential human intervention. This deep learning classification algorithm that assigns types and metadata to newly added products may be applied both in real-time and "behind the scenes", depending on the use case. If a user wants to add a product they already own to the system, a real-time approach may be used. If, however, a brand is adding a product to the system, an instant and immediate addition may not be necessary.

For a newly added product to the system, the algorithm may also take product image(s) for the newly added product and output the most accurate descriptors possible for all metadata. The output of this deep learning algorithm may optionally validate the output metadata with brand provided metadata if available. This algorithm is not limited to crawled images only; it may be adapted to service any and all images, video stills, 3d environments, data from 3-D depth cameras, videos, camera views, Augmented and Mixed reality views, and any alternate mediums of viewing. The algorithm will rely on a Convolutional Neural Network (CNN), commonly used for image classification. The input to this CNN will be new product image(s) and our goal will be to automatically infer as much metadata as possible. A simple use case may simply assign a type (e.g. bed, sofa, desk, etc.) to each product.

This deep learning classification algorithm will significantly simplify 1) smoothly integrating new products into the system 2) classifying products in user-supplied photos, videos, and other formats 3) classifying products in real-time, including but not limited to Augmented and Mixed Reality environments.

The digital representations that make up the growing 3D product library will be independently distributed using a system-created marketplace developed for Augmented and/or Mixed Reality (AR/MR) applications which may be deployed via mobile apps, wearable devices, or other compatible hardware. The 3D library will contain models that are platform and medium agnostic, and hence ready to be deployed on any/and all software and distribution channels. This library will continue to grow as new brands distribute products on the platform(s).

Although the 3D product library will evolve with time, the core tenet will remain being "platform and medium agnostic" and thus, easy to distribute. Mediums include but are not limited to Virtual Reality (headsets or other wearables), Augmented and Mixed Reality (mobile phones, gaming technology, glasses, or other wearables), Web and Mobile Web.

Figure 18:
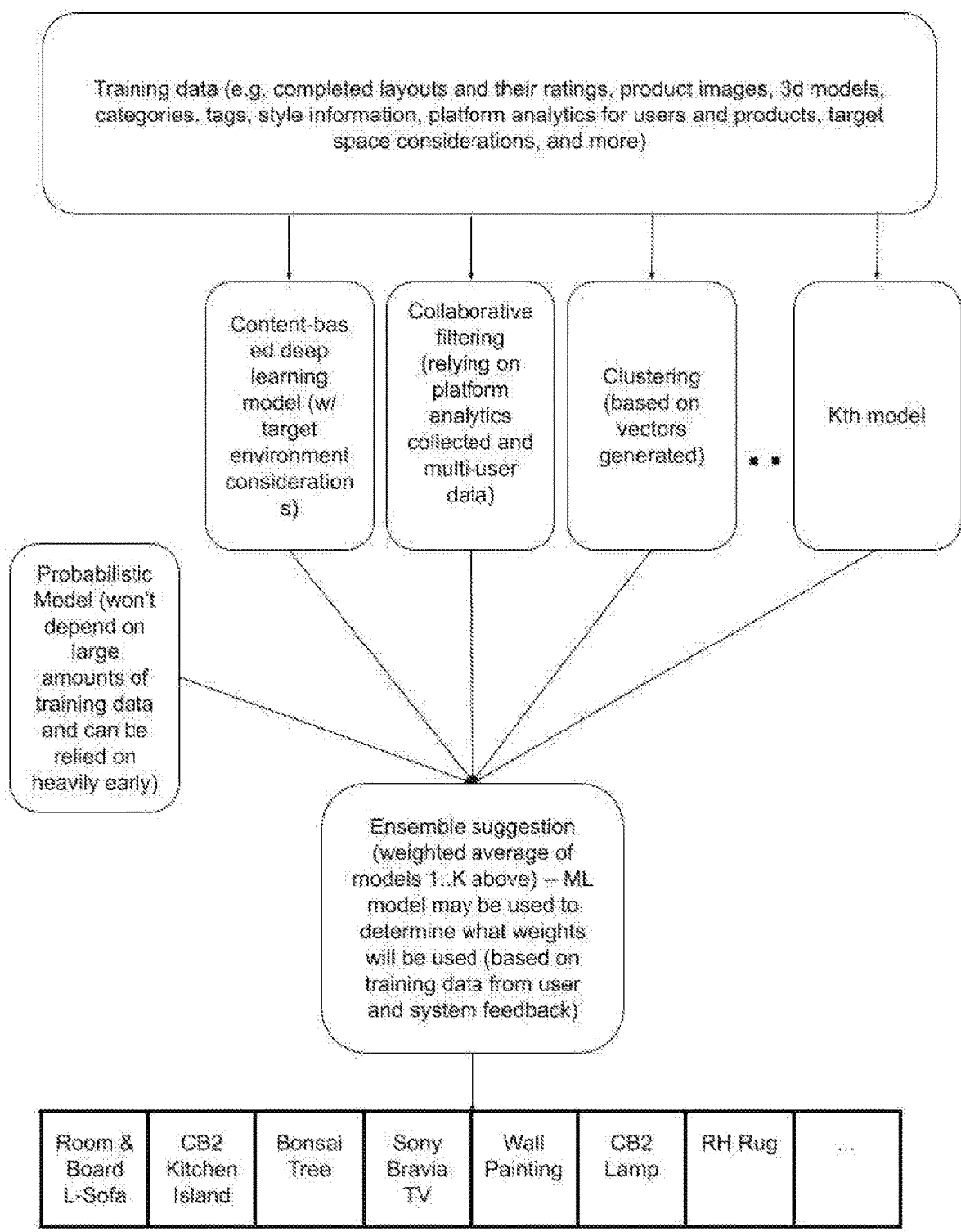
FIG. 18 is a flowchart explaining the ensemble product selection and placement algorithm, relying on a variety of weighted models. Selected and placed products will be encoded with their unique identifiers, positions, rotations, and other necessary data in the TXLD file.

Next, we turn to FIG. 18, a high-level overview of the product selection and placement algorithm. Regardless of the medium used, the algorithm will stage a space based on the desired "style". Style is a high-level term that will inform the product type and actual product selection for a given space. Style does not refer to only high-level descriptors like "Modern" or "Contemporary". It also includes styles that may be specific to one user, a grouping or collection of users, or other more nuanced styles that are technology generated. As the product selection and placement algorithm evolves with more and more data gathered (with user feedback and AB testing), an unlimited number of new "styles" may be discovered even if they do not have a specific name like "Modern".

For the purposes of this algorithm "auto-stage" will be defined as 1) selecting and discovering single or combinations of products based on the desired "style" for the target space, 2) creating a copy of the "empty" reference TXLD file saved in Step 306 of FIG. 3 specific to this "style", 3) intelligently updating this new TXLD file for the space with the selected objects for the space 4) using the updated TXLD file to render the selected products in the medium of choice. In virtual reality, the scene may be updated with the added products and their textures, using encoded data in the TXLD file for correct sizing, product variant (e.g. texture, color, etc.), rotation, and any other spatial or visual data. In augmented and mixed reality, the selected products will be placed directly into the environment in front of them in real-time; this placement process will improve in accuracy and visual integrity as devices ubiquitously feature 3-D depth cameras. Depth data will also facilitate detecting object "conflicts", including but not limited to overlapping models, objects not fitting in the space, or objects being sized incorrectly.

The system's auto-staging process will improve as more and more 3D models are added to the environment in fitting and appropriate locations, both manually by interior designers/end-users and automatically using code. A/B testing and feedback collected for each product, layout, and user will improve quality and the automation process.

Figure 34:
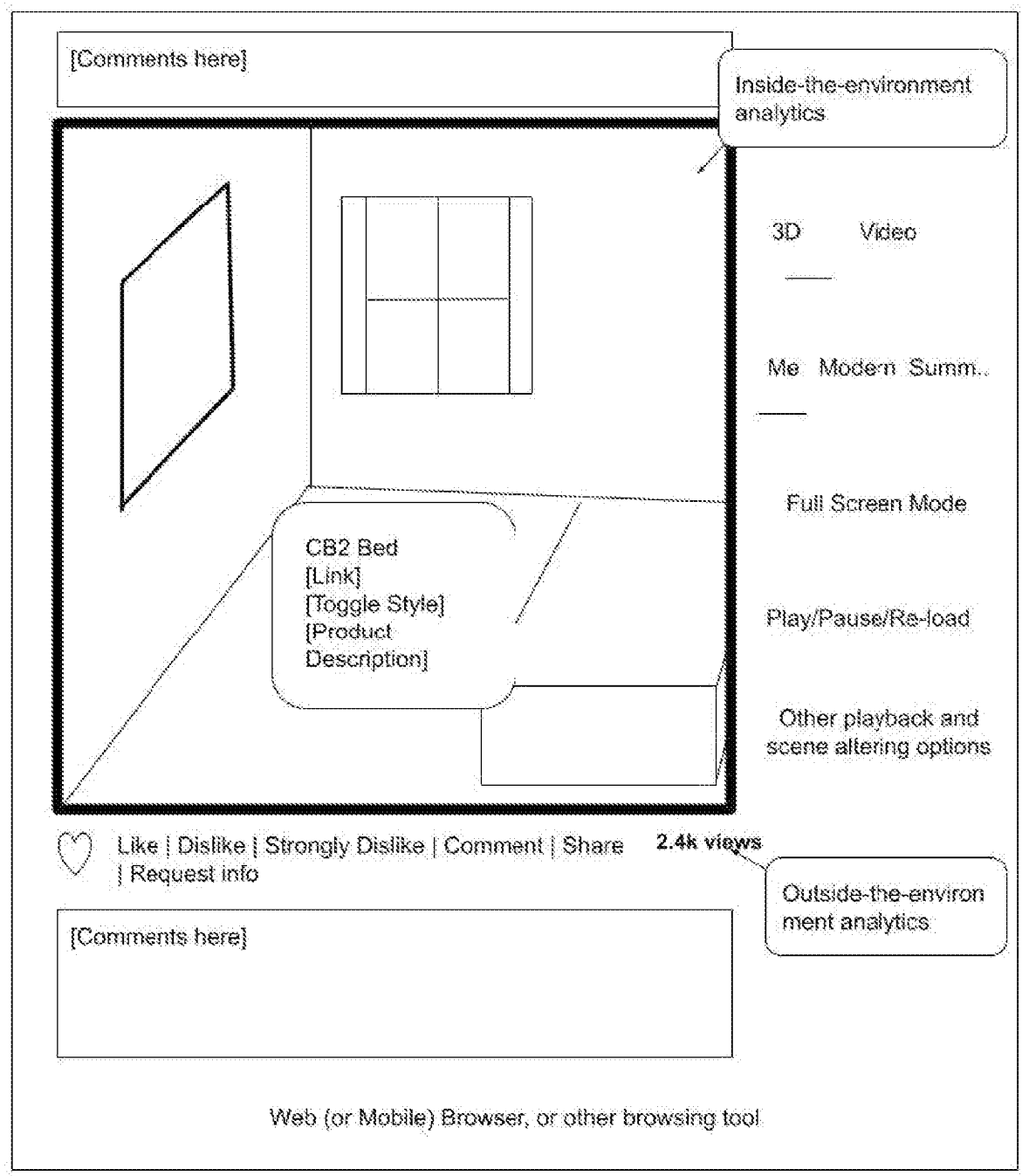
FIG. 34 depicts an exemplary interface (+Analytics continued) that may be used to render scenes. It also clarifies the difference between "inside-the-environment" and "outside-the-environment" analytics.

In order to assist in providing the most personalized approach to each user, a variety of analytics and data points will be collected across all the mediums utilizing the system. These analytics will be a major component of the product selection and placement algorithm. These data points range from simple "likes" or other "reactions" on each scene to more sophisticated data points within the virtual, augmented, and mixed reality environments themselves. The following descriptions will distinguish between these two different types of analytics. FIG. 34 illustrates one possible interface. This figure also clarifies the difference between "outside-the-environment" and "inside-the-environment" data points, explained below.

1) Outside-the-environment data points: we define "outside-the-environment" as interactions that are occurring outside the virtual, augmented, or mixed reality environments. In the case of a web interface, browser interactions with the website itself are examples of "outside-the-environment" These may include the following "reactions" and other behaviors:
    a) Like on a specific scene
    b) Love on a specific scene
    c) Dislike on a specific scene d) Strongly dislike on a specific scene
e) Comment on a scene
f) "Share" of the scene via SMS or to another platform
g) Simple page view
h) Duration of page view for each specific scene
i) Click on "agent info", "request more information" or the equivalent (implies strong interest with action)
2) Inside-the-environment data points: we define "inside-the-environment" as interactions that occur while using the augmented, virtual, or mixed reality platforms (or any other medium of viewing).
   a) Hover over a digital representation in scene (which may optionally be a representation of a real product). This includes textures and digital representations of all kinds.
   b) Duration of a "hover"
   c) A "like" or the equivalent of an "annotation" or "bubble" of any kind for a digital representation (often a product), whether within the scene itself or in a fixed position, that describes the product or provides an external link to the product.
   d) Lack of a "like" during a hover lasting above a fixed amount of time (implies disinterest). Could adapt this based on how and how much each given user interacts with the environment (while handling outliers and leaving the computer unattended etc.). This is essentially intended to handle feedback based on a user's standard way of interacting which we may infer over time (some users may be active "likers" or "clickers" while others might be more passive and selective).
   e) Removal of digital representation (implies strong disinterest)
   f) Modification of a digital representation (changing style, color, rotation, size, etc.—implies interest but with an asterisk) and time spent doing so
   g) Addition of a digital representation (implies interest in a very specific product which may be a valuable data point)
   h) Amount of time spent in this scene specifically as a whole
   i) Amount of time spent in each room or specific part of a scene The analytics collected above may be stored as shown in FIG. 39. FIGS. 32 and 33 explain how these analytics may be quantified.

FIG. 18 depicts an "ensemble" approach to the product selection and placement algorithm. Inputs for this "ensemble" suggestion model include but are not limited to the TXLD file encoding the space, desired style(s) (e.g. Modern or Contemporary, or a "style" specific to a user or group of users), the target space (e.g. edges, dimensions, fixtures, existing assets, spatial data), region or regional data, budget, family size and any other information that would assist in the "auto-staging" process. The output will be a new copy of the input TXLD file with added products and texture information; each added product will be marked with the appropriate product ID (in the 3D library), unique product identifier (UPC or the equivalent), product variant, position, sizing, texture, rotation, and other necessary spatial, visual, or product-related data.

Figure 20:
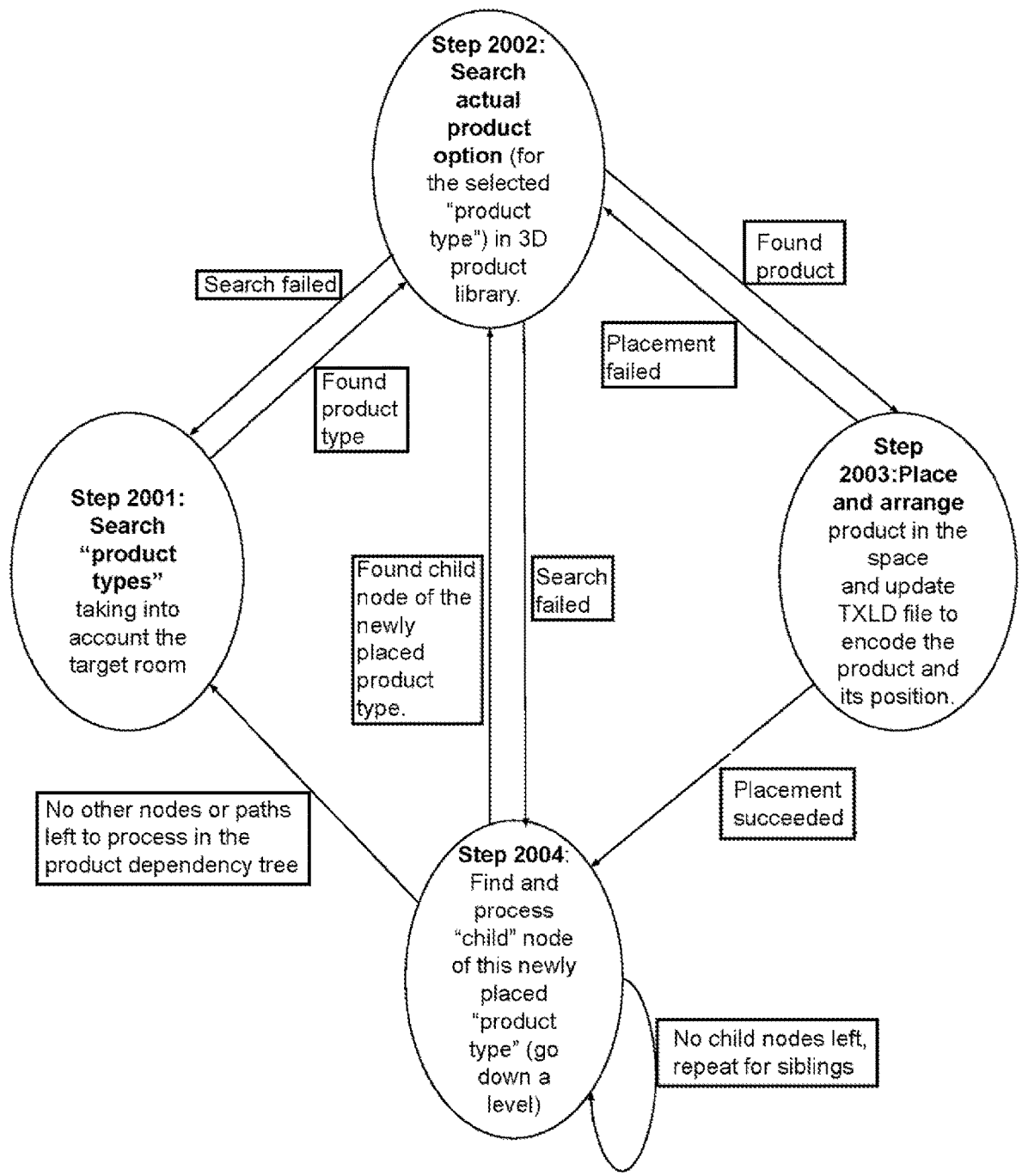
FIG. 20 is a flowchart explaining the probabilistic model for product selection and placement algorithm, continued.

Although analytics will improve automation and quality long-term, to battle the common "cold-start" problem (not enough data collected), a probabilistic model may be used in the early stages to suggest product types and products for a given space. FIG. 19 explains the high-level process of a probabilistic model that may be used to identify product types (e.g. bed, dresser, desk) and products for a space. The probabilistic model will be guided by heuristics and general interior design principles, that will vary based on style and other inputs in the table on the left. The system will allow these principles to be adapted as needed. Over time, these principles may even be inferred using a deep learning algorithm. FIG. 20 illustrates the high level flow used to select product types and products for the space encoded by the input TXLD file for the specific "style". First, in step 2001, we rely on priority lists of product types for a given space (example shown in FIG. 21). A priority list is a weighted, ordered list of product types for a given space. For example, for a "Modern Contemporary" bedroom, a bed comes first. Next highest priority is a dresser with a priority index of 0.8. And finally, if space permits, a desk is next at 0.3. This list may be adapted and will be unique to every different "style". This means every user may have his/her own priority list for each space. It also means a group of users or specific style (even if it is an unnamed and mathematically computed style) may have its own priority list for each space.

As an example, if we are trying to select and place products in a Bedroom with a "Modern Contemporary" style. First, relying on the priority list in FIG. 21, we choose a product type (e.g. bed, dresser, tv, desk etc.), in this case a bed, first (step 2001). Once we have identified the product type to search for (in this case, a bed), we search the products in the 3D library, taking into account the desired "style" (in this case, "Modern Contemporary"), the target space (especially dimensions), and the other supplied inputs. If we search the 3D library and find a product that fits the space and style (step 2002): Crate and Barrel 2 Navy Blue Bed and Frame. We then attempt to place the product into the scene, ensuring there are no overlaps and that the space does not become too cluttered or dense while adhering to the "Modern Contemporary" style (step 2003). If we determine that we are able to successfully place the selected object into the scene, we update the TXLD file for this scene. If we, however, are not able to place the selected object into the scene (sizing, spacing, or not adhering to the desired "style"), we go back to step 2002, and try to search for another product. We keep going between steps 2002 and 2003 until we successfully place a product, however, the number of iterations for step 2002 here will be capped by a system-defined constant. In step 2004 we find and process a "child" node of this newly placed product type. If no child nodes are left, the process is repeated for siblings (e.g. for wall painting in the example shown in FIG. 23 where wall painting is a sibling for nightstand).

Figure 23:
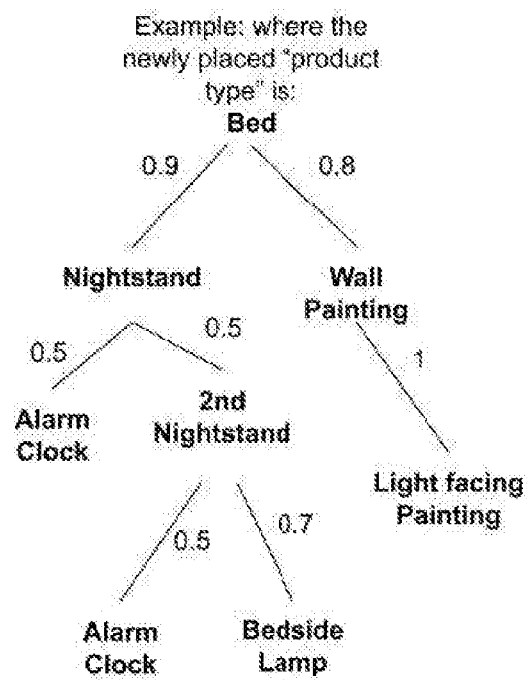
FIG. 23 illustrates a product dependency tree, the relationship between different product types (with assigned probabilities).

After the product has been placed (TXLD file has been updated with the product), we process that product type's dependency tree (step 2004), (bed in this case). Each "product type" (e.g. bed, dresser, tv, and other product types) will have its own product dependency tree, as shown in FIG. 23. It is important to note that different styles (whether named or computed), users, regions, and other groupings will have different dependency trees, even for a single "product type". For example, each user that registers may have his/her own dependency tree for a "bed" in the "master bedroom". Each style, whether a labeled style like "Modern Contemporary" or an unnamed and technology computed style, may also have its own dependency tree. If there is insufficient user and platform usage data available, the system will rely on a "seeded" product dependency tree. Although this will not account for nuanced styles, it will provide a quick and easy approach to selecting product types for a space. As more and more analytics are collected, the collection of product types will evolve, as will product dependency trees.

Traversing deeper into each product dependency tree (step 2004) is contingent on successfully placing a product in the space (and updating it in the TXLD file). If we do decide to place it but we are unable to actually place it (does not fit the space, creates clutter, overlaps with other products, etc.), we will search for an alternative product and keep trying to place and arrange it. If we are unable to find fitting products (both spatially and style-wise), we do not go any deeper down the product dependency tree.

Although analytics will improve automation and quality long-term, to battle the common "cold-start" problem (not enough data collected), a probabilistic model may be used in the early stages to suggest product types and products for a given space. FIG. 19 explains the high-level process of a probabilistic model that may be used to identify product types (e.g. bed, dresser, desk) and products for a space. The probabilistic model will be guided by heuristics and general interior design principles, that will vary based on style and other inputs in the table on the left. The system will allow these principles to be adapted as needed. Over time, these principles may even be inferred using a deep learning algorithm. FIG. 20 illustrates the high level flow used to select product types and products for the space encoded by the input TXLD file for the specific "style". First, in step 2001, we rely on priority lists of product types for a given space (example shown in FIG. 21). A priority list is a weighted, ordered list of product types for a given space. For example, for a "Modern Contemporary" bedroom, a bed comes first. Next highest priority is a dresser with a priority index of 0.8. And finally, if space permits, a desk is next at 0.3. This list may be adapted and will be unique to every different "style". This means every user may have his/her own priority list for each space. It also means a group of users or specific style (even if it is an unnamed and mathematically computed style) may have its own priority list for each space.

As an example, if we are trying to select and place products in a Bedroom with a "Modern Contemporary" style. First, relying on the priority list in FIG. 21, we choose a product type (e.g. bed, dresser, tv, desk etc.), in this case a bed, first (step 2001). Once we have identified the product type to search for (in this case, a bed), we search the products in the 3D library, taking into account the desired "style" (in this case, "Modern Contemporary"), the target space (especially dimensions), and the other supplied inputs. If we search the 3D library and find a product that fits the space and style (step 2002): Crate and Barrel 2 Navy Blue Bed and Frame. We then attempt to place the product into the scene, ensuring there are no overlaps and that the space does not become too cluttered or dense while adhering to the "Modern Contemporary" style (step 2003). If we determine that we are able to successfully place the selected object into the scene, we update the TXLD file for this scene. If we, however, are not able to place the selected object into the scene (sizing, spacing, or not adhering to the desired "style"), we go back to step 2002, and try to search for another product. We keep going between steps 2002 and 2003 until we successfully place a product, however, the number of iterations for step 2002 here will be capped by a system-defined constant. In step 2004 we find and process a "child" node of this newly placed product type. If no child nodes are left, the process is repeated for siblings (e.g. for wall painting in the example shown in FIG. 23 where wall painting is a sibling for nightstand).

After the product has been placed (TXLD file has been updated with the product), we process that product type's dependency tree (step 2004), (bed in this case). Each "product type" (e.g. bed, dresser, tv, and other product types) will have its own product dependency tree, as shown in FIG. 23. It is important to note that different styles (whether named or computed), users, regions, and other groupings will have different dependency trees, even for a single "product type". For example, each user that registers may have his/her own dependency tree for a "bed" in the "master bedroom". Each style, whether a labeled style like "Modern Contemporary" or an unnamed and technology computed style, may also have its own dependency tree. If there is insufficient user and platform usage data available, the system will rely on a "seeded" product dependency tree. Although this will not account for nuanced styles, it will provide a quick and easy approach to selecting product types for a space. As more and more analytics are collected, the collection of product types will evolve, as will product dependency trees.

Traversing deeper into each product dependency tree (step 2004) is contingent on successfully placing a product in the space (and updating it in the TXLD file). If we do decide to place it but we are unable to actually place it (does not fit the space, creates clutter, overlaps with other products, etc.), we will search for an alternative product and keep trying to place and arrange it. If we are unable to find fitting products (both spatially and style-wise), we do not go any deeper down the product dependency tree.

We complete a subtree before moving on to a sibling. The numbers assigned to each connection refers to the probability that we place the target object (e.g. 90% chance a nightstand is placed after a bed in FIG. 23).

Continuing the example from paragraph 173, now that we have placed a bed, we perform a depth-first traversal of the product dependency tree shown in FIG. 23.

a. After we place a bed, there is a 90% probability that a nightstand gets placed next to it along the same edge. A random number is generated to evaluate this.

b. If we decide not to place the nightstand (10% chance) or there are no nightstands that may be placed next to it, we move on to the nightstand's sibling (wall painting in this example).

c. If we do decide to place the nightstand, we first perform a search for a nightstand (step 2002) taking into account the "style" and spatial data. If we place it successfully (step 2003, updating the TXLD file with it), there is now a 50% chance that we place an alarm clock on top of it.

d. Whether we decide to place the alarm clock on the nightstand or not, we have gone as deep as we may and so we then move on to the alarm clock's sibling: the 2nd nightstand.

e. The second nightstand has a 50% chance of being placed. If we find a nightstand (ideally the same as the first nightstand) in step 2002 and we place it successfully step 2003 (and update the TXLD file), there is now a 50% chance of an alarm clock being on top of it and a 70% chance that a bedside lamp is also on top of it.

f. Now that we have processed all the nodes under the nightstand, we move on to the wall painting which has a 80% chance of being placed above the bed. If we do find a product in the 3D library for the wall painting (step 2002) and place it successfully (step 2003), there is a 100% chance of a light being added facing the painting. It is important to note that if we do decide to place the wall painting but we are unable to actually find a wall painting that fits the space, we will not add the light facing it and will stop going deeper down the dependency tree for the wall painting.

g. Now that we have processed the entire tree for a bed, we move on to a new product type (relying on the priority list from FIG. 21) and repeat the process in FIG. 20. We will keep going until products no longer "fit the space" (N consecutive misses, where N may be tuned). "Fit the space" does not only refer to overlaps and lack of space. It may also refer to properties of the "style" specific to a style descriptor (e.g. Modern Contemporary), a specific user, a group of users, or any other grouping. For example, a user may prefer a lot of open space or a "Modern Contemporary" style may try to maximize spacing between products. In this case, even if a product physically fits, the placement algorithm (Step 2003 in FIG. 20) may not place the product.

Each "product type" (e.g. be, dresser, tv, and other descriptions will have its own "dependency tree" as shown in FIG. 23. Different styles, users, regions, and other groupings will have different dependency tree, even for a "single product type". The collection of product types will also evolve with time, but for the purposes of this example, a master bedroom is used.

Figure 41:
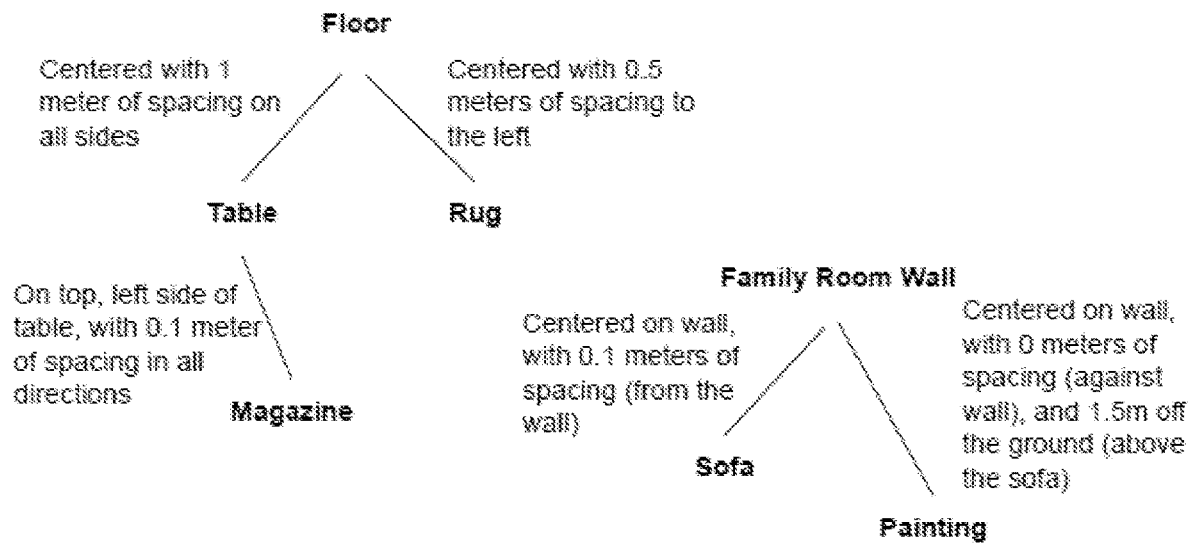
FIG. 41 depicts a relative positioning tree for placing product (updating TXLD file) and illustrates how the system will attempt to place products (i.e. update TXLD files, associating products with the right "parent nodes" with the correct positioning, rotation, and sizing) and the steps to ensure that the "placed" products do not overlap with any existing products encoded by the TXLD file.

We refer to the process of "placing" a product numerous times above (step 2003 in FIG. 20). This process involves updating the TXLD file, adding the product with the correct position, rotation, and sizing. This process will rely on a relative positioning tree. This is essentially just saying that if we have placed a bed, we know where to position a nightstand, painting, or other selected product (or product type) relative to the bed. During this process we first ensure that the product doe not intersect or overlap with any other products (in 3D space). We also ensure that it adheres to spacing and design principles associated with the desired "style". For example, some styles may prioritize open layouts while others may have a higher tolerance for clutter. FIG. 41 explains these relative positioning trees while explaining how spacing may be taken into account when placing products. As illustrated in FIG. 41 these trees specifically reference step 2003 (the "place and arrange" step in FIG. 20 and FIG. 22) of the probabilistic model process. The main principle here is that all objects or assets will have "parent nodes". Effectively, this means all objects and assets placed (by updating the TXLD files) are placed relative to other objects or elements of the space. As shown below, as an example, a table might be a child of the "floor", while a magazine might be a child of the table (placed on top). As another example, a sofa and a painting may be children of walls (placed relative to walls). These basic examples are illustrated below. It is important to note that different "styles" will have their own relative positioning trees (some styles may call for more spacing than others, or may decide to place objects differently). This step will also ensure that the "placed" products do not overlap with any existing products encoded by the TXLD file. Any detected intersection will rule out this attempt at "placing" the product. The placement process will often iterate multiple times when placing the product. The number of iterations will be capped by a system defined constant.

Figure 22:
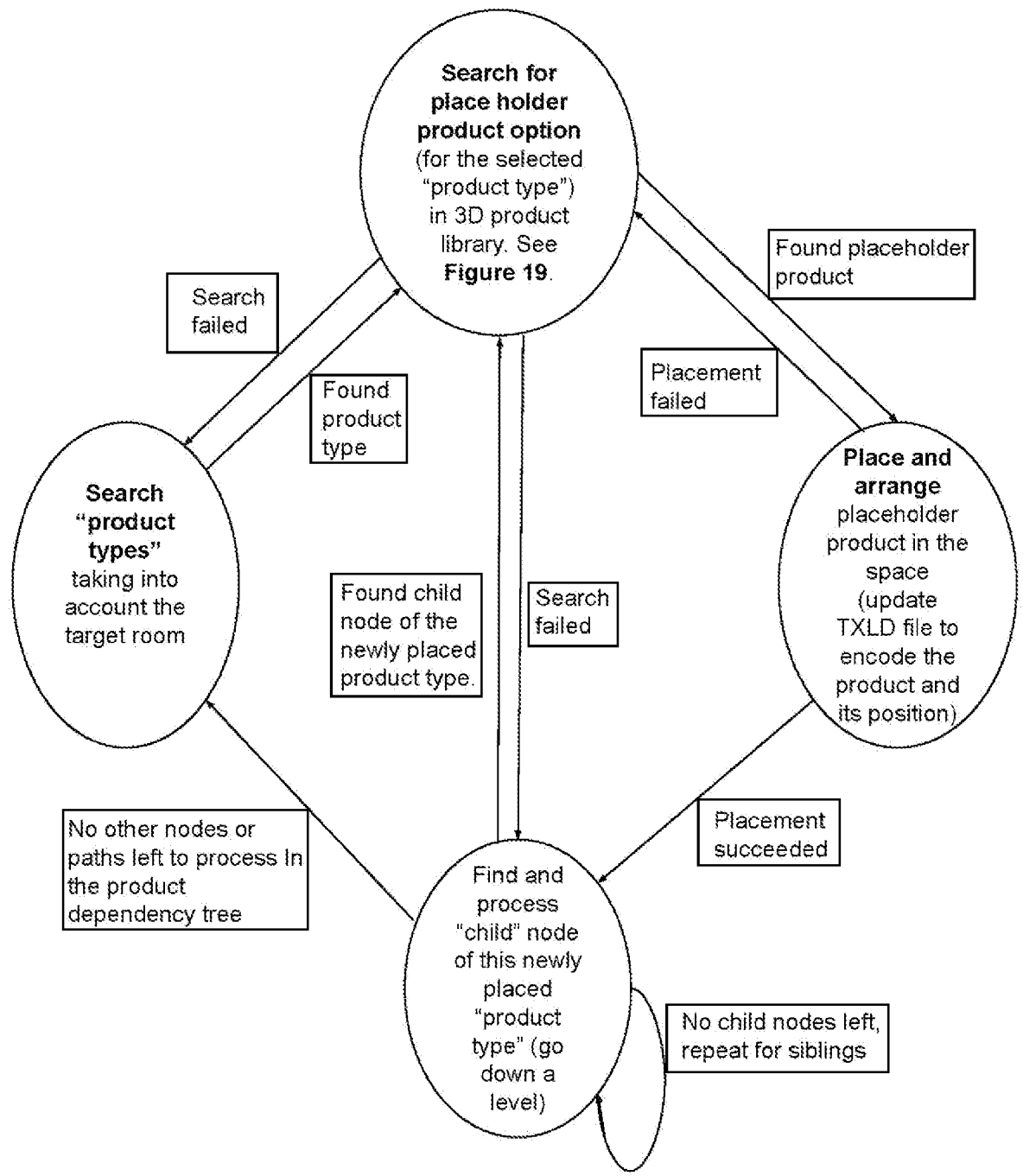
FIG. 22 is a diagram of a probabilistic model to identify product types for target space (continued), an alternate version of the flowchart from FIG. 19 instead showing how placeholder products may be used to identify product types for a given space (including their dimensions, rotations, and positions). In this embodiment, the probabilistic model is only responsible for product type, dimension, rotation, and position selection. Actual product selection may be deferred to another model from the ensemble (e.g. content-based, or collaborative filtering).

As more and more data is gathered, we may gradually transition away from the probabilistic model for the purposes of actually selecting products. Analytics and usage data on the platform will enable more elaborate product search algorithms. In the "ensemble" product suggestion and placement algorithm shown in FIG. 18, this may imply different models (outside the probabilistic model) being used to suggest products. The probabilistic model may still be used to identify product types for the target space and "style", but the search process in step 2002 of FIG. 18 may actually be separated out so other models are responsible for actual product suggestions. In this case, an alternate version of FIG. 20 is shown in FIG. 22, where the TXLD file will be updated with placeholders for each product type, rather than actual products. Step 2202 instead selects a placeholder for the selected product type and updates the TXLD file with this placeholder (including its position, rotation, sizing, and any other dimensions). The output of the probabilistic model in this embodiment will be an updated TXLD file and an array of product types (with full 3-D dimensions for each). Optionally, the process in FIG. 22 may be repeated, with each updated TXLD file "graded" based on the input "style" (see next paragraph), whether it is a named/unnamed style, a style unique to a specific user, or a technology computed style.

Some guiding principles for "grading" updated TXLD files generated by the process in FIG. 22 (product types and dimensions only, not actual product selection) include but are not limited to:

a. Balance: Creates symmetry and an even distribution of weight throughout the space. We may check for symmetry based on the positions of each added product in the TXLD file.

b. Rhythm: Recurring patterns and elements. We may look for matching or complementary textures throughout the TXLD file.

c. Harmony: All parts relate to and complement each other. We may make sure products added to the TXLD file work well together (ensemble approach will capture this as well)

d. Proportion and Scale: Relationship between sizes of objects and how they fit into the space. We may check how different products added to the TXLD file relate to each other size-wise.

These principles may be added to and the definition of each will vary depending on the "style". These grades may be used to ensure that a generated TXLD file is high quality with respect to the space and the desired "style". If a low grade is computed, the process may be repeated.

Once we have the updated TXLD file and list of product types for the target space, an algorithm will aid in intelligently searching and selecting from the 3D product library. The algorithm will suggest appropriate products, taking into account user profiles, the target environment if applicable to desired medium (size, layout, room name, etc.), regional styles, popular styles, and many additional factors. Even where the user's selections do not fit with a predefined style such as "Modern" or "Contemporary", but reflect a "personal style" unique to the individual, the algorithm will be able to suggest assets and design elements based on each user's selected preferences and/or behavior on the platform, explained in paragraph 178.

At a high level, the invention will be powered by a domain-specific recommendation engine. The following reflects one possible approach among many that may be applied to product selections and suggestions, but will be subject to change as the platform evolves. The engine may employ a combination of multiple models including but not limited to a. a probabilistic product search function that does not depend on any platform usage or user data (used early on)

b. a content-based recommendation system to help select specific products once we better understand the user c. a clustering system for identifying similar products based on vector representations generated for each
d. a collaborative filtering algorithm to suggest products based on similar users' behavior on the platform (which may be inferred based on user profile data and analytics collected within the augmented, virtual, and mixed reality mediums).

Alternate or additional models may also fuel these product recommendation models. The different models used will be weighed as part of the "ensemble" approach shown in FIG. 18. Initially, the probabilistic model will be weighed more heavily. As more and more data is collected for a specific user, the content-based recommendation system will take on a heavier weight. As more and more people use the platform and we gather analytics over time, a collaborative filtering approach may be employed for product suggestions.

A content-based suggestion engine, the second model shown in FIG. 18, is another model that may be used to suggest products for a given "style" and input TXLD file. Products will be suggested for the product types output by the probabilistic model in FIG. 22. A content-based approach works well because it does not need data from other users to make recommendations to a specific user. This allows recommendations to be made from day one. Additionally, it may recommend products to users with very specific aesthetic tastes, which may happen more frequently in the interior design and staging space; in some cases, for example, there may not actually be users with truly similar tastes. A content-based approach deals with this case very naturally. We may build profiles based on products each individual likes. We may also recommend new and unpopular products. When a new product comes in, we do not need ratings from other users to build the product's profile; the profile depends entirely on the features of the product, not on how other users rate that product. We do not have the "first rater" problem—we may make recommendations for a product as soon as it is made available by the system. We may further justify the suggestion with very specific features (e.g. tell users that the suggested product(s) are "modern contemporary", a brand that the user likes, or anything else).

Figure 25:
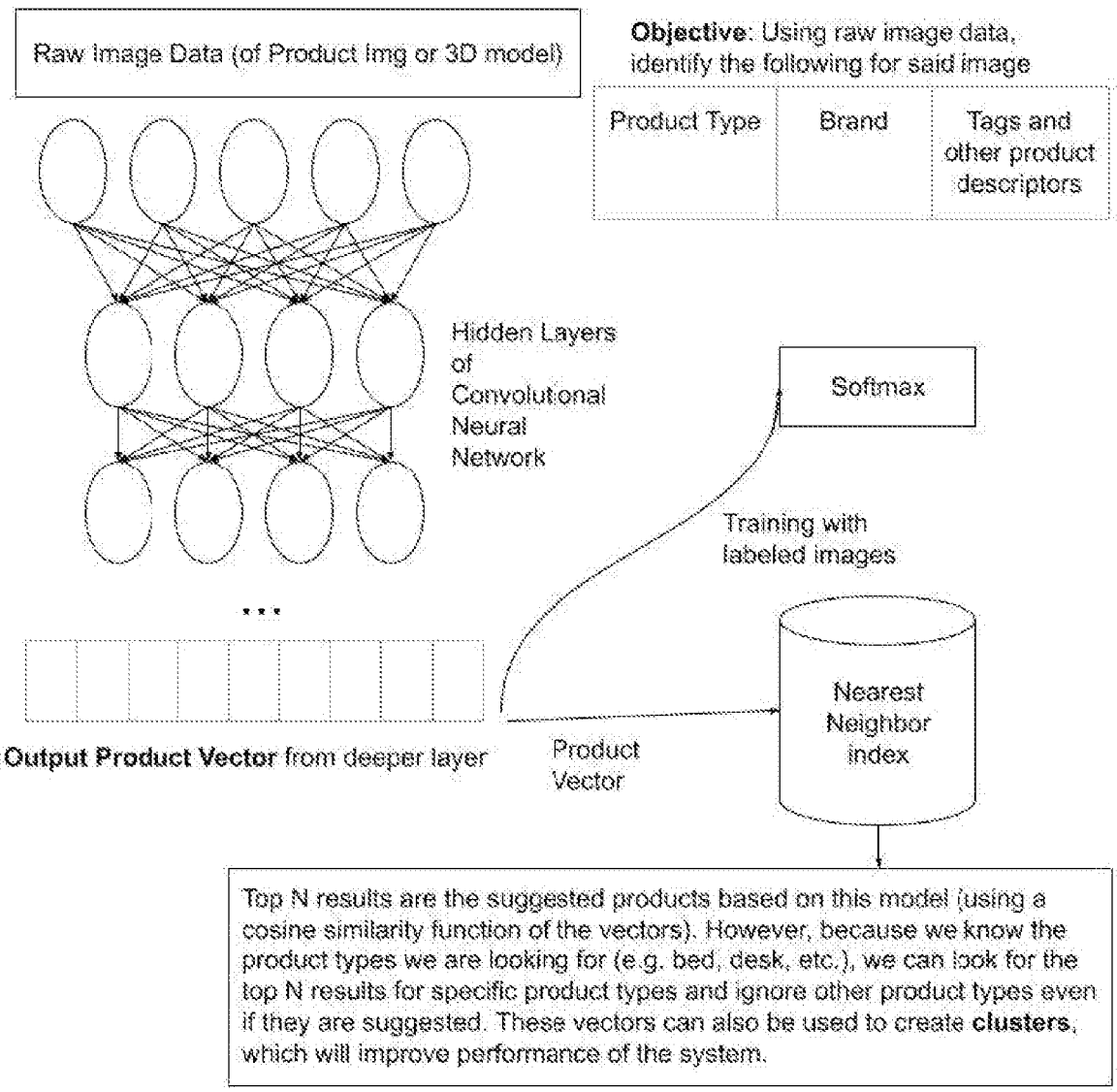
FIG. 25 illustrates a content-based approach to the Product Search and Suggestion Algorithm.

A content-based deep learning model will be trained with a fully labeled collection of products, with each product labeled with the category each product belongs to (e.g. sofa, tv stand, bed, and any number of other product types), meta-data about the product, style info about the product, user-provided tags, and any other applicable information about the product. Users will be allowed to tag products with their own unique identifiers. Tags may range from named styles (e.g. modern or traditional) to something more specific and unique (e.g. "The Office" or "Philadelphia Eagles" or "Camping Gear"). Each product will include the product's 3D model including its textures, an image of the product, and any other visual data for the product. The deep learning model may employ a convolutional neural network (CNN) to analyze, process, and label new and existing products and their visual representations (e.g. product images or other visual representations of 3D models). An alternate deep learning model may rely on processing the geometry of each product through the 3D model itself. The deep learning model that is used to classify products will vary depending on the information available and the strength of the model itself as it applies to said product or product type. The deep learning algorithm(s) will generate vectors for each product using the features noted above. User-specific analytics, better described as a user's "profile" may be concatenated on to other dimensions of the vector describing a product, before feeding the vector into the deep learning model. The deep learning model will decide how to weigh each column of the vector, relying on feedback on the effectiveness of each suggestion. FIG. 25 is a visual representation of one potential approach to vector generation using deep learning.

The vectors generated by the content-based approach will additionally be clustered by product types (e.g. bed, desk, etc.), style (including computed styles), collections (within a brand, or products commonly used together), among other groupings suitable to this system's needs. Then, a nearest neighbors algorithm may be further applied to facilitate finding other products of the same or related "type" or category for that specific "style". Run-time will be proportional to the number of clusters. As the number of product types increases with more and more products added to the 3D library, the number of clusters will also increase. Accordingly, the vector representation of each item will grow in size and dimension. The nearest neighbor approach may then be used to find a collection of products that said user would like and that would fit into the target space. The nearest neighbors approach itself will be tuned to account for the tradeoff between accuracy and speed. For the purposes of augmented and mixed reality, or alternative equivalent mediums, we may need the algorithm to provide real-time results on the fly. In such cases, the algorithm may trade accuracy for speed. Conversely however, if we are pre-computing and generating scenes and do not need the collection of products immediately, we may focus more on accuracy. The way we use the nearest neighbors algorithm on the vectors generated by the deep learning algorithm will vary depending on the context of its usage (the medium it is being used on being a common example of said "context").

The nearest-neighbor algorithm may also be further adapted specifically for the purposes of finding a "collection" of products for a given environment. We may find products that are as similar as possible stylistically to the products the user has interacted with positively (or the initial products selected for the target space), while also simultaneously suggesting products that are in the "categories" or "types" we determined we need for the given space (output of FIG. 22). This slightly narrows the problem down so we may make multiple suggestions for each "category" of product (e.g. sofa, bed, dresser, etc.) instead of suggesting products across several categories, some of which may not be needed for the target space.

To this point, we have primarily focused on deep learning as it applies to a content-based approach, generating vectors, clusters, and computing nearest neighbors to facilitate product selection. However, some of the drawbacks of a content-based approach include challenges in finding the appropriate features (essentially it is difficult to simply box a product into a very specific style, tag, or other metadata) and over-specialization. Over-specialization refers to the fact that the algorithm will not suggest products outside the user's content profile (which is based on products the user has actually interacted with). As humans, our tastes are nuanced and we have multiple interests and aesthetic tastes; ignoring these multiple tastes would not do the recommendation engine justice. It also ignores insights that other users' interactions within the space may provide us.

With that said, the invention will also supplement the content-based approach with a collaborative filtering approach, which will become more and more effective as additional data is collected. This is the third model shown in FIG. 18. One of the biggest advantages is that it works for products of all types, whether it is a lamp, rug, bed, or anything else; it will not depend on metadata and tags like it did in the content-based approach.

One disadvantage is the need for enough users who have interacted with products in the system. Additionally, sparsity is an issue because most users have not rated most items, making the interaction matrix very sparse. It is additionally hard to find users who have interacted with the same products. If we wanted to predict the interaction score (see FIG. 39, which provides an example of one possible method in which analytics will be stored in the system's database) for a given user on a given product, this will be hard to do if the same products have not been interacted with. The first-rater problem is also an issue: we may not recommend a new product because it has no interactions. Another drawback is that it tends to have a popularity bias, emphasizing commonly interacted-with products, which may reduce exposure to more unique and specialized products. A global baseline may be paired with collaborative filtering to address the challenges discussed above, especially sparsity.

Figure 26:
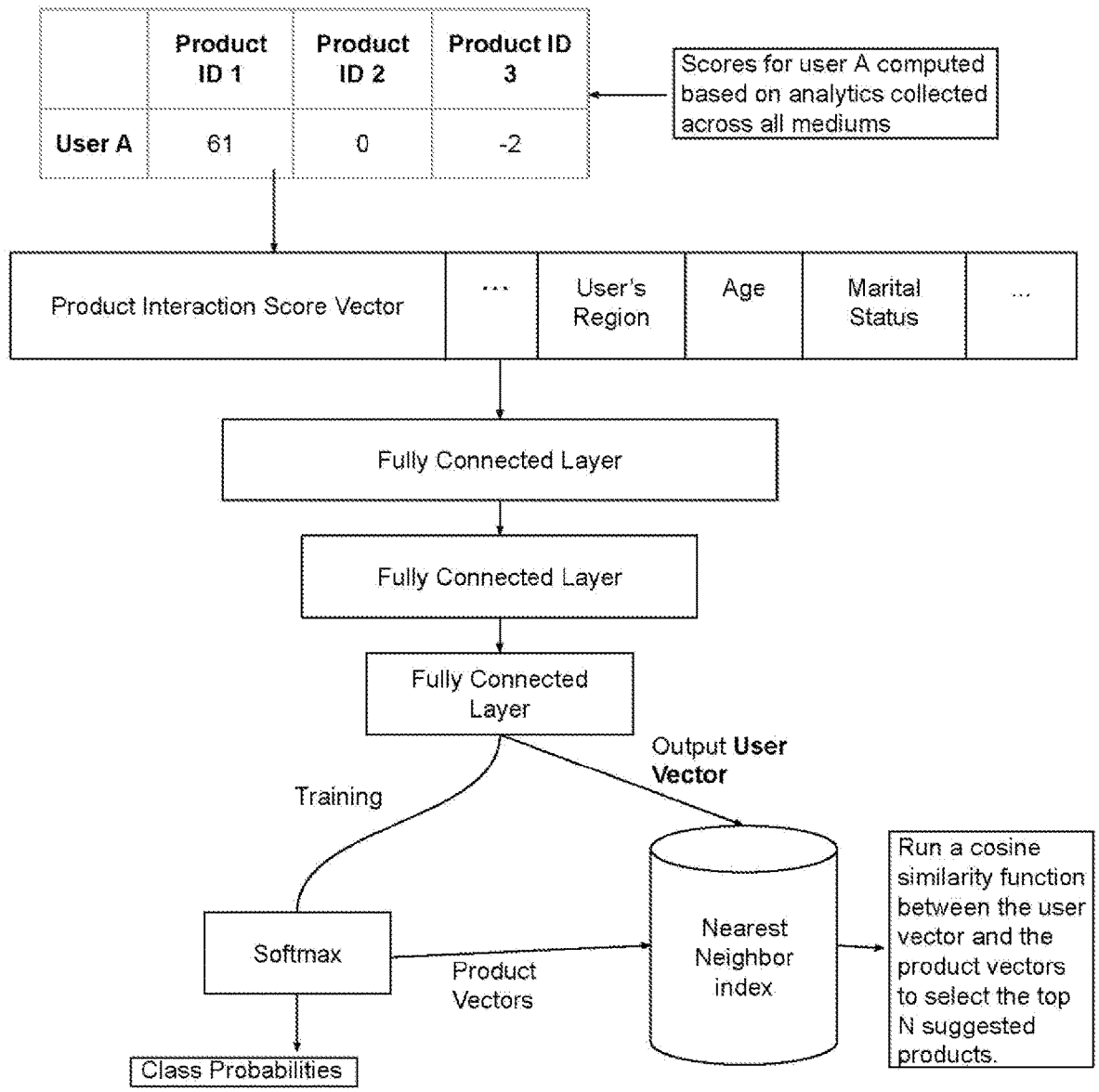
FIG. 26 illustrates a collaborative filtering approach to the Product Search and Suggestion Algorithm, which relies on analytics collected from a multitude of users of the system across all mediums (e.g. VR, AR, and MR).

FIG. 26 illustrates one possible approach to collaborative filtering to product suggestions that the system may rely on. User A is used as an example input. The scores shown are computed based on analytics collected across all mediums, as explained in FIGS. 32, 33 and 39. Based on user interactions, especially other users throughout the system, we can suggest products without relying on features of each product. The analytics the system stores for user interactions (FIG. 39) can be used to power this collaborative filtering approach to product suggestions. As seen in FIG. 26, the system can essentially run a similarity function between the user vector and the product vectors to select the top N suggested products. Because we know the product types we are looking for (e.g. bed, desk, etc.), we can narrow down these results to only include the product types we are looking for. The "similarity" function referenced in the figure may employ a centered-cosine similarity function or an alternate approach (e.g. the Pearson correlation coefficient). We may use this approach to find a neighborhood of items similar to a given item. An item-to-item approach will be preferably used to select and suggest products. Items are generally less nuanced than an individual, who is likely to have a lot of artistic and design tastes. The model can be trained using data from all users (product interaction score vectors for all users). Raw interaction data also can be used for the training. The class probabilities are computed, for instance the probability that a user will like each product.

It is important to note that the "interaction score" will move scores both up and down; this function may apply different weights to different interactions over time which will be adapted based on both user feedback and analytics gathered. FIGS. 32 and 33 explain how this scoring system may work, although the weights (and interactions tracked) are subject to change.

A/B testing (process of showing multiple options and collecting feedback on each), usage data, and analytics informing us of the quality of our suggestions will help tune our "ensemble" approach which considers probabilistic models, a content-based suggestion engine, clustering, and collaborative filtering, although with different "weights". In certain scenarios, it is wise to rely on more of a content-based approach, while at other times clustering and collaborative filtering may have their perks. If there is not sufficient user data, for example, a content-based approach may be more effective. As more and more product training data is available and deep learning algorithms improve, clustering may work well to generate the collection of products for the target space (and related products that may further enhance the environment). And finally, once enough users are on the platform, collaborative filtering will help suggest more nuanced collections of products (appealing to the very unique tastes of users which are hard to bucket into a fixed number of pre-decided tags and categories).

An ML model may preside over the ensemble system, assigning weights to different models intelligently depending on the situation. Although the weights may be hardcoded initially, with sufficient feedback on the suggestions, the ML model will learn to adapt the weights accordingly.

The output of the ensemble approach in FIG. 18 is an updated TXLD file for that "style". We will repeat this product selection and placement process for all N "styles" the user requests, as shown in FIG. 24. Style does not refer to only high-level descriptors like "Modern" or "Contemporary". It also includes styles that may be specific to one user, a grouping or collection of users, or other more nuanced styles that are unnamed (e.g. computed based on platform usage). In the example shown in FIG. 24, we see that the styles we must create scenes for include Formal Traditional, Modern Contemporary, a specific user (with a unique ID in the system's database), group of similar users (who have a unique or specific interest or style), among others. For each such "style", we also generate a scene for different times of day. In the example, these times of day include 6 am, 1 pm, 5 pm, and 10 pm, among others. Although FIG. 24 shows that separate TXLD files will be created for each time of day for each of the N desired styles (i.e. N×M total TXLD files), in some embodiments, N files may suffice where each TXLD file stores the times of day as an array. However, because placement and positioning of lighting may vary tremendously based on time of day, it may at times be preferable to store each time of day as its own TXLD file. Each TXLD file generated as part of this process may be stored as shown in FIG. 27. TXLD files may be stored in the system in multiple formats, but two possible structures are shown in FIG. 27. A non-relational database may be used when flexibility is required. In the example in FIG. 27 flexible schema is assumed. It is important to note that some TXLD files have links to their generated scenes while others do not. This implies that while TLXD files may have been created, the scenes have not been generated and/or stored in the system yet. For every property or unique space in the system, a user may have his/her own map of TXLD files personalized for him/her. Each "style", whether a technology inferred style or a named style, may also have its own map of TXLD files. Each map of TXLD files may be keyed on time of day or weather condition. Further, as more and more TXLD files are generated for a space, this map for each "style" will also keep track of the full history of TXLD files for that "style". Additional metadata relating to each TXLD file, including but not limited to timestamp of creation and algorithm version used, may also be stored directly in the map, or may alternatively be stored in another part of the database.

After the TXLD files have been created and stored, the system will iterate over each TXLD file for the property or unique space for the specific "style" under consideration. It will then generate a scene for each TXLD file. As an example, in FIG. 27, we may iterate over all TXLD files for "1234_____Road, Apt. 91" for User 1. We may alternatively iterate over all TXLD files for "123_____Way" for the "Modern Contemporary Style". The system may be supplied with both a unique space (e.g. address, or other unique identifier for a space) and a "style" (including an individual user) when generating scenes. Alternatively, if only a property or unique space is provided (without a "style"), the system may iterate over all TXLD files for that unique space (across all "styles") and generate scenes for any that have not already been processed. If the system is provided with an "override" or equivalent option, in this case, all scenes for that unique case will be re-generated and stored in the database. This may be powered by a batch job or cron job that occurs at fixed intervals. Such batch operations may occur behind-the-scenes, minimizing delays for users while maximizing their user experience. Another option is if only a "style" has been provided to the system for the purposes of scene creation. As an example, if the supplied "style" is a specific user, we may generate scenes for all TXLD files for that user that have not already been processed (and for which scenes have not been created). Again, an "override" option may re-process (or if unprocessed, process) all TXLD files for that specific user, generating new scenes for each. Different permutations of inputs will essentially result in different batch jobs being processed across the system. Periodically, all TXLD files in the system may be re-processed, updating the scene link for each in the database.

Figure 28:
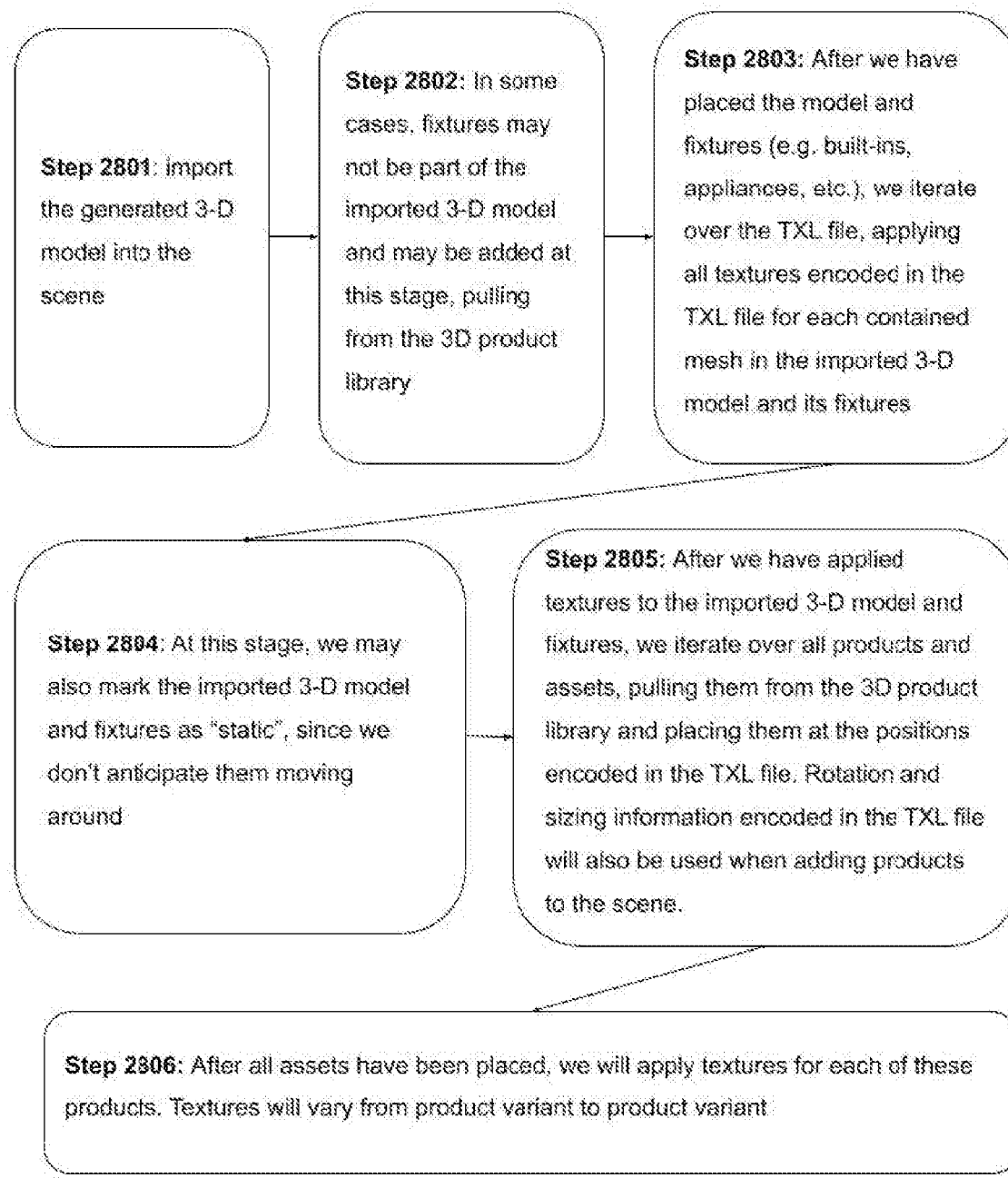
FIG. 28 illustrates how the system will create scenes based on TXLD files.
Figure 29:
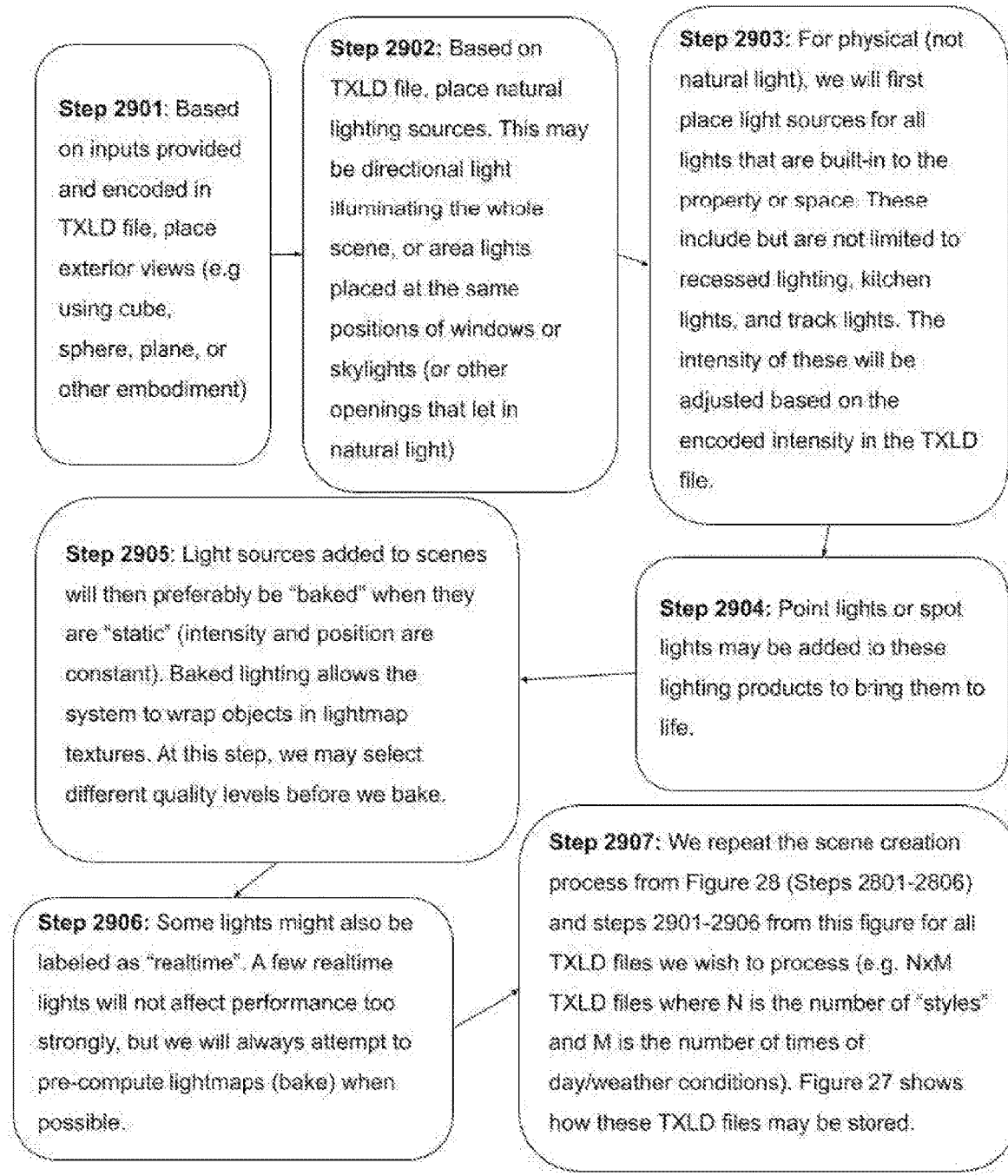
FIG. 29 illustrates how the system will add lighting sources and bake lighting for all scenes (e.g. N×M scenes for N×M TXLD files).

For each TXLD file, we will create a scene (FIG. 28) in either a custom graphics engine or an engine similar to those used in video game development. This engine will broadly be referred to as the "environment" for the purposes of scene generation. A scene may broadly be defined as a container of all objects for each unique space, property, or store being rendered. As explained above, even for one unique space, we may have several TXLD files and hence scenes. In most embodiments, for a space, the number of scenes will be equal to the number of TXLD files generated. The process of generating a scene is illustrated in FIGS. 28 and 29. FIG. 28 illustrates how the scene will be created, while FIG. 29 explains how lighting and baking will be handled.

We have already generated the 3-D model of the property or space under consideration (which is stored in the cloud and referenced by the database), so we may import this file into the scene. The model may be placed at (0, 0) in the scene's coordinate space. In some cases, fixtures may not be part of the imported 3-D model and may be added at this stage, pulling from the 3D product library. After we have placed the model and fixtures (e.g. built-ins, appliances, etc.), we iterate over the TXLD file, applying all textures encoded in the TXLD file for each contained mesh in the imported 3-D model and its fixtures. It is important to note that products and custom assets have not been imported into the scene at this stage. At this stage, we may also mark the imported 3-D model and fixtures as "static", since we do not anticipate them moving around. In terms of applying textures, for example, if a floor has a "Modern Cherry Hardwood" descriptor encoded in the TXLD file that maps to a specific texture in the 3D product library, we look up and import the texture if it is not already available to the system. A cache or CDN (content distribution network) may be used by the system to prevent unnecessary network load when fetching textures and models from the 3D product library. The user may later have the option of manipulating this texture while viewing the space. In this example, this may be the equivalent of switching "Modern Cherry Hardwood" to "Contemporary Beige Carpet". These operations will pull directly from the 3D product library.

After we have applied textures to the imported 3-D model and fixtures, we iterate over all products and assets, pulling them from the 3D product library and placing them at the positions encoded in the TXLD file. When pulling from the 3D product library, we will ensure that we select the correct product variants (e.g. size, color, style, or other variant). Coordinates may be computed for positions of these products based on relative positioning information stored in the TXLD file. "Local origins" for each component of the space may also be used to compute product positions in the scene (see FIG. 7 and FIG. 8, where origins are labeled for each subsection). Rotation and sizing information encoded in the TXLD file will also be considered when adding products to the scene.

After all assets have been placed, we will apply textures for each of these products. Textures will vary from product variant to product variant. For example, even if the same sofa product is being placed, the "beige leather" and "brown leather" variants will have different textures that need to be imported from the 3D product library. These textures will then be applied to each added product or asset. "Textures" may manifest themselves as shaders, materials, or other terms unique to the software being used. The purpose of textures is to create as photorealistic of an environment as possible. Certain products may be marked as static if we do not anticipate them moving. Alternatively, in some cases, the system may want to allow users to manipulate (including move around) some products in the environment. In this case, such products may not be labeled as static.

After the system has fully placed all assets, models, and products in the scene, we move on to handle lighting for the scene. Different software may have their own approaches to lighting but we will refer to high level terms like point lights, spot lights, and area lights. Each TXLD file also encodes data about lighting, both natural and physical (not natural) light.

For rendering photorealistic and accurate exteriors we may generate immersive "containers", referred to as "skyboxes" by some software. The images and videos input to the system in step 301 were uploaded to cloud storage and links to said files were labeled and stored in the TXLD file for each window, skylight, or exterior-facing opening. Depending on the type of inputs provided to the system, a different approach will be employed. If the system is provided with data from a full 360 degree camera in all directions, we may convert this into a cube or sphere (e.g. skybox). If, however, we do not have access to 360 image data, we may use images looking outside windows and doors to construct "planes" rendering the exterior views. In this option, the planes would be positioned at the same positions as said windows, doors, or openings and would be the same size to create as photorealistic of an exterior view as possible.

For natural light, we will rely on windows (or skylights). The TXLD file encodes all windows, including their positions and dimensions and rotation. To simulate natural light, a directional light may be used to illuminate the whole scene (much like a sun). Alternatively, area lights may be placed at each window (equal dimensions as window) or slightly behind each window (e.g. 0.1 m). Different softwares may have their own names for these lights but essentially area lights function as planes emitting light (to approximate light entering through windows, doors, skylights, or other openings). These lights will be positioned to face inside the property or space so the property or space is illuminated. The intensity of these lights will vary depending on time of day, region, and weather conditions.

For physical (not natural light), we will first place light sources for all lights that are built-in to the property or space. These include but are not limited to recessed lighting, kitchen lights, and track lights. The intensity of these will be adjusted based on the encoded intensity in the TXLD file. Depending on the desired style or "mood" these lights may be adjusted accordingly. These light sources include but are not limited to spot lights (e.g. for recessed lights) and point lights (emitting light in all directions).

In paragraphs 195 and 196, the system explains how products and assets will be added to the scene. These products may include lamps or other lighting sources. However, the system will still need to add lighting sources for these types of products. Point lights or spot lights may be added to these lighting products to bring them to life. These lighting products (e.g. lamps) may be marked as static and their associated lighting source(s) may be "baked"; alternatively, the system may render these light sources as "real time". In this case, users may be permitted to alter the intensity of the light source or move the lighting product and associated light source(s) around the scene. It is worth noting that rendering "real time" lights may be a heavy operation. Realtime light, in some software referred to as "Global Illumination" (although the terminology may vary), are heavy on GPU (Graphics Processing Unit) and sometimes on CPU.

Light sources added to scenes will preferably be "baked". Baked lighting allows the system to wrap objects in lightmap textures. The limitation of baked lighting is that objects marked as static as part of the baking process will not be able to move. If they are, the "baked" (computed) lighting will no longer be accurate. The light baking process would have to be restarted to re-compute the baked lighting after the object has moved. However, for performance reasons, this is often a worthwhile tradeoff.

For real time lighting to be truly photorealistic and aesthetically pleasing, the user would need an advanced graphics card, which may prove to be prohibitively expensive hardware. However, lightmaps allow the system to pre-compute the lighting and to store the computed lightmap texture as part of the scene.

Often, the system will attempt to strike a balance here. When possible, lighting will always be baked or pre-computed. However, certain products may be permitted to move. Some lights might also be labeled as "real time". A few real time lights will not affect performance too strongly, but we will always attempt to pre-compute lightmaps when possible.

Figure 40:
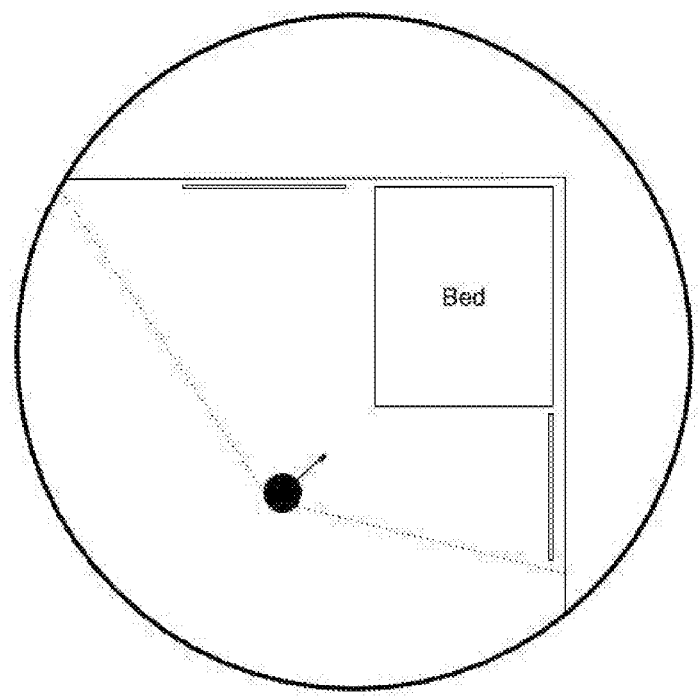
FIG. 40 illustrates an exemplary mini-map. Mini-maps provide users with information on where they are relative to the space they are in (on all mediums including but not limited to AR, MR, and VR).

The system at this stage may optionally create a "mini-map" that shows the property or unique space with an overhead view. See FIG. 40 for how this mini-map might look. Depicted on FIG. 40 is an optional element of the Virtual Reality experience that will show the users where they are in the scene from an overhead (bird-eye) perspective. In the AR and MR cases, point cloud data maybe used to identify the user's location in the TXLD fie, which may be used to create the "live" mini-map. The main purpose of the mini-map will be to show users where they are in the space (e.g. a property, home, virtual store, virtual workplace, or other space). Rooms and names of spaces may be labeled in these mini-maps.

Finally, we bake the scene at a variety of resolutions (units used to describe this may vary depending on the software being used). Optionally, ambient occlusion may be enabled to approximate how bright light should be shining on any specific surface, adding additional photorealism and accurate shadows. Ambient occlusion may be pre-computed for static objects during the baking process.

We repeat this scene creation process explained in paragraphs 195 through 208 for all TXLD files we wish to process, as explained in Paragraph 194.

At this stage, we may export this scene for a variety of mediums. For web-based tours, the model is optimized, downscaled, and exported to a format suitable for rendering via an Internet or intranet connection, for example using WebGL or the like. Other mediums may necessitate different export processes but the system will always adapt to accommodate new mediums.

In another embodiment, for tours based on VR technology, the model is exported to a format suitable for rendering in a VR headset (e.g. the HTC VIVE™ or the like). In some cases, the scene may be hosted using a private Web URL, which headsets may access directly. Headsets may preferably pull scene data over the network, rather than having to connect to a computer and manually download the data. Hardware improvements in headsets will facilitate this process. The scene may also be exported for use by other cutting-edge hardware. FIG. 30 illustrates the high level process by which we may export scenes. This figure also explains approaches that might be used to handle scenes that are larger (either due to quality or due to being renderings of larger spaces spatially). "Lazy loading" may be used to only load a subset of scene data initially. As a user traverses the space, more and more of the scene will be loaded. This minimizes loading time, improving the user experience.

The system will then optionally generate video walkthroughs of the space, once per scene (i.e. once per TXLD file). These may be uploaded to social media platforms, video hosting sites, or other platforms commonly used to market homes. FIG. 31 addresses this step of the process.

FIG. 32 illustrates the "outside-the-environment" data points (as opposed to analytics within the VR, AR or MR mediums, which are explained in FIG. 33. Every user will have a cumulative score of all interactions with each unique space (e/g/property, store, workspace, or any other space). The score column refers to how this score will change based on "outside-the-environment" interactions. Each user's score for each product in the specific scene being rendered will also be affected by "outside-the-environment" analytics, but much less so than the "inside-the-environment" interactions explained in FIG. 33.

FIG. 34 is an example of how one potential interface rendered by the system may look. Each space or property may have its own webpage with the VR scene embedded directly into the website. Users may be able to switch between "styles" within said webpage, whether it is to one specific to that user, a group of users, or a specific style (whether named or technology computed). The user's interactions here are explained further in Paragraph 168.

Figure 2:
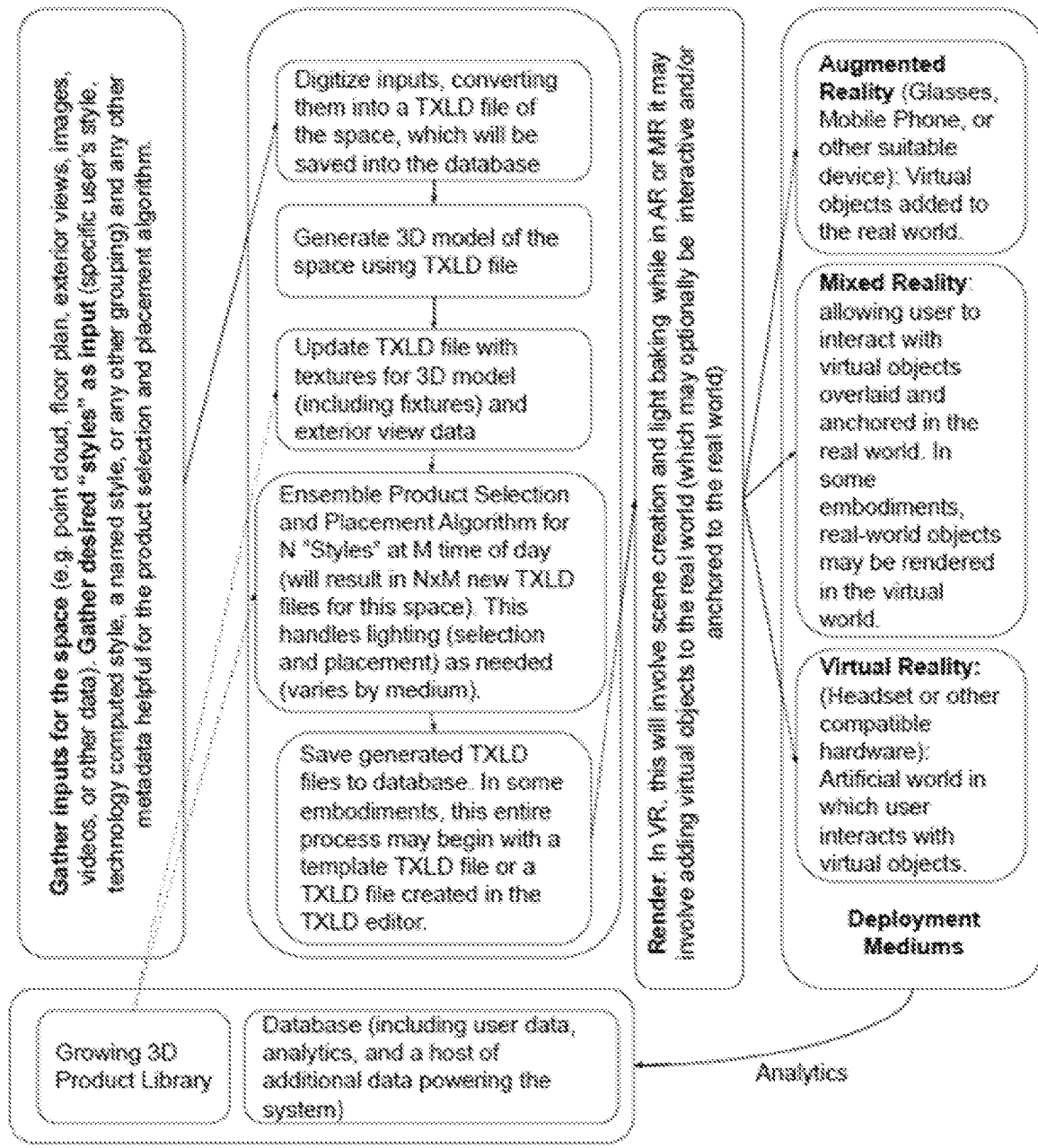
FIG. 2 is a diagram representing a high-level summary of the system overview, showing how the system works on different mediums (e.g. Augmented Reality, Virtual Reality).

Referring back to FIG. 2, we see how the full process works for different mediums (e.g. Augmented Reality, Virtual Reality). FIG. 35 depicts an overview of the system when the user uses Virtual Reality.

The system's use is not only limited to virtual real estate tours. One alternative method of using the system is proposed below.

Figure 36:
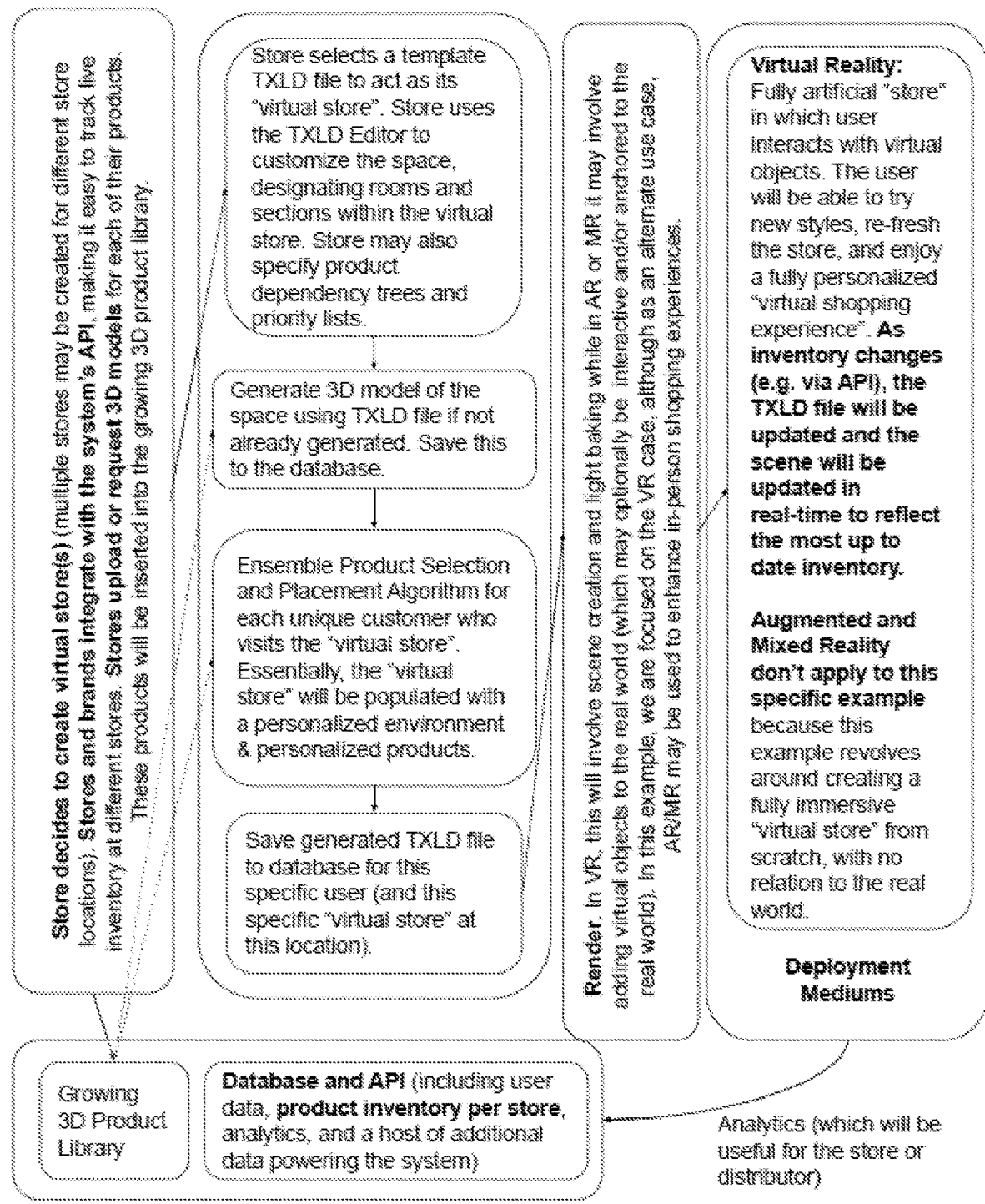
FIG. 36 illustrates a different use of the system—for "Virtual Shopping": Store/Distributor side (using template TXLD). The figure illustrates how the process may look for a store/brand attempting to create "virtual stores" and distribute products using the system.

FIG. 36 and FIG. 37 explain how this system may be employed for the purposes of "virtual shopping". FIG. 36 illustrates an overview of the system (for purposes of a virtual store), but this diagram walks completely through one specific example. If a store or product distributor of any kind wanted to bring their experience of selling products in person into a full virtual reality environment, this system would make the process substantially easier. Virtual reality shopping (in 3D) better approximates the in-person shopping experience than mobile apps or webpages. Stores will have a multitude of options on how to use the system to distribute their products through fully immersive "virtual stores". Stores will also be able to distribute their products through system-created augmented and mixed reality applications distributed through hardware supporting these technologies (e.g. mobile phones, wearables of any kind). This will allow users of the system to browse products from the comfort of their homes (or wherever they are at any given moment). However, we will focus on the concepts of "virtual stores" here.

Some stores may have some combination of floor plans, images/videos, and/or point cloud(s) of their stores. In this case, the same approach described above of digitizing a space into a TXLD file may be employed.

However, a store may not care to re-create their physical store. In this case, a store may begin the entire process with the TXLD file editor. The system may provide a set of "templates" for each store. These may be TXLD files previously used by the system, or intelligently generated TXLD files created to meet the needs of the store. In both embodiments, the store is able to seamlessly create their "virtual store", removing the need for collecting a multitude of information from the store (e.g. photos, videos, point clouds(s)/3-D depth data).

Once a store has decided on a TXLD file for a layout for the "virtual store", someone with control over inventory and distribution may input the store's (or company's local inventory's) full product catalog and inventory into the system. He/she may also label "rooms" or "sections" of the virtual store. In the case of stores like Costco or Safeway, this could be aisles. In the case of a furniture store or home theatre store, it may be different showrooms. The TXLD file editor will provide the store or brand with flexibility on how they want to structure their virtual stores. Stores will be able to adapt their "priority lists" (FIG. 21) to strategically emphasize certain products over others.

As virtual reality, mixed reality, and augmented reality technology evolves, more and more 3D models will be easily transmitted over the network. This development will go hand-in-hand with a store's ever-changing inventory. As a store's inventory changes, Virtual, Mixed, and Augmented Reality mediums will reflect these changes in real-time. In practice, this implies that if a user enters a "virtual store", this user will only see products that are available at that specific store. It is important to note that each "virtual store" will have a unique "virtual address". This virtual address may be a real address if the "virtual store" is a re-creation of a real place. If it is not based on a real location, the system will either assign a unique "virtual address" or will allow the store (or user) to pick its own.

The store will be permitted to upload 3D models of each product, or at the least, provide a flat 2D image of the product. This process may also be automated by each store or distributor, who will have the option of integrating directly with the system's API (FIG. 42). Uploaded models may be validated before showing up in "virtual stores". The store may also search the existing 3D product library to see if a model for the newly added product already exists.

Beyond the control provided to the store, the system will rely on the data collected on the platform and the ensemble product selection and placement algorithm to personalize every "virtual shopping" experience for every user, group of users, or specific need the user has mentioned they have. In practice, a user may be asked before entering the store why they are shopping. If they specify something specific, the store will be created specifically to cater to this need (could be a "product type"). If however, no specific need is mentioned, the ensemble approach will be relied on to create a personalized store (or an approximation of a personalized store, e.g. similar users). This will help stores simultaneously allow users to shop in 3D from their homes while personalizing their marketing strategy to each and every user. FIG. 37 explains this process in more detail.

A simple example may be a sporting goods store. If a user specifies that they are shopping for a "jersey", the TXLD file will be updated to specifically show jerseys in that virtual store. Other products may still appear in the store but emphasis will be placed on jerseys. If we know this user is from Seattle, we may intelligently place Seattle Seahawks jerseys and other Seahawks gear in the virtual store.

In an Augmented Reality manifestation of the "virtual shopping" experience, the TXLD file may be generated in real time using live data from a 3-D depth camera. In this embodiment, a real-time version of the ensemble product suggestion and placement algorithm will produce an output TXLD file. Using the user's relative position to walls and other elements of the space, added assets will be added to the camera view in their appropriate location, relying on a computer vision algorithm. Depth data from point cloud(s) will substantially improve quality and accuracy of product placement. Depth data will also help identify where the user is relative to elements of the TXLD file. FIG. 38 illustrates this in more detail.

Different stores and brands on the system may pay to feature products and to have them show up with higher frequency in the system. Depending on a user's unique "style" and preferences (based on their "user profile"), the system will return results that fit them best. The resulting objects will then either be added to that user's own personal "virtual store" in the case of virtual reality, or be placed in the camera view on their augmented and/or mixed reality compliant hardware.

The system is designed to personalize the experience for each and every user, while making the home-buying, renting, and shopping experiences as interactive and immersive as possible. The system may also be used for other purposes with an emphasis on visualization and interaction. "Virtual workplaces" where "virtual offices" may be created by companies are yet another potential application of this system. In this case, users will connect to a shared server so that their experiences in this "virtual workplace" are synced.

The system may be employed during an in-person open house as well, relying on Augmented Reality hardware. When the user is walking around a home, whether staged or not, the system will be able to auto-stage the property in real-time. There are two main possibilities here: we have already digitized the space into a TXLD file, or we have not (and must do so immediately). If we have already digitized the space, we may use the user's relative position to identify where in the TXLD file the user is and what direction the user is facing. In this case, we may only need to apply the product selection and placement algorithm, where we know the target space (in this example, the room the user is in or is looking at) and the style (in this example, this prospective homebuyer's "user profile"). If the user is a Eagles fan and is a huge sports fan, personalized products (e.g. Philadelphia Eagles poster) may be added to the TXLD file. These changes would then be reflected in the Augmented or Mixed Reality view immediately, again relying on the user's relative position to decide placement, sizing, rotation, and other spatial descriptors of the space.

Appropriate computer-readable files contain the information necessary to enable the software to modify the 3-D representation so as to display colors, styles, and textures corresponding to the user's selected specifications. The user may be presented with lists of options, which are effectively catalogs of the available virtual paints, carpets, appliances and furnishings. The options may be presented in grouped form, representative of different decorative styles, such as "modern", "antique", "formal", "casual", and the like. The time required to compute the desired rendering will depend on the desired image quality and on the processing power available to the practitioner. Real-time rendering at high resolution would require supercomputer capabilities, but reasonably powerful systems are presently available that may render the desired scenes with good realism within minutes.

In the case of home marketing and use by prospective homebuyers, location information for multiple properties is used to calculate distances between the properties. Similarity scores between pairs of properties may be calculated based on location, square footage, price range, and other factors. This information is used to render a list, map, or other presentation of a collection of "similar" properties, and the user is thereby enabled to switch from one presented property to another similar property within the environment of the web-based or VR tour. This capability increases the likelihood that the user will identify one property as the most desirable, and reach a decision to make an offer or to purchase at the asking price.

It should be understood that the example embodiments described above may be implemented in different ways. The various methods and machines described herein may each be implemented by a physical, virtual or hybrid general purpose computer having a central processor, memory, disk or other mass storage, communication interface(s), input/output (I/O) device(s), and other peripherals. A general purpose computer is transformed into a machines that executes the methods described above, for example, by loading software instructions into a data processor, and then causing execution of the instructions to carry out the functions described.

As is known in the art, such a computer may contain a system bus—a set of hardware lines used for data transfer among the components of a computer or processing system. A bus is essentially a shared conduit that connect different elements of the computer system (e.g., processor, disk storage, memory, input/output ports, network ports, etc.), enabling the transfer of information between the elements. One or more central processor units are attached to the bus and provide for the execution of computer instructions. Also attached to the bus are typically I/O device interfaces for connecting various input and output devices (keyboard, mouse, display, VR headset and the like) to the computer. Network interface(s) allow the computer to connect to other devices attached to a network. Memory provides volatile storage for computer software instructions and data used to implement an embodiment. Disk or other mass storage provides non-volatile storage for computer software instructions and data used to implement the various procedures described herein.

Embodiments may be implemented in hardware, firmware, software, or combinations thereof.

In certain embodiments, the procedures, devices, and processes described herein constitute a computer program product, including a computer readable medium (e.g., a removable storage medium such as one or more DVD-ROM's, CD-ROM's, hard drives, and the like, that provide at least a portion of the software instructions for the system. Such a computer program product may be installed by any suitable software installation procedure, as is well known in the art. In another embodiment, at least a portion of the software instructions may be downloaded from a remote server or storage device, over a wired or wireless connection.

Embodiments may also be implemented as instructions stored on a non-transitory machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Embodiments may be implemented in a variety of computer architectures, physical, virtual, cloud computers, and/or combination thereof, and thus the data processors described herein are intended for purposes of illustration only and not as a limitation of the embodiments. The processing required to carry out the methods of the invention may be localized to a single CPU, or distributed over a number of interconnected CPUs.

While this invention has been particularly shown and described with references to example embodiments thereof, it will be understood by those skilled in the art that various changes in form and details may be made therein without departing from the scope of the invention encompassed by the appended claims.

The invention claimed is:

1. A computer-implemented method of encoding, generating and rendering a 3D interactive presentation of a space using virtual reality, augmented reality, and mixed reality technology, comprising:
    (a) generating a base file file encoding a virtual store space and 3-D model of the virtual store space;
    (b) creating a unique file for one or more styles of the virtual store space;
    (c) updating the unique file for the one or more styles of the virtual store space with selected objects and textures by selecting digital representations for each of a plurality of styles based on input from an ensemble system, said input is selected from a continuously growing and evolving 3D library comprising textures, furniture, artwork, electrical switches, lighting, doors, windows, plumbing fixtures, and retail or wholesale merchandize, audio and audio-visual entertainment devices; and
    acing selected digital representations into each unique file for a specified style at positions, with rotations and sizes;
    (e) rendering the unique file on the virtual reality, augmented reality or mixed reality technology;
    (f) updating products inventories of the virtual store space in real-time using an API, (Application Programming Interface) wherein the update is reflected immediately to shoppers interacting with the virtual store; and
    wherein a user experiences moving through the 3-D interactive representation and optionally manipulating the digital representations of the selected objects and textures within the virtual store space.

2. The method of claim 1, further comprising the step of allowing the user to modify and customize the virtual store space and the position, dimension and rotation of the selected digital representations using a dedicated editor interface.

3. The method of claim 1, further comprising the step of providing to a user an interactive three-dimensional viewing mode for viewing the 3-D digital representation.

4. The method of claim 1, further comprising the step of providing the user with an active mini-map of the property, with a real-time indication of the virtual location of the user on the property.

5. The method of claim 1, further comprising the step of providing the user with a collective view, in the form of a map, a list, or other suitable format.

6. The method of claim 1, wherein the ensemble system relies on weighted averages of probabilistic, content-based, clustering, and collaborative filtering models for the selection of digital representations of the selected objects and textures.

7. The method of claim 1, further comprising the step of providing the user with the ability to view the virtual store space from an overhead view.

8. The computer-implemented method of claim 1, further providing a viewing mode, whereby the user is further enabled to:
   (g) view representations of the virtual store space at different times of day, in varying seasons, and in varying weather conditions;
   (h) choose between a first-person view and a third-party view of an avatar whose motions are under the control of a buyer; and
   (i) toggle among views of a variety of interior treatments, selected from one or more alternatives selected from the group consisting of lighting, wall colors, flooring materials, floor coverings, countertop materials, colors and styles of cabinets, appliance models and styles, window treatments, door treatments, millwork, and furniture.

9. A system for providing a 3D interactive presentation of a virtual store space, comprising:
   a central processing unit;
   a graphics processing unit;
   computer-readable memory;
   and computer-readable storage within which is stored a polygon mesh 3-D digital representation of a space,
wherein the computer system is adapted to provide to a user an interactive three dimensional viewing mode for viewing the 3-D digital representation, wherein the user, by employing controls provided by the viewing mode, is enabled to create the impression of moving through the 3-D representation and of manipulating the digital representations of the one or more objects within the space and wherein the system creates a virtual store space not based on the dimensions of a real space by using a dedicated editor interface; and
wherein the computer-readable storage further stores computer-readable files and software that adapts the system to enable the user to:
   a) view representations of the building at different times of day, in varying seasons, and in varying weather conditions;
   b) choose between a first-person view and a third-party view of an avatar whose motions are under control of a buyer; and
   c) toggle among views of a variety of interior treatment alternatives selected from the group consisting of lighting, wall colors, flooring materials, floor coverings, countertop materials, colors and styles of cabinets, appliance models and styles, window treatments, door treatments, millwork, and furniture.

10. The system of claim 9 further providing a virtual shopping experience, wherein the computer system is adapted to provide to a user an interactive three-dimensional viewing mode for viewing the 3-D digital representation, wherein the user, by employing controls provided by the viewing mode, is enabled to create the impression of moving through the 3-D representation and of manipulating the digital representations of the one or more objects within the space.

11. The system of claim 9, further comprising updating product inventories of the virtual store in real-time using an API (Application Programming Interface), in which the update is reflected immediately to virtual shoppers interacting with the virtual store.

12. The system of claim 9 further comprising:
   d) a cloud storage hosting a 3D product library, which contains 3D digital representations of products and textures;
   e) a database hosting links to all products and textures hosted in the 3D library and links to base files, wherein each base file corresponds to a unique space;
   f) infrastructure to host deep learning classification algorithm to classify and label new products and textures, product selection algorithm to select objects from the 3D digital library, and placement algorithm to place the selected objects in the space;
   g) a software with Artificial Intelligence component to learn from to avoid mistakes in generating 3-D virtual representations;
   h) a data acquisition tool to obtain products information and images from catalogs hosted online;
   i) unwrapping software;
   j) Interface used to render system generated scenes;
   k) editor interface;
   l) input devices;
   m) hardware supporting virtual reality, augmented reality or mixed reality;
   n) output devices.

13. A computer program product, comprising a non-transitory computer usable storage medium having a computer readable program code that,
   when executed on a computer, causes the computer to implement a method comprising:
      a) creating a virtual store space not based on a real space by using a dedicated TXLD editor interface;
      b) modifying said virtual store space;
      c) customizing said virtual store space;
      d) converting the virtual store space which is encoded as a TXLD base file into a polygon mesh 3-D digital representation;
      e) creating and updating one or more unique files to each of a plurality of different styles for the target space;
      f) selecting digital representations for each of a plurality of different styles based on an ensemble recommendation system where the digital representations are selected from the system's constantly growing and evolving 3D library of real products consisting of furniture, artwork, electrical switches, lighting, doors, windows, plumbing fixtures, and audio and audio-visual entertainment devices;
      g) placing selected digital representations into each of a plurality of different styles for a plurality of unique files at positions, with rotations and sizes;
      h) rendering on a target medium, whether it is virtual reality, augmented reality, or mixed reality;
      i) providing to a user an interactive three-dimensional viewing mode for viewing the one or more 3-D digital representations
      j) providing the user with an active mini-map of the property, with a real-time indication of the virtual location of the user on the property;
      k) depending on the type of user using the system, providing the user with a collective view, in the form of a map, a list, or other suitable format, of nearby and/or similar properties;

l) providing the user with means to contact and/or make an offer to the listing agent or seller of the selected property;
m) providing the user with the ability to view the virtual store space from an overhead view;
n) presenting to the user all real products (of all categories) being rendered in the scene;
o) providing the ability to use the above process for the purpose of creating virtual stores not based on dimension data from real stores;
p) providing the ability to customize the virtual store and update product inventories in real-time using an API (Application Programming Interface), which will be reflected immediately to virtual shoppers using the system;
q) providing virtual shoppers with a personalized shopping experience while traversing said virtual store space, with virtual store layouts (and content) personalized for each user; and wherein the user, by employing controls provided by the viewing mode, is enabled to create the impression of moving through the 3-D representation and of manipulating the digital representations of the one or more objects within the virtual store space interior.

14. The computer program product of claim 13, wherein the computer readable program code further adapts the computer to enable the user to:
r) view representations of the building at different times of day, in varying seasons, and in varying weather conditions;
s) choose between a first-person view and a third-party view of an avatar whose motions are under the control of a buyer; and
t) toggle among views of a variety of interior treatments, selected from one or more alternatives selected from the group consisting of lighting, wall colors, flooring materials, floor coverings, countertop materials, colors and styles of cabinets, appliance models and styles, window treatments, door treatments, millwork, and furniture.

* * * * *